United States Patent
Utku

(10) Patent No.: US 12,497,451 B2
(45) Date of Patent: Dec. 16, 2025

(54) ANTI-TIRC7 ANTIGEN BINDING PROTEINS

(71) Applicant: Nekonal S.A.R.L., Esch/Alzette (LU)

(72) Inventor: Nalan Utku, Munich (DE)

(73) Assignee: NEKONAL S.A.R.L., Esch/Alzette (LU)

( * ) Notice: Subject to any disclaimer, the term of this patent is extended or adjusted under 35 U.S.C. 154(b) by 876 days.

(21) Appl. No.: 17/765,267

(22) PCT Filed: Sep. 30, 2020

(86) PCT No.: PCT/EP2020/077422
§ 371 (c)(1),
(2) Date: Mar. 30, 2022

(87) PCT Pub. No.: WO2021/073877
PCT Pub. Date: Apr. 22, 2021

(65) Prior Publication Data
US 2022/0363753 A1    Nov. 17, 2022

(30) Foreign Application Priority Data
Oct. 30, 2019 (EP) .................................. 19200324

(51) Int. Cl.
*C07K 16/28* (2006.01)
(52) U.S. Cl.
CPC .......... *C07K 16/28* (2013.01); *C07K 2317/24* (2013.01); *C07K 2317/52* (2013.01); *C07K 2317/565* (2013.01); *C07K 2317/74* (2013.01); *C07K 2317/92* (2013.01)

(58) Field of Classification Search
CPC ...................................................... C07K 16/28
See application file for complete search history.

(56) References Cited

FOREIGN PATENT DOCUMENTS

| JP | 2005525792 A | 9/2005 |
|---|---|---|
| WO | 03054018 A2 | 7/2003 |
| WO | 03054019 A2 | 7/2003 |

OTHER PUBLICATIONS

JP Office Action for Application No. 2002-519994 ; 7 pages.
International Search Report and Written Opinion for International Application PCT/EP2020/077422; International Filing Date: Sep. 30, 2020; Date of Mailing: Jun. 29, 2021; 9 pages.

*Primary Examiner* — Prema M Mertz
(74) *Attorney, Agent, or Firm* — CANTOR COLBURN LLP

(57) ABSTRACT

The present disclosure provides human T-cell immune response cDNA 7 (TIRC7) antibodies, having improved TIRC7 binding affinity, and/or activity. The TIRC7 antibodies of the invention are generated by mutation of a parent TIRC7 antibody reports most of the humanized candidates, position 43 was Q (Gln, amide). But in the best humanized VH (cAb1466-VH) mutation of position 43 was Q (Gln, amide) to K (Lys, basic) appears to important for successful affinity/stability over the next best humanized VH.

16 Claims, 11 Drawing Sheets
Specification includes a Sequence Listing.

```
cAb2023-VH    QVQLVQSGSELKKPGASVKVSCKASGYTFTTYVMHWVRQAPGQGLEWMGYINPYNDGTTY    60
parent        QVQLKQSGPELVKPGASVKMSCKASGYTFTTYVMHWVKQKPGQGLEWIGYINPYNDGTNY    60
cAb1901-VH    QVQLVQSGAEVKKPGASVKVSCKASGYTFTTYVMHWVRQAPGQGLEWMGYINPYNDGTNY    60
cAb2021-VH    QVQLVQSGAEVKKPGASVKVSCKASGYTFTTYVMHWVRQAPGQGLEWMGYINPYNDGTSY    60
cAb1458-VH    QVQLVQSGAEVKKPGASVKVSCKASGYTFTTYVMHWVRQAPGKGLEWMGYINPYNDGTNY    60
cAb1462-VH    QVQLVQSGAEVKKPGASVKVSCKASGYTFTTYVMHWVRQAPGKGLEWMGYINPYNDGTNY    60
cAb1466-VH    QVQLVQSGAEVKKPGASVKVSCKASGYTFTTYVMHWVRQAPGKGLEWMGYINPYNDGTNY    60
              **  * *: ****:**************** *  ::*******:* cAb2023-VH    NEGFTGRFVFSSDKSVSTAYLQISSLKAEDTAVYYCAEFITKTVGGSMWYLDVWGQGTTV   120
parent        NEKFKGKATLTSDKSSSTAYMELSTLTSEDSAVYYCAEFITKTVGGSMWYLDVWGAGTTV   120
cAb1901-VH    NEKFQGRVTSTSDKSISTAYMELSRLRSDDTVVYYCAEFITKTVGGSMWYLDVWGQGTTV   120
cAb2021-VH    NEKFQGRVTMTSDKSTSTVYMELSRLRSEDTAVYYCAEFITKTVGGSMWYLDVWGQGTTV   120
cAb1458-VH    NEKFKGRVTMIEDTSTDTAYMELSSLRSEDTAVYYCAEFITKTVGGSMWYLDVWGQGTTV   120
cAb1462-VH    NEKFKGRVTMTSDKSTSTAYMELSSLRSEDTAVYYCAEFITKTVGGSMWYLDVWGQGTTV   120
cAb1466-VH    NEKFKGRVTLTSDKSTSTAYMELSSLRSEDTAVYYCAEFITKTVGGSMWYLDVWGQGTTV   120
              ** * *:.  .*.* *.*.*:::* *  ::*:.***************************| ****
```

FIG. 4

```
cAb2021-VL    EIVLTQSPDFQSVTPKEKVTITCRASSSISYIHWFQQKPDQSPKRLIYDTSKSFSGVPSR   60
cAb2022-VL    DIQLTQSPSAMSASVGDRVTITCRASSSISYIHWFQQKPGKVPKRLIYDTSKLQSGVPSR   60
cAb1458-VL    DIQLTQSPSFLSASVGDRVTITCSASSSISYIHWYQQKPGKAPKRLIYDTSKLPSGVPSR   60
cAb1459-VL    DIQLTQSPSFLSASVGDRVTITCSASSSISYIHWFQQKPGKAPKRLIYDTSKLPSGVPSR   60
parent        DIVLTQSPAIMSASPGEKVTMTCSASSSISYIHWFQQKPGTSPKRWIYDTSKLPSGVPAR   60
cAb1460-VL    EIVLTQSPATLSLSPGERATLSCSASSSISYIHWYQQKPGQAPRRLIYDTSKLPSGIPAR   60
cAb1461-VL    EIVLTQSPATLSLSPGERATLSCSASSSISYIHWFQQKPGQAPKRLIYDTSKLPSGVPAR   60
              :* *****  * :   ::.*::*********** *:****.  *:* :*|****   :*:* cAb2021-VL    FSGSGSGTDYTLTINSLEAEDAATYYCHQRSSYTWTFGGGTKLEIK   106
cAb2022-VL    FSGSGSGTEYTLTISSLQPEDFATYYCHQRSSYTWTFGGGTKLEIK   106
cAb1458-VL    FSGSGSGTEFTLTISSLQPEDFATYYCHQRSSYTWTFGGGTKLEIK   106
cAb1459-VL    FSGSGSGTEYTLTISSLQPEDFATYYCHQRSSYTWTFGGGTKLEIK   106
parent        FSGSGSGTSYSLTISSMEAEDAATYYCHQRSSYTWTFGGGTKLEIK   106
cAb1460-VL    FSGSGSGTDFTLTISSLEPEDFAVYYCHQRSSYTWTFGGGTKLEIK   106
cAb1461-VL    FSGSGSGTDYTLTISSLEPEDFAVYYCHQRSSYTWTFGGGTKLEIK   106
              ********.:: ***.*:: :* *.*********************
```

FIG. 5

| | ID | Humanized VH | % Identity to Human | Humanized VK | % Identity to Human | % Titre (mg/l) | Purified (mg) | Monomer (%) |
|---|---|---|---|---|---|---|---|---|
| Control | cAb1457-1.1 | Mouse mAb | | | | 6,3 | 0,5 | - |
| | cAb1457-10.0 | Chimeric mAb | | | | 7,5 | 0,6 | - |
| High Producers | cAb2022-10.0 | cAb2021-VH | 88,7 | cAb2022-VL | 86,2 | 98 | 7,8 | - |
| | cAb1464-10.0 | cAb1462-VH | 84,5 | cAb1460-VL | 84 | 62,5 | 5 | 99,7 |
| | cAb1459-10.0 | cAb1458-VH | 84,5 | cAb1459-VL | 81,9 | 50 | 4 | 99,4 |
| | cAb1463-10.0 | cAb1462-VH | 84,5 | cAb1459-VL | 81,9 | 50 | 4 | 98,7 |
| | cAb1467-10.0 | cAb1466-VH | 83,5 | cAb1459-VL | 81,9 | 47,5 | 3,8 | 99,6 |
| | cAb1468-10.0 | cAb1466-VH | 83,5 | cAb1460-VL | 84 | 45 | 3,6 | 98,8 |
| Moderate Producers | cAb2021-10.0 | cAb2021-VH | 88,7 | cAb2021-VL | 87,1 | 28 | 2,2 | - |
| | cAb1458-10.0 | cAb1458-VH | 84,5 | cAb1458-VL | 85,1 | 25 | 2 | 98,4 |
| | cAb2288-10.0 | cAb2288-VH | | cAb2287-VL | | 24 | 1,9 | - |
| | cAb1469-10.0 | cAb1466-VH | 83,5 | cAb1461-VL | 78,7 | 20 | 1,6 | 97 |
| | cAb1465-10.0 | cAb1462-VH | 84,5 | cAb1461-VL | 78,7 | 17,5 | 1,4 | 98,6 |
| Low Producers | cAb1466-10.0 | cAb1466-VH | 83,5 | cAb1458-VL | 85,1 | 6,3 | 0,5 | 97 |
| | cAb2024-10.0 | cAb2023-VH | 85,6 | cAb2022-VL | 86,2 | 2 | 0,2 | - |
| Negative | cAb1460-10.0 | cAb1458-VH | 84,5 | cAb1460-VL | 84 | 0 | - | - |
| | cAb1461-10.0 | cAb1458-VH | 84,5 | cAb1461-VL | 78,7 | 0 | - | - |
| | cAb1462-10.0 | cAb1462-VH | 84,5 | cAb1458-VL | 85,1 | 0 | - | - |
| | cAb1901-10.0 | cAb1901-VH | 89,7 | cAb1459-VL | 81,9 | 0 | - | - |
| | cAb2023-10.0 | cAb2023-VH | 85,6 | cAb2021-VL | 87,1 | 0 | - | - |
| | cAb2287-10.0 | cAb2287-VH | | cAb2287-VL | | 0 | - | - |
| | cAb2712-10.0 | cAb2712-VH | | cAb2712-VL | | 0 | - | - |
| | cAb2713-10.0 | cAb2712-VH | | cAb2713-VL | | 0 | - | - |
| | cAb2714-10.0 | cAb2714-VH | | cAb2712-VL | | 0 | - | - |
| | cAb2715-10.0 | cAb2714-VH | | cAb2713-VL | | 0 | - | - |

FIG. 7

| | ID | Humanized VH | Humanized VK | Inhibition of allo MLR | Inhibition of PHA | Inhibition of IFNg | Induction of TIRC7 in CD4+ | Induction of TIRC7+ Treg Subset | Induction of Total Tregs |
|---|---|---|---|---|---|---|---|---|---|
| | cAb1457-10.0 | (parent antibody) | | **** | *** | *** | * | * | * |
| High Producers | cAb2022-10.0 | cAb2021-VH | cAb2022-VL | ***** | * | * | * | * | * |
| | cAb1464-10.0 | cAb1462-VH | cAb1460-VL | * | * | *** | * | * | * |
| | cAb1459-10.0 | cAb1458-VH | cAb1459-VL | * | * | ***** | * | ***** | * |
| | cAb1463-10.0 | cAb1462-VH | cAb1459-VL | * | * | * | * | * | * |
| | cAb1467-10.0 | cAb1466-VH | cAb1459-VL | ***** | ***** | ** | *** | **** | ***** |
| | cAb1468-10.0 | cAb1466-VH | cAb1460-VL | ***** | ***** | ** | ***** | *** | **** |
| Moderate Producers | cAb2021-10.0 | cAb2021-VH | cAb2021-VL | * | ***** | **** | * | * | * |
| | cAb1458-10.0 | cAb1458-VH | cAb1458-VL | * | * | * | * | * | * |
| | cAb2288-10.0 | cAb2288-VH | cAb2287-VL | * | * | * | * | * | * |
| | cAb1469-10.0 | cAb1466-VH | cAb1461-VL | * | ***** | * | **** | * | *** |
| | cAb1465-10.0 | cAb1462-VH | cAb1461-VL | * | * | ** | * | * | * |
| Low Producers | cAb1466-10.0 | cAb1466-VH | cAb1458-VL | ***** | ***** | * | * | * | * |
| | cAb2024-10.0 | cAb2023-VH | cAb2022-VL | ***** | ***** | * | * | * | * |

ANTI-TIRC7 ANTIGEN BINDING PROTEINS

CROSS REFERENCE TO RELATED APPLICATIONS

This application is a National Stage application of PCT/EP2020/077422, filed Sep. 30, 2020, which claims priority to European Patent Application No. 19200324.2, filed Sep. 30, 2019, both of which are incorporated by reference in their entirety herein.

SEQUENCE LISTING

The Instant Application contains a Sequence Listing which has been submitted electronically in ASCII format and is hereby incorporated by reference in its entirety. Said ASCII copy, created on Mar. 30, 2022 is named "SWA0592US_ST25" and is 87,979 bytes in size.

The present invention provides novel human T-cell immune response cDNA 7 (TIRC7) antigen binding proteins, such as antibodies, having improved TIRC7 binding affinity, and/or activity. The TIRC7 antibodies of the invention were generated by mutation of a parent TIRC7 antibody and tested in various cellular experiments. The present invention also relates to methods for producing the antigen binding proteins of the invention, nucleic acids encoding them, as well as vectors and host cells for their expression. The invention further relates to methods of treating or diagnosing a disease such as autoimmune diseases, cancer diseases or other immune related diseases, such as diseases involving a cell-mediated immune response, using an anti-TIRC7 antigen binding protein (ABP) of the invention.

DESCRIPTION

The membrane protein T-cell immune response cDNA 7 (TIRC7) was identified by differential display in alloantigen-activated human peripheral blood lymphocytes and was transiently upregulated early in their activation process [1,2,3,4]. Anti-TIRC7 antibody was shown to prevent organ rejection and prolong kidney allograft survival [1], suggesting that TIRC7 could be a novel target for suppressing undesired (cell mediated) immune response in the context of organ transplantation and other autoimmune diseases.

The TIRC7 gene, which is composed of 15 exons and spans 7.9 kb, is localized to chromosome 11q13.4 to q13.5 [5]. No amino-acid homology has been associated with any known proteins involved in T-cell activation. TIRC7 includes an immune-receptor tyrosine-based inhibitory motif, which may be indicative of an inhibitory role in the immune system [6]. Most of the currently identified costimulatory molecules expressed in lymphocytes belong to the immunoglobulin superfamily or the TNF receptor superfamily. Thus, the predicted multi-pass transmembrane structure and the atypical extracellular C-terminus of TIRC7 appear to be unique.

TIRC7 is present in subsets of unstimulated T- and B-lymphocytes (5-10% and 10-40%, respectively) [14], as well as in monocytes (30-90%) at the cell membrane and in intracellular compartments. Following T-cell activation, cell-surface expression of TIRC7 increases within 30 min and reaches maximum levels within 2 h [15]. Prior to cell activation, TIRC7 expression is approximately 100-fold higher in the intracellular compartments of lymphocytes compared with the cell surface. After cell stimulation, and simultaneously with maximum protein expression at the cell surface, the intracellular levels of TIRC7 decline and both intracellular and extracellular expression is restored to control levels within 6 h. These results indicate that TIRC7 is present in intracellular compartments as a preformed protein, which upon T-cell activation, translocates to the cell surface and is subsequently relocated back into cytoplasmic stores. Clathrin-coated vesicles were identified as potential vehicle of transportation of TIRC7 [15]. Similar to other T-cell activation associated molecules that are localized in the immune synapse [16-20], TIRC7 is concentrated at the activated protein C binding site upon antigen activation, and the directed shift of intracellular TIRC7 toward the antigen binding site is paralleled by a reorientation of TIRC7 at the cell surface [15]. These data suggest that TIRC7 is involved in early signalling events regulating further downstream signals as it exists preformed in intracellular compartments and is translocated to the cell surface within minutes of immune activation.

The distribution pattern of TIRC7 among lymphocyte subsets, combined with its early expression in the cell membrane upon activation, differentiates it from other costimulatory molecules utilized for therapeutic interventions such as CD40L, CD3, CD4 or cytotoxic T-lymphocyte antigen (CTLA)-4. These proteins are either expressed exclusively and constitutively on T- (CD3, CD4, CD40L) or B-cells (CD20, CD40), or appear on the cell surface 24 h following immune activation (CTLA-4) [20]. Thus, TIRC7 is likely to be the first negative regulatory signal provided to immune cells after activation. Anti-TIRC7 antibodies induce CTLA-4 early on the surface of T cells and exhibit significant inhibition of proliferation: in human peripheral blood lymphocytes stimulated with mitogen or alloantigen caused strong inhibition of tbet followed by IFNγ, IL6, IL12 and IL-2 (representing T-helper cell type 1 [Th1] and [Th17] cytokines) (Frischer et al. 2016) in a dose-dependent manner, whereas no suppression of IL-4 or IL-10, was observed. Thus, TIRC7 antibody targeting results in selective inhibition of inflammation related cytokines as well as t-bet as the major Th1 and Th17 regulating transcription factor. The inhibition of proliferation was reversed when recombinant IL-2 was added to the culture; therefore, TIRC7 targeting resulted in anergy as cells were responsive to re-stimulation. However, IFNγ expression was only partially abolished, indicating that the anti-TIRC7 mAbs are able to induce a stable and differentiated cytokine inhibition.

The data generated from studies using agonistic anti-TIRC7 antibodies assigned a negative regulatory role of TIRC7 in lymphocyte function because of their antiproliferative and anti-inflammatory effects [14]. The antibody was shown especially to decrease CD4+ cell proliferation. The IC50 value of agonistic anti-TIRC7 mAbs was decreased significantly by crosslinking the mAb prior to incubation with lymphocytes. Moreover, anti-TIRC7 mAb loses its negative signalling properties when Fab fragments were used in proliferation assays, indicating an agonistic role of the anti-TIRC7 antibody. In addition, TIRC7-deficient cells exhibited a significant hyperproliferative T- and B-cell response to various antigens [23], supporting the assumption of a negative regulatory role of TIRC7 in lymphocyte function. More importantly, the effector memory T cell population was significantly increased in TIRC7 knock out mice while CTLA-4 expression was diminished. Thus, TIRC7 act as a check point inhibitor inducing negative signals via binding its ligand, HLADR alpha 2, at the cell surface upstream of other known check point inhibitors.

Millions of people worldwide suffer from autoimmune diseases. Over 80 autoimmune diseases are known, including multiple sclerosis, rheumatoid arthritis, psoriasis, lupus, Crohn's disease and type I diabetes, and many more. Multiple sclerosis (MS) affects about one in a thousand in Western populations and is thought to be due to an expansion of T cells autoreactive to a myelin protein, e.g., myelin basic protein (MBP), phospholipid protein (PLP), or myelin oligodendrocyte protein (MOG). (Stern et al. 2008 Proc. Natl. Acad. Sci. USA 105:5172-5176). Cells that play a role in the regulation of immune response include regulatory T cells. Several autoimmune diseases including both multiple sclerosis and diabetes type 1 are associated with a deficit in the number or function of regulatory T cells (Astier, A. L. and Hafler, D. A. 2007, J. Neuroimmunol. 191(1-2):70-78), therefore, rendering T cell expressed proteins as interesting therapeutic targets for various immunological disorders.

Based on the above, there is a need in the art for therapeutic antibodies addressing specifically immune diseases associated with cell-mediated immunity, such as preferably T-cell mediated, but also B-cell mediated and monocyte mediated immune responses. Hence, improved therapeutic and, therefore, humanized ABPs targeting TIRC7 protein that address at least one of the problems as outlined above. Till today there is an unmet need to provide humanized variants of anti-TIRC7 antibodies.

BRIEF DESCRIPTION OF THE INVENTION

Generally, and by way of brief description, the main aspects of the present invention can be described as follows:

In a first aspect, the invention pertains to an Antigen Binding Protein (ABP) capable of binding to human T-cell immune response cDNA 7 (TIRC7), comprising:
(i) one, preferably two, heavy chain variable domain(s) comprising the CDRH1 region set forth in SEQ ID NO: 01 (GYTFITYV), the CDRH2 region set forth in SEQ ID NO: 02 (INPYNDGT), and the CDRH3 region set forth in SEQ ID NO: 03 (AEFITKTVGGSNWYLDV), or wherein in each case independently the CDRH1, CDRH2 and/or CDRH3 comprise a sequence having no more than three or two, preferably no more than one amino acid substitution(s), deletion(s) or insertion(s) compared to SEQ ID NO: 01, SEQ ID NO: 02, or SEQ ID NO: 03, respectively; and
(ii) one, preferably two, light chain variable domain(s) comprising the CDRL1 region set forth in SEQ ID NO: 05 (SSISY), the CDRL2 region set forth in SEQ ID NO: 06 (DTS), and the CDRL3 region set forth in SEQ ID NO: 07 (HQRSSYTWT) or wherein in each case independently CDRL1, CDRL2 and/or CDRL3 comprise a sequence having no more than three or two, preferably no more than one amino acid substitution(s), deletion(s) or insertion(s) compared to SEQ ID NO: 05, SEQ ID NO: 06, or SEQ ID NO: 07, respectively;
characterized in that, (i) said one, preferably two, heavy chain variable domain(s) and said one, preferably two, light chain variable domain(s), each comprise an antibody framework region having at least a portion of a human antibody consensus framework sequence; and/or (ii), the ABP of the first aspect is characterized in that, said heavy chain variable domain(s) comprise(s) the sequence set forth in SEQ ID NO: 29, with no more than ten amino acid substitution(s), insertion(s) or deletion(s) compared to this sequence.

In a second aspect, the invention pertains to an antigen binding protein (ABP) or an antigen-binding fragment thereof, capable of binding to TIRC7 and that is able to compete with the binding of an ABP of the first aspect to TIRC7.

In a third aspect, the invention pertains to an isolated nucleic acid comprising a sequence encoding for an ABP, or for an antigen binding fragment or a monomer, such as a heavy or light chain, of an ABP, of the first or second aspect, or encoding for a bispecific ABP according to the third aspect.

In a fourth aspect, the invention pertains to a nucleic acid construct (NAC) comprising a nucleic acid of the fourth aspect and one or more additional sequence features permitting the expression of the encoded antigen binding protein (ABP), or a component of said ABP (such as an antibody heavy chain or light chain) in a cell.

In a fifth aspect, the invention pertains to a recombinant host cell comprising a nucleic acid of the third aspect or a nucleic acid construct (NAC) according to the second aspect.

In a sixth aspect, the invention pertains to a pharmaceutical composition comprising: (i) an antigen binding protein (ABP) of the first or second aspect, or (ii) a nucleic acid of the third aspect or a NAC according the fourth, or (iii) a recombinant host cell according to the fifth aspect, and a pharmaceutically acceptable carrier, stabiliser and/or excipient.

In an seventh aspect, the invention pertains to a component for use in medicine, wherein the component is selected from the list consisting of: (i) an antigen binding protein (ABP) of the first or second aspect, or (ii) a nucleic acid of the third aspect or a NAC according the fourth aspect, or (iii) a recombinant host cell according to the fifth aspect and a pharmaceutical composition according of the sixth aspect.

In a ninth aspect, the invention pertains to a method of modulating a cell-mediated immune response in a human cell that expresses human TIRC7, comprising contacting said cell with a component recited in the seventh aspect, in the presence of an immune cell, such as a T-cell, thereby modulating, preferably inhibiting, the cell-mediated immune response.

In a tenth aspect, the invention pertains to a method for the prevention and/or treatment of a disorder associated with a pathological immune response in a subject, comprising the administration of a therapeutically effective amount of a component recited in the seventh aspect to the subject; and wherein the disorder associated with a pathological immune response is characterized by an expression of TIRC7 in cells associated with the said disorder.

DETAILED DESCRIPTION OF THE INVENTION

In the following, the elements of the invention will be described. These elements are listed with specific embodiments, however, it should be understood that they may be combined in any manner and in any number to create additional embodiments. The variously described examples and preferred embodiments should not be construed to limit the present invention to only the explicitly described embodiments. This description should be understood to support and encompass embodiments which combine two or more of the explicitly described embodiments or which combine the one or more of the explicitly described embodiments with any number of the disclosed and/or preferred elements. Furthermore, any permutations and combinations of all described elements in this application should be considered disclosed by the description of the present application unless the context indicates otherwise.

Compounds

In the first aspect, the invention pertains to present invention provides Antigen Binding Protein (ABP) capable of binding to human T-cell immune response cDNA 7 (TIRC7), comprising: one, preferably two, heavy chain variable domain(s) comprising the CDRH1 region set forth in SEQ ID NO: 01 (GYTFITYV), the CDRH2 region set forth in SEQ ID NO: 02 (INPYNDGT), and the CDRH3 region set forth in SEQ ID NO: 03 (AEFITKTVGGSNWYLDV), or wherein in each case independently the CDRH1, CDRH2 and/or CDRH3 comprise a sequence having no more than three or two, preferably no more than one amino acid substitution(s), deletion(s) or insertion(s) compared to SEQ ID NO: 01, SEQ ID NO: 02, or SEQ ID NO: 03, respectively; and one, preferably two, light chain variable domain (s) comprising the CDRL1 region set forth in SEQ ID NO: 05 (SSISY), the CDRL2 region set forth in SEQ ID NO: 06 (DTS), and the CDRL3 region set forth in SEQ ID NO: 07 (HQRSSYTWT) or wherein in each case independently CDRL1, CDRL2 and/or CDRL3 comprise a sequence having no more than three or two, preferably no more than one amino acid substitution(s), deletion(s) or insertion(s) compared to SEQ ID NO: 05, SEQ ID NO: 06, or SEQ ID NO: 07, respectively. Preferably, (i) the ABP of the invention may be characterized in that, said one, preferably two, heavy chain variable domain(s) and said one, preferably two, light chain variable domain(s), each comprise an antibody framework region having at least a portion of a human antibody consensus framework sequence; and/or (ii), the ABP of the first aspect is characterized in that, said heavy chain variable domain(s) comprise(s) the sequence set forth in SEQ ID NO: 29, with no more than ten amino acid substitution(s), insertion(s) or deletion(s) compared to this sequence.

The present invention also provides novel and highly affine and effective antibody constructs derived from a humanized version of the anti-TIRC antibody (a mouse anti TIRC7 antibody according to the sequence of the cAb1457 antibody disclosed in table 1 below), which has been humanized herein for the first time by CDR grafting, meaning that CDR regions of the murine parent antibody are inserted into the framework region of a heavy chain and a light chain of a human antibody. However, the humanized antibody had to be extensively changed in its sequence in the variable regions to obtain the ABP of the invention. The various changes including non-intuitive human to mouse back-mutations in the frame work 3 region were necessary to overcome various problems during the humanization process. Most surprisingly, the antibodies of the invention, although humanized, display improved target binding affinity over at least one order of magnitude. In principle any variable human light chain and/or variable heavy chain can serve as scaffold for the CDR grafting. In one illustrative example of a humanized antibody of the invention, the CDR regions of the light chain of the antibody (that means the CDR loops of SEQ ID NO: 5 to SEQ ID NO: 7) can be inserted into (the variable domain) of the human κ light sequence IGKV1-9 (Accession number Z00013), IGKV3-11 (Accession number X01668), IGKV6-21*01 or IGKV1-17*03 that is deposited in the IMGT/LIGM-database, see also Ichiyoshi Y., Zhou M., Casali P. A human anti-insulin IgG autoantibody apparently arises through clonal selection from an insulin-specific 'germ-line' natural antibody template. Analysis by V gene segment reassortment and site-directed mutagenesis' J. Immunol. 154(1):226-238 (1995). In another illustrative example of a humanized antibody of the invention, the CDR regions of the heavy chain of the antibody (that means the CDR loops of SEQ ID NO: 1 to SEQ ID NO: 3) can be included into the (variable domains) of the heavy chain sequence IGHV1-2 (Accession number X07448), IGHV7-4-1*02, or IGHV1-46*01 which is deposited in the IMGT/LIGM-database (See also Watson C. T., et al. Complete haplotype sequence of the human immunoglobulin heavy-chain variable, diversity, and joining genes and characterization of allelic and copy-number variation. Am. J. Hum. Genet. 92(4): 530-546 (2013).

The term "antigen binding protein" or "ABP" as used herein means a protein that specifically binds to a target antigen, such as to one or more epitope(s) displayed by or present on a target antigen. The antigen of the ABPs of the invention is TIRC7. Typically, an antigen binding protein is an antibody (or a fragment thereof); however other forms of antigen binding protein are also envisioned by the invention. For example, the ABP may be another (non-antibody) receptor protein derived from small and robust non-immunoglobulin "scaffolds", such as those equipped with binding functions for example by using methods of combinatorial protein design (Gebauer & Skerra, 2009; Curr Opin Chem Biol, 13:245). Particular examples of such non-antibody ABPs include: Affibody molecules based on the Z domain of Protein A (Nygren, 2008; FEBS J 275:2668); Affilins based on gamma-B crystalline and/or ubiquitin (Ebersbach et al, 2007; J Mo Biol, 372:172); Affimers based on cystatin (Johnson et al, 2012; Anal Chem 84:6553); Affitins based on Sac7d from Sulfolobus acidcaldarius (Krehenbrink et al, 2008; J Mol Biol 383:1058); Alphabodies based on a triple helix coiled coil (Desmet et al, 2014; Nature Comms 5: 5237); Anticalins based on lipocalins (Skerra, 2008; FEBS J 275:2677); Avimers based on A domains of various membrane receptors (Silverman et al, 2005; Nat Biotechnol 23: 1556); DARPins based on an ankyrin repeat motif (Strumpp et al, 2008; Drug Discov Today, 13: 695); Fynomers based on an SH3 domain of Fyn (Grabulovski et al, 2007; J Biol Chem 282:3196); Kunitz domain peptides based on Kunitz domains of various protease inhibitors (Nixon et al, Curr opin Drug Discov Devel, 9:261) and Centyrins and Monobodies based on a 10th type III domain of fibronectin (Diem et al., 2014; Protein Eng Des Sel 27: 419 doi: 10.1093/protein/gzu016; Koide & Koide, 2007; Methods Mol Biol 352:95).

The term "complementarity determining region" (or "CDR" or "hypervariable region"), as used herein, refers broadly to one or more of the hyper-variable or complementarily determining regions (CDRs) found in the variable regions of light or heavy chains of an antibody. See, for example: "IMGT", Lefranc et al, 20003, Dev Comp Immunol 27: 55; Honegger & Plückthun, 2001, J Mol Biol 309:657, Abhinandan & Martin, 2008, Mol Immunol 45: 3832, Kabat, et al. (1987): Sequences of Proteins of Immunological Interest National Institutes of Health, Bethesda, Md. These expressions include the hypervariable regions as defined by Kabat et al (1983) Sequences of Proteins of Immunological Interest, US Dept of Health and Human Services, or the hypervariable loops in 3-dimensional structures of antibodies (Chothia and Lesk, 1987; J Mol Biol 196: 901). The CDRs in each chain are held in close proximity by framework regions and, with the CDRs from the other chain, contribute to the formation of the antigen-binding site. Within the CDRs there are selected amino acids that have been described as the selectivity determining regions (SDRs) which represent the critical contact residues used by the CDR in the antibody-antigen interaction. (Kashmiri, 2005; Methods 36:25).

An "ABP" as used herein may carry one or more domains that have a sequence with at least about 60%, at least about 70%, at least about 75%, at least about 80%, at least about 85%, at least about 90%, at least about 92%, at least about 95%, at least about 96%, at least about 97%, at least about 98% or at least about 99% sequence identity with a corresponding naturally occurring domain of an immunoglobulin M, an immunoglobulin G, an immunoglobulin A, an immunoglobulin D or an immunoglobulin E. It is noted in this regard, the term "about" or "approximately" as used herein means within a deviation of 20%, such as within a deviation of 10% or within 5% of a given value or range.

The term "antibody" generally refers to a proteinaceous binding molecule that is based on an immunoglobulin. Typical examples of such an antibody are derivatives or functional fragments of an immunoglobulin which retain the binding specificity. Techniques for the production of antibodies and antibody fragments are well known in the art. The term "antibody" also includes immunoglobulins (Ig's) of different classes (i.e. IgA, IgG, IgM, IgD and IgE) and subclasses (such as IgG1, IgG2 etc.). As also mentioned above, illustrative examples of an antibody derivative or molecule include Fab fragments, F(ab')2, Fv fragments, single-chain Fv fragments (scFv), diabodies or domain antibodies (Holt L J et al., Trends Biotechnol. 21(11), 2003, 484-490). The definition of the term "antibody" thus also includes embodiments such as chimeric, single chain and humanized antibodies.

"Percent (%) sequence identity" as used in the present invention means the percentage of pair-wise identical residues—following homology alignment of a sequence of a polypeptide of the present invention with a sequence in question—with respect to the number of residues in the longer of these two sequences. Alignment for purposes of determining percent amino acid sequence identity can be achieved in various ways that are within the skill in the art, for instance, using publically available computer software such as BLAST, ALIGN, or Megalign (DNASTAR) software. Those skilled in the art can determine appropriate parameters for measuring alignment, including any algorithms needed to achieve maximum alignment over the full length of the sequences being compared. The same is true for nucleotide sequences disclosed herein.

An "immunoglobulin" when used herein, is typically a tetrameric glycosylated protein composed of two light (L) chains of approximately 25 kDa each and two heavy (H) chains of approximately 50 kDa each. Two types of light chain, termed lambda and kappa, may be found in immunoglobulins. Depending on the amino acid sequence of the constant domain of heavy chains, immunoglobulins can be assigned to five major classes: A, D, E, G, and M, and several of these may be further divided into subclasses (isotypes), e.g., IgG1, IgG2, IgG3, IgG4, IgA1, and IgA2. An IgM immunoglobulin consists of 5 of the basic heterotetramer unit along with an additional polypeptide called a J chain, and contains 10 antigen binding sites, while IgA immunoglobulins contain from 2-5 of the basic 4-chain units which can polymerize to form polyvalent assemblages in combination with the J chain. In the case of IgGs, the 4-chain unit is generally about 150,000 Daltons.

In the IgG class of immunoglobulins, there are several immunoglobulin domains in the heavy chain. By "immunoglobulin (Ig) domain" herein is meant a region of an immunoglobulin having a distinct tertiary structure. In the context of IgG antibodies, the IgG isotypes each have three CH regions: "CH1" refers to positions 118-220, "CH2" refers to positions 237-340, and "CH3" refers to positions 341-447 according to the EU index as in Kabat et al. By "hinge" or "hinge region" or "antibody hinge region" or "immunoglobulin hinge region" or "H" herein is meant the flexible polypeptide comprising the amino acids between the first and second constant domains of an antibody. Structurally, the IgG CH1 domain ends at EU position 220, and the IgG CH2 domain begins at residue EU position 237. Thus, for IgG the hinge is herein defined to include positions 221 (D221 in IgG1) to 236 (G236 in IgG1), wherein the numbering is according to the EU index as in Kabat et al. The constant heavy chain, as defined herein, refers to the N-terminus of the CH1 domain to the C-terminus of the CH3 domain, thus comprising positions 118-447, wherein numbering is according to the EU index.

The term "variable" refers to the portions of the immunoglobulin domains that exhibit variability in their sequence and that are involved in determining the specificity and binding affinity of a particular antibody (i.e., the "variable domain(s)"). Variability is not evenly distributed throughout the variable domains of antibodies; it is concentrated in sub-domains of each of the heavy and light chain variable regions. These sub-domains are called "hypervariable regions", "HVR," or "HV," or "complementarity determining regions" (CDRs). The more conserved (i.e., non-hypervariable) portions of the variable domains are called the "framework" regions (FR). The variable domains of naturally occurring heavy and light chains each include four FR regions, largely adopting a β-sheet configuration, connected by three hypervariable regions, which form loops connecting, and in some cases forming part of, the β-sheet structure. The hypervariable regions in each chain are held together in close proximity by the FR and, with the hypervariable regions from the other chain, contribute to the formation of the antigen-binding site (see Kabat et al., see below). Generally, naturally occurring immunoglobulins include six CDRs (see below); three in the VH (CDRH1, CDRH2, CDRH3), and three in the VL (CDRL1, CDRL2, CDRL3). In naturally occurring immunoglobulins, CDRH3 and CDRL3 display the most extensive diversity of the six CDRs, and CDRH3 in particular is believed to play a unique role in conferring fine specificity to immunoglobulins. The constant domains are not directly involved in antigen binding, but exhibit various effector functions, such as, for example, antibody-dependent, cell-mediated cytotoxicity and complement activation.

The terms "VH" (also referred to as VH) and "VL" (also referred to as VL) are used herein to refer to the heavy chain variable domain and light chain variable domain respectively of an immunoglobulin. An immunoglobulin light or heavy chain variable region consists of a "framework" region interrupted by three hypervariable regions. Thus, the term "hypervariable region" refers to the amino acid residues of an antibody which are responsible for antigen binding. The hypervariable region includes amino acid residues from a "Complementarity Determining Region" or "CDR". There are three heavy chains and three light chain CDRs (or CDR regions) in the variable portion of an immunoglobulin. Thus, "CDRs" as used herein refers to all three heavy chain CDRs (CDRH1, CDRH2 and CDRH3), or all three light chain CDRs (CDRL1, CDRL2 and CDRL3) or both all heavy and all light chain CDRs, if appropriate. Three CDRs make up the binding character of a light chain variable region and three make up the binding character of a heavy chain variable region. CDRs determine the antigen specificity of an immunoglobulin molecule and are separated by amino acid sequences that include scaffolding or framework regions. The exact definitional CDR boundaries and lengths are subject to different classification and numbering systems. The structure and protein folding of the antibody may mean that other residues are considered part of the antigen binding region and would be understood to be so by a skilled person. CDRs provide the majority of contact residues for the binding of the immunoglobulin to the antigen or epitope.

CDR3 is typically the greatest source of molecular diversity within the antibody-binding site. H3, for example, can be as short as two amino acid residues or greater than 26 amino acids. The subunit structures and three-dimensional configurations of different classes of immunoglobulins are well known in the art. For a review of the antibody structure, see Antibodies: A Laboratory Manual, Cold Spring Harbor Laboratory, eds. Harlow et al., 1988. One of skill in the art will recognize that each subunit structure, e.g., a CH, VH, CL, VL, CDR, FR structure, includes active fragments, e.g., the portion of the VH, VL, or CDR subunit binds to the antigen, i.e., the antigen-binding fragment, or, e.g., the portion of the CH subunit that binds to and/or activates, e.g., an Fc receptor and/or complement. The CDRs typically refer to the Kabat CDRs, as described in Sequences of Proteins of immunological Interest, US Department of Health and Human Services (1991), eds. Kabat et al. Another standard for characterizing the antigen binding site is to refer to the hypervariable loops as described by Chothia. See, e.g., Chothia, et al. (1992; J. Mol. Biol. 227:799-817; and Tomlinson et al. (1995) EMBO J. 14:4628-4638. Still another standard is the AbM definition used by Oxford Molecular's AbM antibody modelling software. See, generally, e.g., Protein Sequence and Structure Analysis of Antibody Variable Domains. In: Antibody Engineering Lab Manual (Ed.: Duebel, S. and Kontermann, R., Springer-Verlag, Heidelberg). Embodiments described with respect to Kabat CDRs can alternatively be implemented using similar described relationships with respect to Chothia hypervariable loops or to the AbM-defined loops. In context of the invention specific positions within the variable domain of an antibody are referred to according to the nomenclature of the IMGT database.

The corresponding immunoglobulin mu heavy chain, gamma heavy chain, alpha heavy chain, delta heavy chain, epsilon heavy chain, lambda light chain or kappa light chain may be of any species, such as a mammalian species, including a rodent species, an amphibian, e.g. of the subclass Lissamphibia that includes e.g. frogs, toads, salamanders or newts or an invertebrate species. Examples of mammals include, but are not limited to, a rat, a mouse, a rabbit, a guinea pig, a squirrel, a hamster, a hedgehog, a platypus, an American pika, an armadillo, a dog, a lemur, a goat, a pig, a cow, an opossum, a horse, a bat, a woodchuck, an orang-utan, a rhesus monkey, a woolly monkey, a macaque, a chimpanzee, a tamarin (saguinus oedipus), a marmoset or a human.

As mentioned herein an immunoglobulin is typically a glycoprotein that includes at least two heavy (H) chains and two light (L) chains linked by disulfide bonds, or an antigen binding portion thereof. Each heavy chain has a heavy chain variable region (abbreviated herein as VH) and a heavy chain constant region. In some embodiments the heavy chain constant region includes three domains, CH1, CH2 and CH3. Each light chain has a light chain variable region (abbreviated herein as VL) and a light chain constant region. The light chain constant region includes one domain, CL. The VH and VL regions can be further subdivided into regions of hypervariability, termed complementarity determining regions (CDR), interspersed with regions that are more conserved, termed framework regions (FR). The CDRs contain most of the residues responsible for specific interactions of the antibody with the antigen. Each VH and VL has three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an epitope of an antigen.

"Framework Region" or "FR" residues are those variable domain residues other than the hypervariable region. The sequences of the framework regions of different light or heavy chains are relatively conserved within a species. Thus, a "human framework region" is a framework region that is substantially identical (about 85% or more, usually 90-95% or more) to the framework region of a naturally occurring human immunoglobulin. The framework region of an antibody, that is the combined framework regions of the constituent light and heavy chains, serves to position and align the CDR's. The CDR's are primarily responsible for binding to an epitope of an antigen.

The terms "Fab", "Fab region", "Fab portion" or "Fab fragment" are understood to define a polypeptide that includes a VH, a CH1, a VL, and a CL immunoglobulin domain. Fab may refer to this region in isolation, or this region in the context of an ABP, as well as a full length immunoglobulin or immunoglobulin fragment. Typically, a Fab region contains an entire light chain of an antibody. A Fab region can be taken to define "an arm" of an immunoglobulin molecule. It contains the epitope-binding portion of that Ig. The Fab region of a naturally occurring immunoglobulin can be obtained as a proteolytic fragment by a papain-digestion. A "F(ab')2 portion" is the proteolytic fragment of a pepsin-digested immunoglobulin. A "Fab' portion" is the product resulting from reducing the disulfide bonds of an F(ab')2 portion. As used herein the terms "Fab", "Fab region", "Fab portion" or "Fab fragment" may further include a hinge region that defines the C-terminal end of the antibody arm. This hinge region corresponds to the hinge region found C-terminally of the CH1 domain within a full-length immunoglobulin at which the arms of the ABP can be taken to define a Y. The term hinge region is used in the art because an immunoglobulin has some flexibility at this region. A "Fab heavy chain" as used herein is understood as that portion or polypeptide of the Fab fragment that comprises a VH and a CH1, whereas a "Fab light chain" as used herein is understood as that portion or polypeptide of the Fab fragment that comprises a VL, and a CL.

The term "Fc region" or "Fc fragment" is used herein to define a C-terminal region of an immunoglobulin heavy chain, including native-sequence Fc regions and variant Fc regions. The Fc part mediates the effector function of antibodies, e.g. the activation of the complement system and of Fc-receptor bearing immune effector cells, such as NK cells. In human IgG molecules, the Fc region is generated by papain cleavage N-terminal to Cys226. Although the boundaries of the Fc region of an immunoglobulin heavy chain might vary, the human IgG heavy-chain Fc region is usually defined to stretch from an amino acid residue at position Cys226, or from Pro230, to the carboxyl-terminus thereof. The C-terminal lysine (residue 447 according to the EU numbering system) of the Fc region may be removed, for example, during production or purification of the ABP, or by recombinantly engineering the nucleic acid encoding a heavy chain of the ABP. Native-sequence Fc regions include mammalian, e.g. human or murine, IgG1, IgG2 (IgG2A, IgG2B), IgG3 and IgG4. The Fc region contains two or three constant domains, depending on the class of the antibody. In embodiments where the immunoglobulin is an IgG the Fc region has a CH2 and a CH3 domain. In certain preferred embodiments of the invention the Fc region of the ABP of the invention is mutated to reduce Fc receptor binding and thereby to reduce ADCC. Such preferred ABP of the invention are "Fc attenuated".

The term "single-chain variable fragment" (scFv) is used herein to define an antibody fragment, in which the variable regions of the heavy (VH) and light chains (VL) of a immunoglobulin are fused together, by a short linker peptide of ten to about 25 amino acids. The linker is usually rich in glycine for flexibility, as well as serine or threonine for solubility, and can either connect the N-terminus of the VH with the C-terminus of the VL, or connect the N-terminus of the VL with the C-terminus of the VH. The scFv fragment retains a specific antigen binding site but lacks constant domains of immunoglobulins.

The term "epitope", also known as the "antigenic determinant", refers to the portion of an antigen to which an antibody or T-cell receptor specifically binds, thereby forming a complex. Thus, the term "epitope" includes any molecule or protein determinant capable of specific binding to an immunoglobulin or T-cell receptor. The binding site(s) (paratope) of an ABP described herein may specifically bind to/interact with conformational or continuous epitopes, which are unique for the target structure. Epitopic determinants usually consist of chemically active surface groupings of molecules such as amino acids or sugar side chains and usually have specific three dimensional structural characteristics, as well as specific charge characteristics. In some embodiments, epitope determinants include chemically active surface groupings of molecules such as amino acids, sugar side chains, phosphoryl, or sulfonyl, and, in certain embodiments, may have specific three-dimensional structural characteristics, and/or specific charge characteristics. With regard to polypeptide antigens a conformational or discontinuous epitope is characterized by the presence of two or more discrete amino acid residues, separated in the primary sequence, but assembling to a consistent structure on the surface of the molecule when the polypeptide folds into the native protein/antigen (Sela, M., Science (1969) 166, 1365-1374; Laver, W. G., et al. Cell (1990) 61, 553-556). The two or more discrete amino acid residues contributing to the epitope may be present on separate sections of one or more polypeptide chain(s). These residues come together on the surface of the molecule when the polypeptide chain(s) fold(s) into a three-dimensional structure to constitute the epitope. In contrast, a continuous or linear epitope consists of two or more discrete amino acid residues, which are present in a single linear segment of a polypeptide chain.

The term "specific" in this context, or "specifically binding", also used as "directed to", means in accordance with this invention that the antibody or immune receptor fragment is capable of specifically interacting with and/or binding to a specific antigen or ligand or a set of specific antigens or ligands but does not essentially bind to other antigens or ligands. Such binding may be exemplified by the specificity of a "lock-and-key-principle". Antibodies are said to "bind to the same epitope" if the antibodies cross-compete so that only one antibody can bind to the epitope at a given point of time, i.e. one antibody prevents the binding or modulating effect of the other.

The term "isolated ABP" as used herein refers to an ABP that has been identified and separated and/or recovered from a component of its natural environment. Contaminant components of its natural environment are matter that would interfere with diagnostic or therapeutic uses for the antibody, and may include enzymes, hormones, and other proteinaceous or non-proteinaceous solutes. In some embodiments the ABP is purified to greater than 95% by weight of antibody as determined by the Lowry method, such as more than 99% by weight. In some embodiments the antibody is purified to homogeneity as judged by SDS-PAGE under reducing or nonreducing conditions using Coomassie blue or, preferably, silver stain. An isolated ABP may in some embodiments be present within recombinant cells with one or more component(s) of the antibody's natural environment not being present. Typically an isolated antibody is prepared by at least one purification step.

A (recombinant) ABP of the invention that binds to TIRC7 and/or TIRC7-expressing immune cells as described herein may be used in any suitable recombinant antibody format, for example as an Fv fragment, a scFv, a univalent antibody lacking a hinge region, a minibody, a Fab fragment, a Fab' fragment, a F(ab')2 fragment. A recombinant ABP of the invention may also comprise constant domains (regions) such a human IgG constant region, a CH1 domain (as Fab fragments do) and/or an entire Fc region. Alternatively, an ABP of the invention may also be a full length (whole) antibody, preferably in a bispecific format.

There are a number of possible mechanisms by which antibodies mediate cellular effects, including anti-proliferation via blockage of needed signalling pathways, mimicking of receptor-ligand interactions, or blocking a ligand-receptor interaction, modulating antigen turnover or internalisation. TIRC7-antibody efficacy may be due to a combination of these mechanisms, and their relative importance in clinical therapy for autoimmunity appears to be disease dependent.

An ABP of the invention is capable of binding to human TIRC7. The term "T-cell immune response cDNA 7" or "TIRC7" are used interchangeably herein, and include variants, isoforms and species homologs of human TIRC7. Human TIRC7 protein has the UniProt (www.uniprot.org) accession number Q13488 (version of 26 Sep. 2019). Additional synonyms of the protein include V-type proton ATPase 116 kDa subunit a isoform 3. The gene for human TIRC7 (also named TCIRG1) is located 11q13.2 and has the HGNC accession of HGNC: 11647 (www.genenames.org—HGNC version of Sep. 26, 2019). However, antibodies of the invention may, in certain preferred cases, not cross-react with TIRC7 from species other than human.

To determine the epitope, standard epitope mapping methods known in the art may be used. For example, soluble protein, fragments (peptides) of TIRC7 (e.g. synthetic peptides) that bind the antibody can be used to determine whether a candidate antibody or antigen-binding fragment thereof binds the same epitope. For linear epitopes, overlapping peptides of a defined length (e.g., 8 or more amino acids) are synthesized. The peptides can be offset by 1 amino acid, such that a series of peptides covering every 8 amino acid fragment of the TIRC7 protein sequence are prepared. Fewer peptides can be prepared by using larger offsets, e.g., 2 or 3 amino acids. In addition, longer peptides (e.g., 9-, 10- or 11-mers) can be synthesized. Binding of peptides to antibodies or antigen-binding fragments can be determined using standard methodologies including surface plasmon resonance (BIACORE) and ELISA assays. For examination of conformational epitopes, larger TIRC7 fragments can be used. Other methods that use mass spectrometry to define conformational epitopes have been described and can be (see, e.g., Baerga-Ortiz et al., Protein Science 11:1300-1308, 2002 and references cited therein). Still other methods for epitope determination are provided in standard laboratory reference works, such as Unit 6.8 ("Phage Display Selection and Analysis of B-cell Epitopes") and Unit 9.8 ("Identification of Antigenic Determinants Using Synthetic Peptide Combinatorial Libraries") of Current Protocols in Immunology, Coligan et al., eds., John Wiley & Sons. Epitopes can be confirmed by introducing point mutations or deletions into a known epitope, and then testing binding with one or more antibodies or antigen-binding fragments to determine which mutations reduce binding of the antibodies or antigen-binding fragments.

In other embodiments, the ABP that binds to TIRC7 that is a modulator of TIRC7 function may instead or also:
  inhibit, impair, reduce or reverse a cell-mediated immune response (eg in an in-vitro assay or in a subject, such as one in need thereof); and/or
  inhibit, impair, reduce or reverse a humoral immunity (eg in an in-vitro assay or in a subject, such as one in need thereof).

The term "cell-mediated immune response", as used herein, may include, but is not limited to, a response in a host organism involving, utilising, and/or promoting any one or combinations of T cell maturation, proliferation, activation, migration, infiltration and/or differentiation, and/or the activation/modulation/migration/infiltration of a macrophage, a natural killer cell, a T lymphocyte (or T cell), a helper T lymphocyte, a memory T lymphocyte, and/or a cytotoxic T lymphocyte (CTL), and/or the production, release, and/or effect of one or more cell-secretable or cell-secreted factor such as a cytokine or autocoid (in particular a pro-inflammatory cytokine), and/or one or more components of any of such processes (such as a cytokine or autocoid, particular a pro-inflammatory cytokine). The term "cell-mediated immune response," as used herein, may include a cellular response involving a genetically engineered, in-vitro cultured, autologous, heterologous, modified, and/or transferred T lymphocyte, or it may include a cell-secretable or cell-secreted factor (such as a cytokine or autocoid, in particular a pro-inflammatory cytokine) produced by genetic engineering. A cell-mediated immune response is preferably a pathological immune response, having the potential to harm its hosts.

In certain embodiments, the cell mediating the cell-mediated immune response may be mediated by a cell, such as an immune cell, capable of secreting (eg secreting) pro-inflammatory cytokine, such as one selected from the group consisting of: interleukin-1 (IL-1), IL-2, IL-12, IL-17 and IL-18, tumour necrosis factor (TNF) [alpha], interferon gamma (IFN-gamma), and granulocyte-macrophage colony stimulating factor.

In certain embodiments, the cell-mediated immune response can be mediated by a pro-inflammatory cytokine-secreting cell, such as a lymphocyte (eg a T cell), in particular a cytotoxic T lymphocyte (CTL).

In particular embodiments, the cell-mediated immune response may induce killing of autologous cells in context of an autoimmune disease.

The term "humoral immunity" (or "humoral immune response") will also be readily understood by the person of ordinary skill, and includes an aspect of an immune response that is mediated by macromolecules found in extracellular fluids such as secreted antibodies, complement proteins, and certain antimicrobial peptides. Humoral immunity is so named because it involves substances found in the humors, or body fluids. Its aspects involving antibodies can be termed antibody-mediated immunity.

The ABPs of the invention in some preferred embodiments comprise in their first antigen binding domain a heavy chain variable region comprising human framework regions of the allele IGHV1-2 (Accession number X07448), IGHV7-4-1*02, or IGHV1-46*01, and preferably is IGHV1-2. Within the light chains the ABPs of the invention comprise variable regions having a framework of IGKV1-9 (Accession number Z00013), IGKV3-11 (Accession number X01668), IGKV6-21*01 or IGKV1-17*03, and preferably is. However, it is one achievement of the present invention to provide mutated variants of a humanized anti-TIRC7 antibody with improved binding affinity, avidity and/or activity for the recruitment and activation of lymphocytes and lymphocytes mediated anti-tumor cytotoxicity, in particular of T-cell mediated immunity. Therefore, in accordance with the present invention it is preferred that the ABP of the invention in the TIRC7 specific first antigen binding domain, the ABP comprises the heavy chain variable regions with mutation(s) at one or more positions selected from 78, 80, 82, and/or 85, according to the IMGT numbering. Most preferably the mutations are any one or any combination, or all of, 78L, 80S, 82K, and/or 85S, according to the IMGT numbering.

In some preferred embodiments of the invention an ABP is provided wherein the heavy chain variable region comprises the amino acid sequence having a sequence identity of at least 95% to an amino acid sequence selected from SEQ ID NOs: 9, 11, 13, 15, 17, 19, 21, 23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, or 85, or, in each case independently, optionally with no more than ten, nine, eight, seven, six, five, four, preferably no more than three, two or one, amino acid substitution(s), insertion(s) or deletion(s) compared to these sequences; and/or wherein the light chain variable region comprises the amino acid sequence having a sequence identity of at least 95% to the amino acid sequence selected from SEQ ID NOs: 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, or 86, or, in each case independently, optionally with no more than ten, nine, eight, seven, six, five, four, preferably no more than three, two or one, amino acid substitution(s), insertion (s) or deletion(s) compared to these sequences.

In some embodiments of the invention the heavy chain variable region of the ABP comprises an amino acid sequence having a sequence identity of at least 85%, at least 90%, or at least 95% to the amino acid sequence set forth in SEQ ID NO: 11, and the light chain variable region comprises an amino acid sequence having a sequence identity of at least 95% to the amino acid sequence set forth in SEQ ID NO: 12. Preferably the heavy chain variable region of the ABP comprises an amino acid sequence set forth in SEQ ID NO: 11, or optionally with no more than ten, nine, eight, seven, six, five, four, preferably no more than three, two or one, amino acid substitution(s), insertion(s) or deletion(s) compared to this sequence; and the light chain variable region comprises an amino acid set forth in SEQ ID NO: 12 or optionally with no more than ten, nine, eight, seven, six, five, four, preferably no more than three, two or one, amino acid substitution(s), insertion(s) or deletion(s) compared to this sequence.

In some preferred embodiments of the invention an ABP is provided wherein the heavy chain variable region comprises the amino acid sequence having a sequence identity of at least 95%, preferably 100%, to an amino acid sequence selected from SEQ ID NOs: 25, or optionally with no more than ten, nine, eight, seven, six, five, four, preferably no more than three, two or one, amino acid substitution(s), insertion(s) or deletion(s) compared to this sequence; and wherein the light chain variable region comprises the amino acid sequence having a sequence identity of at least 95% to the amino acid sequence selected from SEQ ID NOs: 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, or 86, or, in each case independently, optionally with no more than ten, nine, eight, seven, six, five, four, preferably no more than three, two or one, amino acid substitution(s), insertion(s) or deletion(s) compared to these sequences.

In some embodiments of the invention the heavy chain variable region of the ABP comprises an amino acid sequence having a sequence identity of at least 85%, at least 90%, or at least 95% to the amino acid sequence set forth in SEQ ID NO: 25, and the light chain variable region comprises an amino acid sequence having a sequence identity of at least 95% to the amino acid sequence set forth in SEQ ID NO: 26. Preferably the heavy chain variable region of the ABP comprises an amino acid sequence set forth in SEQ ID NO: 25, or optionally with no more than ten, nine, eight, seven, six, five, four, preferably no more than three, two or one, amino acid substitution(s), insertion(s) or deletion(s) compared to this sequence; and the light chain variable region comprises an amino acid set forth in SEQ ID NO: 26 or optionally with no more than ten, nine, eight, seven, six, five, four, preferably no more than three, two or one, amino acid substitution(s), insertion(s) or deletion(s) compared to this sequence.

In some embodiments of the invention the heavy chain variable region of the ABP comprises an amino acid sequence having a sequence identity of at least 85%, at least 90%, or at least 95% to the amino acid sequence set forth in SEQ ID NO: 27, and the light chain variable region comprises an amino acid sequence having a sequence identity of at least 95% to the amino acid sequence set forth in SEQ ID NO: 28. Preferably the heavy chain variable region of the ABP comprises an amino acid sequence set forth in SEQ ID NO: 27, or optionally with no more than ten, nine, eight, seven, six, five, four, preferably no more than three, two or one, amino acid substitution(s), insertion(s) or deletion(s) compared to this sequence; and the light chain variable region comprises an amino acid set forth in SEQ ID NO: 28 or optionally with no more than ten, nine, eight, seven, six, five, four, preferably no more than three, two or one, amino acid substitution(s), insertion(s) or deletion(s) compared to this sequence.

In some embodiments of the invention the heavy chain variable region of the ABP comprises an amino acid sequence having a sequence identity of at least 85%, at least 90%, or at least 95% to the amino acid sequence set forth in SEQ ID NO: 29, and the light chain variable region comprises an amino acid sequence having a sequence identity of at least 95% to the amino acid sequence set forth in SEQ ID NO: 30. Preferably the heavy chain variable region of the ABP comprises an amino acid sequence set forth in SEQ ID NO: 29, or optionally with no more than ten, nine, eight, seven, six, five, four, preferably no more than three, two or one, amino acid substitution(s), insertion(s) or deletion(s) compared to this sequence; and the light chain variable region comprises an amino acid set forth in SEQ ID NO: 30 or optionally with no more than ten, nine, eight, seven, six, five, four, preferably no more than three, two or one, amino acid substitution(s), insertion(s) or deletion(s) compared to this sequence.

In some embodiments of the invention the heavy chain variable region of the ABP comprises an amino acid sequence having a sequence identity of at least 85%, at least 90%, or at least 95% to the amino acid sequence set forth in SEQ ID NO: 31, and the light chain variable region comprises an amino acid sequence having a sequence identity of at least 95% to the amino acid sequence set forth in SEQ ID NO: 32. Preferably the heavy chain variable region of the ABP comprises an amino acid sequence set forth in SEQ ID NO: 31, or optionally with no more than ten, nine, eight, seven, six, five, four, preferably no more than three, two or one, amino acid substitution(s), insertion(s) or deletion(s) compared to this sequence; and the light chain variable region comprises an amino acid set forth in SEQ ID NO: 32 or optionally with no more than ten, nine, eight, seven, six, five, four, preferably no more than three, two or one, amino acid substitution(s), insertion(s) or deletion(s) compared to this sequence.

In some particular embodiments of the invention, the ABP is preferred wherein the heavy chain variable region comprises 78L, wherein the numbering is according to the IMGT system.

An ABP in accordance with the invention in some embodiments may be an ABP comprising at least one antibody heavy chain constant sequence having an amino acid sequence with at least 70%, 80%, 90%, 95%, 96%, 97%, 98%, or 99%, preferably 100%, sequence identity to, or having no more than twenty, fifteen, ten, nine, eight, seven, six, four, preferably three or two, preferably no more than one amino acid substitution(s), deletion(s) or insertion(s) compared to, a human antibody heavy chain constant sequence. Such antibody may have one or more of CH1, CH2 or CH3 regions.

In some embodiments the ABP is an antibody, or an antigen binding fragment thereof, composed of at least one, preferably two, antibody heavy chain sequence(s), and at least one, preferably two, antibody light chain sequence(s), wherein said antibody heavy chain sequence(s) and the antibody light chain sequence(s) comprise(s) each a variable region sequences in one of the following combinations:

|  | Heavy Chain Variable Region (SEQ ID NO) | Light Chain Variable Region (SEQ ID NO) |
| --- | --- | --- |
| cAb1458 | 9 | 10 |
| cAb1459 | 11 | 12 |
| cAb1460 | 13 | 14 |
| cAb1461 | 15 | 16 |
| cAb1462 | 17 | 18 |
| cAb1463 | 19 | 20 |
| cAb1464 | 21 | 22 |
| cAb1465 | 23 | 24 |
| cAb1466 | 25 | 26 |
| cAb1467 | 27 | 28 |
| cAb1468 | 29 | 30 |
| cAb1469 | 31 | 32 |
| cAb1901 | 33 | 34 |
| cAb2021 | 35 | 36 |
| cAb2022 | 37 | 38 |
| cAb2023 | 39 | 40 |
| cAb2024 | 41 | 42 |
| cAb2287 | 43 | 44 |
| cAb2288 | 45 | 46 |
| cAb2712 | 47 | 48 |
| cAb2713 | 49 | 50 |
| cAb2714 | 51 | 52 |
| cAb2715 | 53 | 54 |
| cAb3458 | 55 | 56 |
| cAb3459 | 57 | 58 |
| cAb3460 | 59 | 60 |
| cAb3461 | 61 | 62 |
| cAb3462 | 63 | 64 |
| cAb3463 | 65 | 66 |
| cAb3464 | 67 | 68 |
| cAb3465 | 69 | 70 |
| cAb3466 | 71 | 72 |

-continued

|  | Heavy Chain Variable Region (SEQ ID NO) | Light Chain Variable Region (SEQ ID NO) |
|---|---|---|
| cAb3467 | 73 | 74 |
| cAb3468 | 75 | 76 |
| cAb3469 | 77 | 78 |
| cAb3470 | 79 | 80 |
| cAb3471 | 81 | 82 |
| cAb3472 | 83 | 84 |
| cAb3473 | 85 | 86 |

Further, some embodiments of the invention pertain to ABPs that compete with an ABP of the invention, for binding to TIRC7, e.g. to competitively inhibit binding of an inventive antibody to TIRC7. To determine competitive inhibition, a variety of assays known to one of ordinary skill in the art can be employed. For example, cross-competition assays can be used to determine if an antibody or antigen-binding fragment thereof competitively inhibits binding to TIRC7 by another antibody or antigen-binding fragment thereof. These include cell-based methods employing flow cytometry or solid phase binding analysis. Other assays that evaluate the ability of antibodies or antigen-binding fragments thereof to cross-compete for TIRC7 molecules that are not expressed on the surface of cells, in solid phase or in solution phase, also can be used.

In some embodiments, an ABP of the invention may bind to (e.g., via one or more epitope(s) displayed by one or more extracellular domain(s) of) TIRC7 or a paralogue, orthologue or other variant thereof, or in particular, may bind to an extracellular domain of TIRC7 with a $K_D$ that is less than 20 nM, such as less than about 10 nM, 5 nM or 2 nM (in particular, less than about 1 nM). In a preferred embodiment, the ABP of the invention will bind (e.g. said epitope(s) of) said TIRC7 or said domain, or variant thereof, with a KD that is less than 100 pM. In a more preferred embodiment, the ABP of the invention will bind said TIRC7 or said extracellular domain, or variant thereof, with a $K_D$ that is less than 50 pM. In a most preferred embodiment, the ABP of the invention will bind said TIRC7 or said domain, or variant thereof, with a KD that is less than 30 pM, and in certain embodiments even less than 10 pM. The $K_D$ preferably is as measured by surface plasmon resonance.

The term "extracellular domain" ("ECD" or "EC" domain) as used herein refers to the region or regions of the protein which are exposed to the extracellular space and which are typically responsible for ligand or antibody binding. TIRC7 is a 7 transmembrane domain protei, with an intracellular N-terminus. A larger extracellular loop between transmembrane domains 5 and 6, and an extracellular flexible C terminus. A preferred extracellular domain to which an ABP of the invention binds is a region located in the protein loop between the fifth and the sixth transmembrane domain of TIRC7.

The term "$K_D$", as used herein, is intended to refer to the dissociation constant, which is obtained from the ratio of Kd to Ka (i. e., Kd/Ka) and is expressed as a molar concentration (M). $K_D$ values for antibodies can be determined using methods well established in the art such as plasmon resonance (BIAcore®), ELISA and KINEXA. A preferred method for determining the $K_D$ of an antibody is by using surface plasmon resonance, preferably using a biosensor system such as a BIAcore® system or by ELISA. "$K_a$" (or "K-assoc"), as used herein, refers broadly to the association rate of a particular antibody-antigen interaction, whereas the term "$K_d$" (or "K-diss"), as used herein, refers to the dissociation rate of a particular antibody-antigen interaction.

An ABP according to the invention may have two chains, a shorter chain, which may in some embodiments be a light chain, and a main chain, which may in some embodiments also be addressed as the heavy chain. The ABP is usually a dimer of these two chains.

An ABP of the invention may preferably be a bispecific ABP. The bispecific ABP may comprise (i) a variable region comprising a heavy chain variable domain and a light chain variable domain as defined in any one of the preceding claims, wherein said variable region comprises a first antigen binding domain capable of binding to human TIRC7 and (ii) a heavy chain variable region and a light chain variable region of an ABP comprising a second antigen binding domain. It is understood that the binding site for TIRC7 is preferably a binding site of a TIRC7-binding antibody of the invention described herein.

A "bispecific" or "bifunctional" ABP is an ABP that has two different epitope/antigen binding domains (or "sites"), and accordingly has binding specificities for two different target epitopes. These two epitopes may be epitopes of the same antigen or, as preferred in the present invention, of different antigens, such as the different antigens TIRC7 and CD3, or TIRC7 and TCR, preferably wherein these antigens are human.

A "bispecific ABP", may be an ABP that binds one antigen or epitope with one of two or more binding arms, defined by a first pair of heavy and light chain or of main and shorter/smaller chain, and binds a different antigen or epitope on a second arm, defined by a second pair of heavy and light chain or of main and smaller chain. Such an embodiment of a bispecific ABP has two distinct antigen binding arms, in both specificity and CDR sequences. Typically, a bispecific ABP is monovalent for each antigen it binds to, that is, it binds with only one arm to the respective antigen or epitope. However, bispecific antibodies can also be dimerized or multimerized, which is preferred in context of the present invention. A bispecific antibody may be a hybrid ABP, which may have a first binding region that is defined by a first light chain variable region and a first heavy chain variable region, and a second binding region that is defined by a second light chain variable region and a second heavy chain variable region. It is envisioned by the invention that one of these binding regions may be defined by a heavy/light chain pair. In the context of the present invention the bispecific ABP may have a first binding site, defined by variable regions of a main chain and a smaller chain, and a second, different binding site defined by a variable region of a scFv fragment that is included in the main chain of the ABP.

Methods of making a bispecific ABP are known in the art, e.g. chemical conjugation of two different monoclonal antibodies or for example, also chemical conjugation of two antibody fragments, for example, of two Fab fragments. Alternatively, bispecific ABPs are made by quadroma technology, that is by fusion of the hybridomas producing the parental antibodies. Because of the random assortment of H and L chains, a potential mixture of ten different antibody structures are produced of which only one has the desired binding specificity.

The bispecific ABP of the invention can act as a monoclonal antibody (mAb) with respect to each target. In some embodiments the antibody is chimeric, humanized or fully human. A bispecific ABP may for example be a bispecific tandem single chain Fv, a bispecific Fab2, or a bispecific diabody.

It is noted in this context that it is within the scope of the invention that an ABP may comprise one or more mutated amino acid residues. The terms "mutated", "mutant" and "mutation" in reference to a nucleic acid or a polypeptide refers to the exchange, deletion, or insertion of one or more nucleotides or amino acids, respectively, compared to the "naturally" or "parent" (if a reference is provided) occurring nucleic acid or polypeptide, i.e. to a reference sequence that can be taken to define the wild-type. For example, the variable domains of the ABPs of the invention as obtained by extensive mutational alteration of the parent 4G8 molecule and as described herein may be taken as a parent sequence.

It is understood in this regard that the term "position", when used in accordance with the present invention, means the position of an amino acid within an amino acid sequence depicted herein. This position may be indicated relative to a resembling native sequence, e.g. a sequence of a naturally occurring IgG domain or chain. The term "corresponding" as used herein also includes that a position is not necessarily, or not only, determined by the number of the preceding nucleotides/amino acids. Thus, the position of a given amino acid in accordance with the present invention which may be substituted may vary due to deletion or addition of amino acids elsewhere in the antibody chain.

Thus, under a "corresponding position" in accordance with the present invention it is to be understood that amino acids may differ in the indicated number but may still have similar neighbouring amino acids. Said amino acids which may be exchanged, deleted or added are also encompassed by the term "corresponding position". In order to determine whether an amino acid residue in a given amino acid sequence corresponds to a certain position in the amino acid sequence of a naturally occurring immunoglobulin domain or chain, the skilled person can use means and methods well-known in the art, e.g., alignments, either manually or by using computer programs such as BLAST2.0, which stands for Basic Local Alignment Search Tool or ClustalW or any other suitable program which is suitable to generate sequence alignments.

In some embodiments a substitution (or replacement) is a conservative substitution. Conservative substitutions are generally the following substitutions, listed according to the amino acid to be mutated, each followed by one or more replacement(s) that can be taken to be conservative: Ala→Gly, Ser, Val; Arg→Lys; Asn→Gln, His; Asp→Glu; Cys→Ser; Gln→Asn; Glu→Asp; Gly→Ala; His→Arg, Asn, Gln; Ile→Leu, Val; Leu→Ile, Val; Lys→Arg, Gln, Glu; Met→Leu, Tyr, Ile; Phe→Met, Leu, Tyr; Ser→Thr; Thr→Ser; Trp→Tyr; Tyr→Trp, Phe; Val→Ile, Leu. Other substitutions are also permissible and can be determined empirically or in accord with other known conservative or non-conservative substitutions. As a further orientation, the following eight groups each contain amino acids that can typically be taken to define conservative substitutions for one another:

Alanine (Ala), Glycine (Gly);
Aspartic acid (Asp), Glutamic acid (Glu);
Asparagine (Asn), Glutamine (Gln);
Arginine (Arg), Lysine (Lys);
Isoleucine (Ile), Leucine (Leu), Methionine (Met), Valine (Val);
Phenylalanine (Phe), Tyrosine (Tyr), Tryptophan (Trp);
Serine (Ser), Threonine (Thr); and
Cysteine (Cys), Methionine (Met)

If such substitutions result in a change in biological activity, then more substantial changes, such as the following, or as further described below in reference to amino acid classes, may be introduced and the products screened for a desired characteristic. Examples of such more substantial changes are: Ala→Leu, Ile; Arg→Gln; Asn→Asp, Lys, Arg, His; Asp→Asn; Cys→Ala; Gln→Glu; Glu→Gln; His→Lys; Ile→Met, Ala, Phe; Leu→Ala, Met, Norleucine; Lys→Asn; Met→Phe; Phe→Val, Ile, Ala; Trp→Phe; Tyr→Thr, Ser; Val→Met, Phe, Ala.

In some embodiments an ABP according to the invention includes one or more amino acid residues, including two, three, four, five, six, seven, eight, nine, ten, eleven, twelve, thirteen, fourteen, fifteen, sixteen, seventeen or eighteen amino acid residues, that are mutated to prevent dimerization via cysteine residues or to modulate Fc-function (see above). In some of these embodiments one or more amino acid residue(s) of the CH2 domain and/or of the hinge region that is able to mediate binding to Fc receptors are mutated. If present, the one or more amino acid residue(s) able to mediate binding to Fc receptors may be an amino acid residue that is able to activate antibody dependent cellular cytotoxicity (ADCC) or complement-mediated cytotoxicity (CDC). In some embodiments a respective amino acid residue capable of mediating binding to Fc receptors is substituted by another amino acid, generally when comparing the sequence to the sequence of a corresponding naturally occurring domain in an immunoglobulin, such as an IgG. In some embodiments such an amino acid residue capable of mediating binding to Fc receptors is deleted, generally relative to the sequence of a corresponding naturally occurring domain in an immunoglobulin, such as an IgG.

Where required, a substitution or deletion of amino acid residues, as explained above, may be carried out to this effect. Suitable mutations can be taken from Armour et al. (Eur. J. Immunol. [1999]29, 2613-2624), for example. Further suitable positions for mutations to a sequence of an antibody chain can be taken from the crystal structure data published on the complex between FcγRIII and the human IgG1 Fc fragment (Sondermann et al., Nature [2000]406, 267-273). In addition to measuring the binding affinity as described above in order to assess the level of "Fc attenuation" or loss of binding affinity, it is also possible to functionally assess the (lack of) ability to mediate binding to an Fc-receptor. In the case of ABPs which bind CD3 as one target, it is for example possible to assess the binding through the mitogenity of such CD3 binding ABPs on cells. The mitogenity is mediated by binding of CD3 antibodies to the Fc-receptors on accessory cells, such as monocytes. If an ABP of the invention that has one binding site for CD3 does not show any mitogenic effect whereas the parent monoclonal anti-CD3 antibody that has a functional Fc part induces strong mitosis in T cells, it is clear that, due to the lack of mitosis, the ABP of the invention lacks the ability for Fc binding and can thus be considered as a "Fc knock-out" molecule. Illustrative examples of a method of assessing anti-CD3 mediated mitogenity have been described by Davis, Vida & Lipsky (J. Immunol (1986) 137, 3758), and by Ceuppens, J L, & van Vaeck, F, (see J. Immunol. (1987) 139, 4067, or Cell. Immunol. (1989) 118, 136). Further illustrative suitable examples of an assay for assessing mitogenity of an antibody have been described by Rosenthal-Allieri et al. (Rosenthal-Allieri M A, Ticcioni M, Deckert M, Breittmeyer J P, Rochet N, Rouleaux M, and Senik A, Bernerd A, Cell Immunol. 1995 163(1):88-95) and Grosse-Hovest et al. (Grosse-Hovest L, Hartlapp I, Marwan W, Brem G, Rammensee H-G, and Jung G, Eur J Immunol. [2003] May; 33(5):1334-1340). In addition, the lack of Fc binding can be assessed by the ability of an ABP of the invention to mediate one or more of the well-known effector functions of the Fc part.

As noted above, substitutions or deletions of cysteine residues may be carried out in order to introduce or to remove one or more disulfide bonds, including introducing or removing a potential or a previously existing disulfide bond. Thereby linkage between a main chain and a chain of lower weight/shorter length of an ABP according to the invention may be controlled including established, strengthened or abolished. By introducing or removing one or more cysteine residues a disulfide bridge may be introduced or removed. As an illustrative example, a tetrameric ABP according to the invention generally has one or more disulfide bonds that link two dimeric ABPs. One such disulfide bond is typically defined by a cysteine in the main chain of a first dimeric ABP and a cysteine in the hinge region of a second dimeric ABP. In this regard, in some embodiments an antibody according to the invention may include an amino acid substitution of a native cysteine residue at positions 226 and/or 229, relative to the sequence of a human IgG immunoglobulin according to the Kabat numbering [EU-Index], by another amino acid residue.

Substitutions or deletions of amino acid residues such as arginine, asparagine, serine, threonine or tyrosine residues may also be carried out to modify the glycosylation pattern of an antibody. As an illustrative example, an IgG molecule has a single N-linked biantennary carbohydrate at Asn297 of the CH2 domain. For IgG from either serum or produced ex vivo in hybridomas or engineered cells, the IgG are heterogeneous with respect to the Asn297 linked carbohydrate. For human IgG, the core oligosaccharide typically consists of GlcNAc2Man3GlcNAc, with differing numbers of outer residues.

As indicated, besides binding of antigens/epitopes, an immunoglobulin is known to have further "effector functions", biological activities attributable to the Fc region (a native sequence Fc region or amino acid sequence variant Fc region) of an immunoglobulin, and vary with the immunoglobulin isotype. Examples of antibody effector functions include: C1q binding and complement dependent cytotoxicity (CDC); Fc receptor binding; antibody-dependent cell-mediated cytotoxicity (ADCC); phagocytosis; down regulation of cell surface receptors (e.g., B cell receptors); and B cell activation. Exerting effector functions of an antibody generally involves recruiting effector cells. Several immunoglobulin effector functions are mediated by Fc receptors (FcRs), which bind the Fc region of an antibody. FcRs are defined by their specificity for immunoglobulin isotypes; Fc receptors for IgG antibodies are referred to as FcγR, for IgE as FcεR, for IgA as FcαR and so on. Any of these effector functions (or the loss of such effector functions) such a CDC or ADCC can be used in order to evaluate whether an ABP of the invention lacks the ability of Fc binding.

In this context, it is noted that the term "Fc receptor" or "FcR" defines a receptor, generally a protein that is capable of binding to the Fc region of an antibody. Fc receptors are found on the surface of certain cells of the immune system of an organism, for example natural killer cells, macrophages, neutrophils, and mast cells. In vivo Fc receptors bind to immunoglobulins that are immobilized on infected cells or present on invading pathogens. Their activity stimulates phagocytic or cytotoxic cells to destroy microbes, or infected cells by antibody-mediated phagocytosis or antibody-dependent cell-mediated cytotoxicity. Some viruses such as flaviviruses use Fc receptors to help them infect cells, by a mechanism known as antibody-dependent enhancement of infection. FcRs have been reviewed in Ravetch and Kinet, Annu. Rev. Immunol. 9: 457-92 (1991); Capel et al., Immunomethods 4: 25-34 (1994); and de Haas et al., J. Lab. Clin. Med. 126: 330-41 (1995).

"Complement dependent cytotoxicity" or "CDC" refers to the lysis of a target cell in the presence of complement. Activation of the classical complement pathway is initiated by the binding of the first component of the complement system (C1q) to antibodies (of the appropriate subclass) which are bound to their cognate antigen. To assess complement activation, a CDC assay, e.g., as described in Gazzano-Santoro et al., J. Immunol. Methods 202: 163 (1997) may be performed.

The term "complement system" is used in the art to refer a number of small proteins—called complement factors—found in blood, generally circulating as inactive precursors (pro-proteins). The term refers to the ability of this inalterable and not adaptable system to "complement" the capability of antibodies and phagocytic cells to clear pathogens such as bacteria, as well as antigen-antibody complexes, from an organism. An example of complement factors is the complex C1, which includes C1q and two serine protases, C1r and C1s. The complex C1 is a component of the CDC pathway. C1q is a hexavalent molecule with a molecular weight of approximately 460,000 and a structure likened to a bouquet of tulips in which six collagenous "stalks" are connected to six globular head regions. To activate the complement cascade, C1q has to bind to at least two molecules of IgG1, IgG2 or IgG3.

"Antibody-dependent cellular cytotoxicity" or ADCC refers to a form of cytotoxicity in which immunoglobulin molecules, bound onto Fc receptors (FcRs), present on certain cytotoxic cells—such as natural killer (NK) cells, neutrophils and macrophages—enable these cytotoxic effector cells to bind specifically to an antigen-bearing target cell and to subsequently kill the target cell with cytotoxins. The antibodies "arm" the cytotoxic cells and are required for killing of the target cell by this mechanism. The primary cells for mediating ADCC, NK cells, express FcγRIII only, whereas monocytes express FcγRI, FcγRII and FcγRIII. FcR expression on hematopoietic cells is summarized in Table 3 on page 464 of Ravetch and Kinet, Annu. Rev. Immunol. 9: 457-92 (1991). To assess ADCC activity of a molecule of interest, an in vitro ADCC assay, such as described in U.S. Pat. No. 5,500,362 or U.S. Pat. No. 5,821,337 may be carried out. Useful effector cells for such assays include, but are not limited to, peripheral blood mononuclear cells (PBMC) and natural killer (NK) cells. In some embodiments ADCC activity of the molecule of interest may be assessed in vivo, e.g., in an animal model such as disclosed in Clynes et al., PNAS USA 95: 652-656 (1998).

The present invention shall encompass all known strategies that have been developed to reduce or eliminate antibody cytotoxicity in certain preferred embodiments. One effective strategy in human antibodies is the elimination of the N-linked glycosylation at residue Asn-297, achieved by substituting Asn-297 with an alanine, glycine, or aspartic acid, or modification of the serine/threonine residue at position 299. Alternative strategies encompassed by the present invention to mitigate antibody effector function, include substitutions of residues in the antibody lower hinge such as L234A and L235A (LALA). These residues form part of the Fc-γ receptor binding site on the CH2 domain, and the exchange of these residues between antibody isotypes with greater or lesser effector function identified their importance in ADCC. Although alanine substitutions at these sites are effective in reducing ADCC in both human and murine antibodies, these substitutions are less effective at reducing CDC activity. Another single variant, P329A, identified by a random mutagenesis approach to map the C1q binding site of the Fc, was shown to be highly effective at reducing CDC activity while retaining ADCC activity.

An ABP of the invention may be produced using any known and well-established expression system and recombinant cell culturing technology, for example, by expression in bacterial hosts (prokaryotic systems), or eukaryotic systems such as yeasts, fungi, insect cells or mammalian cells. An ABP of the present invention may also be produced in transgenic organisms such as a goat, a plant or a XENOMOUSE transgenic mouse, an engineered mouse strain that has large fragments of the human immunoglobulin loci and is deficient in mouse antibody production. An antibody may also be produced by chemical synthesis.

For production of a recombinant ABP of the invention, typically a polynucleotide encoding the antibody is isolated and inserted into a replicable vector such as a plasmid for further cloning (amplification) or expression. An illustrative example of a suitable expression system is a glutamate synthetase system (such as sold by Lonza Biologics), with the host cell being for instance CHO or NSo. A polynucleotide encoding the antibody is readily isolated and sequenced using conventional procedures. Vectors that may be used include plasmid, virus, phage, transposons, minichromsomes of which plasmids are a typical embodiment. Generally such vectors further include a signal sequence, origin of replication, one or more marker genes, an enhancer element, a promoter and transcription termination sequences operably linked to the light and/or heavy chain polynucleotide so as to facilitate expression. Polynucleotides encoding the light and heavy chains may be inserted into separate vectors and transfected into the same host cell or, if desired both the heavy chain and light chain can be inserted into the same vector for transfection into the host cell. Both chains can, for example, be arranged, under the control of a dicistronic operon and expressed to result in the functional and correctly folded ABP as described in Skerra, A. (1994) Use of the tetracycline promoter for the tightly regulated production of a murine antibody fragment in Escherichia coli, Gene 151, 131-135, or Skerra, A. (1994) A general vector, pASK84, for cloning, bacterial production, and single-step purification of antibody Fab fragments, Gene 141, 79-8. Thus, according to one aspect of the present invention there is provided a process of constructing a vector encoding the light and/or heavy chains of an antibody or antigen binding fragment thereof of the invention, which method includes inserting into a vector, a polynucleotide encoding either a light chain and/or heavy chain of an ABP of the invention.

When using recombinant techniques, the ABP can be produced intracellularly, in the periplasmic space, or directly secreted into the medium (cf. also Skerra 1994, supra). If the antibody is produced intracellularly, as a first step, the particulate debris, either host cells or lysed fragments, are removed, for example, by centrifugation or ultrafiltration. Carter et al., Bio/Technology 10: 163-167 (1992) describe a procedure for isolating antibodies which are secreted to the periplasmic space of E coli. The antibody can also be produced in any oxidizing environment. Such an oxidizing environment may be provided by the periplasm of Gram-negative bacteria such as E. coli, in the extracellular milieu of Gram-positive bacteria or in the lumen of the endoplasmatic reticulum of eukaryotic cells (including animal cells such as insect or mammalian cells) and usually favors the formation of structural disulfide bonds. It is, however, also possible to produce an ABP of the invention in the cytosol of a host cell such as E. coli. In this case, the polypeptide can either be directly obtained in a soluble and folded state or recovered in form of inclusion bodies, followed by renaturation in vitro. A further option is the use of specific host strains having an oxidizing intracellular milieu, which may thus allow the formation of disulfide bonds in the cytosol (Venturi M, Seifert C, Hunte C. (2002) "High level production of functional antibody Fab fragments in an oxidizing bacterial cytoplasm." J. Mol. Biol. 315, 1-8).

The ABP produced by the cells can be purified using any conventional purification technology, for example, hydroxylapatite chromatography, gel electrophoresis, dialysis, and affinity chromatography, with affinity chromatography being one preferred purification technique. ABPs may be purified via affinity purification with proteins/ligands that specifically and reversibly bind constant domains such as the CH1 or the CL domains. Examples of such proteins are immunoglobulin-binding bacterial proteins such as Protein A, Protein G, Protein A/G or Protein L, wherein Protein L binding is restricted to ABPs that contain kappa light chains. An alternative method for purification of antibodies with K-light chains is the use of bead coupled anti kappa antibodies (KappaSelect). The suitability of protein A as an affinity ligand depends on the species and isotype of any immunoglobulin Fc domain that is present in the antibody. Protein A can be used to purify antibodies (Lindmark et al., J. Immunol. Meth. 62: 1-13 (1983)). Protein G is recommended for all mouse isotypes and for human gamma3 (Guss et al., EMBO J. 5: 15671575 (1986)). The choice of the purification method that is used for a particular ABP of the invention is within the knowledge of the person of average skill in the art.

It is also possible to equip one of the chains of the ABP of the invention with one or more affinity tags. Affinity tags such as the Strep-tag® or Strep-tag® II (Schmidt, T. G. M. et al. (1996) J. Mol. Biol. 255, 753-766), the myc-tag, the FLAGTM-tag, the His6-tag or the HA-tag allow easy detection and also simple purification of the recombinant ABP.

Turning now to nucleic acids of the invention, a nucleic acid molecule encoding one or more chains of an antibody according to the invention may be any nucleic acid in any possible configuration, such as single stranded, double stranded or a combination thereof. Nucleic acids include for instance DNA molecules, RNA molecules, analogues of the DNA or RNA generated using nucleotide analogues or using nucleic acid chemistry, locked nucleic acid molecules (LNA), and protein nucleic acids molecules (PNA). DNA or RNA may be of genomic or synthetic origin and may be single or double stranded. Such nucleic acid can be e.g. mRNA, cRNA, synthetic RNA, genomic DNA, cDNA synthetic DNA, a copolymer of DNA and RNA, oligonucleotides, etc. A respective nucleic acid may furthermore contain non-natural nucleotide analogues and/or be linked to an affinity tag or a label.

In some embodiments a nucleic acid sequence encoding a chain, such as a main chain and/or a smaller chain of an antibody according to the invention is included in a vector such as a plasmid. Where a substitution or deletion is to be included in an antibody chain, when compared to a naturally occurring domain or region of an antibody, the coding sequence of the respective native domain/region, e.g. included in the sequence of an immunoglobulin, can be used as a starting point for the mutagenesis. For the mutagenesis of selected amino acid positions, the person skilled in the art has at his disposal the various established standard methods for site-directed mutagenesis. A commonly used technique is the introduction of mutations by means of PCR (polymerase chain reaction) using mixtures of synthetic oligonucleotides, which bear a degenerate base composition at the desired sequence positions. For example, use of the codon NNK or NNS (wherein N=adenine, guanine or cytosine or thymine; K=guanine or thymine; S=adenine or cytosine) allows incorporation of all 20 amino acids plus the amber stop codon during mutagenesis, whereas the codon VVS limits the number of possibly incorporated amino acids to 12, since it excludes the amino acids Cys, Ile, Leu, Met, Phe, Trp, Tyr, Val from being incorporated into the selected position of the polypeptide sequence; use of the codon NMS (wherein M=adenine or cytosine), for example, restricts the number of possible amino acids to 11 at a selected sequence position since it excludes the amino acids Arg, Cys, Gly, Ile, Leu, Met, Phe, Trp, Val from being incorporated at a selected sequence position. In this respect it is noted that codons for other amino acids (than the regular 20 naturally occurring amino acids) such as selenocystein or pyrrolysine can also be incorporated into a nucleic acid of an ABP. It is also possible, as described by Wang, L., et al. (2001) Science 292, 498-500, or Wang, L., and Schultz, P. G. (2002) Chem. Comm. 1, 1-11, to use "artificial" codons such as UAG which are usually recognized as stop codons in order to insert other unusual amino acids, for example o-methyl-L-tyrosine or p-aminophenylalanine.

The use of nucleotide building blocks with reduced base pair specificity, as for example inosine, 8-oxo-2'deoxyguanosine or 6(2-deoxy-p-D-ribofuranosyl)-3,4-dihydro-8H-pyrimin-do-1,2-oxazine-7-one (Zaccolo et al. (1996) J. Mol. Biol. 255, 589-603), is another option for the introduction of mutations into a chosen sequence segment. A further possibility is the so-called triplet-mutagenesis. This method uses mixtures of different nucleotide triplets, each of which codes for one amino acid, for incorporation into the coding sequence (Virnekäs B, et al., 1994 Nucleic Acids Res 22, 5600-5607).

A nucleic acid molecule encoding a chain, such as a main chain and/or a smaller chain of an antibody according to the invention can be expressed using any suitable expression system, for example in a suitable host cell or in a cell-free system. The obtained ABP may be enriched by means of selection and/or isolation. Preferably the nucleic acids of the invention are provided in context of genetic constructs such as vectors/plasmids.

Further provided is a system of nucleic acids, or constructs comprising such nucleic acid of the invention, wherein the system of the invention comprises at least two nucleic acids of the invention each encoding one monomer of an ABP of the invention, for example one nucleic acid encoding a heavy chain sequence, and a second nucleic acid encoding a light chain sequence.

In some embodiments, the polypeptides of the ABP of the invention can be encoded by nucleic acids for expression in vivo or in vitro. Thus, in some embodiments, an isolated nucleic acid encoding an ABP of the invention is provided. In some embodiments, the nucleic acid encodes one part or monomer of an ABP of the invention (for example one of two (heavy and light) chains of an antibody), and/or another nucleic acid encodes another part or monomer of an ABP of the invention (for example the other of two chains of an antibody). Such nucleic acids may be provided in combination or as a system together. In some embodiments, the nucleic acid encodes two or more ABP polypeptide chains, for example, at least 2 antibody chains. Nucleic acids encoding multiple ABP chains can include nucleic acid cleavage sites between at least two chain sequences, can encode transcription or translation start site between two or more chains sequences, and/or can encode proteolytic target sites between two or more ABP chains.

In one related aspect, the invention relates to a nucleic acid construct (NAC) comprising at least one nucleic acid of the invention (such as described above). Such an NAC can comprise one or more additional features permitting the expression of the encoded ABP or component of said ABP in a cell (such as in a host cell). Examples of NACs of the invention include, but are not limited to, plasmid vectors, viral vectors, mRNA, non-episomal mammalian vectors and expression vectors, for example, recombinant expression vectors. The nucleic acid constructs of the invention can comprise a nucleic acid of the invention in a form suitable for expression of the nucleic acid in a cell, such as a host cell, (see below). The nucleic acid constructs of the invention will be, typically, recombinant nucleic acids, and/or may be isolated and/or substantially pure. Recombinant nucleic acids will, typically, be non-natural; particularly if they comprise portions that are derived from different species and/or synthetic, in-vitro or mutagenic methods.

In some embodiments, an NAC of the invention comprises one or more constructs either of which includes a nucleic acid encoding either a heavy or a light antibody chain. In some embodiments, the NAC of the invention comprises two constructs, one of which includes a nucleic acid encoding the heavy antibody chain, the other of which includes a nucleic acid encoding the light antibody chain, such that expression from both constructs can generate a complete antibody molecule. In some embodiments, the NAC of the invention comprises a construct which includes nucleic acids encoding both heavy and light antibody chains, such that a complete antibody molecule can be expressed from one construct. In other embodiments, an NAC of the invention can comprise a single construct that encodes a single chain which is sufficient to form an ABP of the invention; for example, if the encoded ABP is a scFv or a single-domain antibody (such as a camelid antibody).

Yet, one further aspect of the invention provides a vector (such as an expression vector) that comprises a nucleic acid encoding an ABP as disclosed herein, or a part or monomer of an ABP. For example, in some embodiments, where the ABP is a multimeric protein, the nucleic acid encodes only a single polypeptide chain of the antigen construct. Therefore, to express such an antigen binding construct, an expression vector of the invention may contain two or more nucleic acids that each encode a separate part or monomer of an ABP, which in combination would express an entire ABP. Analogously, an expression vector of the invention that comprises a nucleic acid that encodes only part or monomer of an antigen binding construct, may be used in combination with other separate expression vectors of the invention that each encode a separate part or monomer of an ABP. In other embodiments the nucleic acid encodes multiple polypeptide chains of the ABP of the invention. In some embodiments, the expression vector includes pcDNA3.1™/myc-His (−) Version A vector for mammalian expression (Invitrogen, Inc.) or a variant thereof. The pcDNA3.1 expression vector features a CMV promoter for mammalian expression and both mammalian (Neomycin) and bacterial (Ampicillin) selection markers. In some embodiments, the expression vector includes a plasmid. In some embodiments, the vector includes a viral vector, for example a retroviral or adenoviral vector. In embodiments, the vector includes a cosmid, YAC, or BAC.

In another related aspect, the invention relates to a cell (such as a host cell and/or a recombinant host cell) comprising one or more nucleic acid of the invention. Preferably, such cell is capable of expressing the ABP (or component thereof) encoded by said nucleic acids. For example, if an ABP of the invention comprises two separate polypeptide chains (e.g. a heavy and light chain of an IgG), then the cell of the invention may comprise a first nucleic acid that encodes (and can express) the heavy chain of such ABP as well as a second nucleic acid that encodes (and can express) the light chain of such ABP; alternatively, the cell may comprise a single nucleic acid that encodes both chains of such ABP. In these ways, such a cell of the invention would be capable of expressing a functional ABP of the invention. A (host) cell of invention may be one of the mammalian, prokaryotic or eukaryotic host cells as described elsewhere herein, in particularly where the cell is a Chinese hamster ovary (CHO) cell.

In certain embodiments of such aspect, the (host) cell is a human cell; in particular it may be a human cell that has been sampled from a specific individual (eg an autologous human cell). In such embodiments, such human cell can be propagated and/or manipulated in-vitro so as to introduce a nucleic acid of the present invention. The utility of a manipulated human cell from a specific individual can be to produce an ABP of the invention, including to reintroduce a population of such manipulated human cells into a human subject, such as for use in therapy. In certain of such uses, the manipulated human cell may be introduced into the same human individual from which it was first sampled; for example, as an autologous human cell.

The human cell that is subject to such manipulation can be of any germ cell or somatic cell type in the body. For example, the donor cell can be a germ cell or a somatic cell selected from the group consisting of fibroblasts, B cells, T cells, dendritic cells, keratinocytes, adipose cells, epithelial cells, epidermal cells, chondrocytes, cumulus cells, neural cells, glial cells, astrocytes, cardiac cells, oesophageal cells, muscle cells, melanocytes, hematopoietic cells, macrophages, monocytes, and mononuclear cells. The donor cell can be obtained from any organ or tissue in the body; for example, it can be a cell from an organ selected from the group consisting of liver, stomach, intestines, lung, pancreas, cornea, skin, gallbladder, ovary, testes, kidneys, heart, bladder, and urethra.

Pharmaceutical Compositions

The invention also provides a pharmaceutical composition that includes an ABP of the invention and, optionally a pharmaceutically acceptable excipient and/or carrier.

To be used in therapy, the ABPs, nucleic acids or NACs (or the cells, such as host cells) of the invention may be formulated into a pharmaceutical composition appropriate to facilitate administration to animals or humans. The term "pharmaceutical composition" means a mixture of substances including a therapeutically active substance (such as an ABP of the invention) for pharmaceutical use.

By way of example, the pharmaceutical composition of the invention may comprise between 0.1% and 100% (w/w) active ingredient (for example, an ABP of the invention), such as about 0.5%, 1%, 2%, 3%, 4%, 5%, 6%, 8% 10%, 15%, 20%, 25%, 30%, 40%, 50%, 60%, 70%, 80%, 90%, 95%, 96%, 97%, 98% or 99%, preferably between about 1% and about 20%, between about 10% and 50% or between about 40% and 90%.

The ABP according to the invention can be administered via any parenteral or non-parenteral (enteral) route that is therapeutically effective for proteinaceous drugs. Parenteral application methods include, for example, intracutaneous, subcutaneous, intramuscular, intratracheal, intranasal, intravitreal or intravenous injection and infusion techniques, e.g. in the form of injection solutions, infusion solutions or tinctures, as well as aerosol installation and inhalation, e.g. in the form of aerosol mixtures, sprays or powders. An overview about pulmonary drug delivery, i.e. either via inhalation of aerosols (which can also be used in intranasal administration) or intracheal instillation is given by J. S. Patton et al. The lungs as a portal of entry for systemic drug delivery. Proc. Amer. Thoracic Soc. 2004 Vol. 1 pages 338-344, for example). Non-parenteral delivery modes are, for instance, orally, e.g. in the form of pills, tablets, capsules, solutions or suspensions, or rectally, e.g. in the form of suppositories. ABPs of the invention can be administered systemically or topically in formulations containing conventional non-toxic pharmaceutically acceptable excipients or carriers, additives and vehicles as desired.

In one embodiment of the present invention the pharmaceutical is administered parenterally to a mammal, and in particular to humans. Corresponding administration methods include, but are not limited to, for example, intracutaneous, subcutaneous, intramuscular, intratracheal or intravenous injection and infusion techniques, e.g. in the form of injection solutions, infusion solutions or tinctures as well as aerosol installation and inhalation, e.g. in the form of aerosol mixtures, sprays or powders. A combination of intravenous and subcutaneous infusion and/or injection might be most convenient in case of compounds with a relatively short serum half-life. The pharmaceutical composition may be an aqueous solution, an oil-in water emulsion or a water-in-oil emulsion.

In this regard it is noted that transdermal delivery technologies, e.g. iontophoresis, sonophoresis or microneedle-enhanced delivery, as described in Meidan V M and Michniak B B 2004 Am. J. Ther. 11(4): 312-316, can also be used for transdermal delivery of an ABP described herein. Non-parenteral delivery modes are, for instance, oral, e.g. in the form of pills, tablets, capsules, solutions or suspensions, or rectal administration, e.g. in the form of suppositories. The ABPs of the invention can be administered systemically or topically in formulations containing a variety of conventional non-toxic pharmaceutically acceptable excipients or carriers, additives, and vehicles.

The dosage of the ABP applied may vary within wide limits to achieve the desired preventive effect or therapeutic response. It will, for instance, depend on the affinity of the ABP for a chosen target as well as on the half-life of the complex between the ABP and the ligand in vivo. Further, the optimal dosage will depend on the biodistribution of the ABP or a conjugate thereof, the mode of administration, the severity of the disease/disorder being treated as well as the medical condition of the patient. For example, when used in an ointment for topical applications, a high concentration of the ABP can be used. However, if wanted, the ABP may also be given in a sustained release formulation, for example liposomal dispersions or hydrogel-based polymer microspheres, like PolyActive™ or OctoDEX™ (cf. Bos et al., Business Briefing: Pharmatech 2003: 1-6). Other sustained release formulations available are for example PLGA based polymers (PR pharmaceuticals), PLA-PEG based hydrogels (Medincell) and PEA based polymers (Medivas).

Accordingly, the ABPs of the present invention can be formulated into compositions using pharmaceutically acceptable ingredients as well as established methods of preparation (Gennaro, A. L. and Gennaro, A. R. (2000) Remington: The Science and Practice of Pharmacy, 20th Ed., Lippincott Williams & Wilkins, Philadelphia, PA). To prepare the pharmaceutical compositions, pharmaceutically inert inorganic or organic excipients can be used. To prepare e.g. pills, powders, gelatin capsules or suppositories, for example, lactose, talc, stearic acid and its salts, fats, waxes, solid or liquid polyols, natural and hardened oils can be used. Suitable excipients for the production of solutions, suspensions, emulsions, aerosol mixtures or powders for reconstitution into solutions or aerosol mixtures prior to use include water, alcohols, glycerol, polyols, and suitable mixtures thereof as well as vegetable oils.

The pharmaceutical composition may also contain additives, such as, for example, fillers, binders, wetting agents, glidants, stabilizers, preservatives, emulsifiers, and furthermore solvents or solubilizers or agents for achieving a depot effect. The latter is that fusion proteins may be incorporated into slow or sustained release or targeted delivery systems, such as liposomes and microcapsules.

The formulations can be sterilized by numerous means, including filtration through a bacteria-retaining filter, or by incorporating sterilizing agents in the form of sterile solid compositions which can be dissolved or dispersed in sterile water or other sterile medium just prior to use.

It is especially advantageous to formulate oral, rectal or parenteral compositions in dosage unit form for ease of administration and uniformity of dosage. Dosage unit form as used herein includes physically discrete units suited as unitary dosages for the subject to be treated; each unit containing a predetermined quantity of active compound calculated to produce the desired therapeutic effect in association with the required pharmaceutical carrier. The specification for the dosage unit forms of the invention are dictated by and directly dependent on the unique characteristics of the active compound and the particular therapeutic effect to be achieved, and the limitations inherent in the art of compounding such an active compound for the treatment of individuals.

In some embodiments, the pharmaceutical composition comprising an ABP, or other component of the invention (such as a nucleic acid or NAC), is in unit dose form of between 10 and 1000 mg of an ABP, or other component of the invention. In some embodiments, the pharmaceutical composition comprising an ABP, or other component of the invention is in unit dose form of between 10 and 200 mg ABP, or other component. In some embodiments, the pharmaceutical composition comprising an ABP is in unit dose form of between 200 and 400 mg ABP, or other component. In some embodiments, the pharmaceutical composition comprising an ABP, or other component is in unit dose form of between 400 and 600 mg ABP, or other component. In some embodiments, the pharmaceutical composition comprising an ABP, or other component is in unit dose form of between 600 and 800 mg ABP, or other component. In some embodiments, the pharmaceutical composition comprising an ABP, or other component is in unit dose form of between 800 and 100 mg ABP, or other component.

Exemplary unit dosage forms for pharmaceutical compositions comprising ABP, or other component are tablets, capsules (eg as powder, granules, microtablets or micropellets), suspensions or as single-use pre-loaded syringes. In certain embodiments, kits are provided for producing a single-dose administration unit. The kit can contain both a first container having a dried active ingredient and a second container having an aqueous formulation. Alternatively, the kit can contain single and multi-chambered pre-loaded syringes.

Toxicity and therapeutic efficacy (eg effectiveness) of such active ingredients can be determined by standard pharmaceutical procedures in cell cultures or experimental animals, eg, for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Active agents which exhibit large therapeutic indices are preferred. While compounds that exhibit toxic side effects may be used, care should be taken to design a delivery system that targets such compounds to the site of affected tissue in order to minimise potential damage to uninfected cells and, thereby, reduce side effects.

The data obtained from the cell culture assays and animal studies can be used in formulating a range of dosage of the active ingredients (eg an ABP, or other component of the invention), such as for use in humans. The dosage of such active ingredients lies preferably within a range of circulating concentrations that include the ED50 with little or no toxicity. The dosage may vary within this range depending upon the dosage form employed and the route of administration utilised. For any active ingredients used in the therapeutic approaches of the invention, the (therapeutically) effective dose can be estimated initially from cell culture assays. A dose may be formulated in animal models to achieve a circulating plasma concentration range that includes the IC50 (ie, the concentration of the active ingredients which achieves a half-maximal inhibition of symptoms) as determined in cell culture. Such information can be used to more accurately determine useful (eg effective) amounts or doses, such as for administration to humans. The pharmaceutical compositions can be included in a container, pack, or dispenser together with instructions for administration.

In the context of the invention, an effective amount of the ABP, or other component of the invention, or the pharmaceutical composition can be one that will elicit the biological, physiological, pharmacological, therapeutic or medical response of a cell, tissue, system, body, animal, individual, patient or human that is being sought by the researcher, scientist, pharmacologist, pharmacist, veterinarian, medical doctor, or other clinician, eg, lessening of the effects/symptoms of a disorder, disease or condition, such as a proliferative disorder, for example, a cancer or tumour, or killing or inhibiting growth of a cell involved with a proliferative disorder, such as a tumour cell. The effective amount can be determined by standard procedures, including those described below.

In accordance with all aspects and embodiments of the medical uses and methods of treatment provided herein, the effective amount administered at least once to a subject in need of treatment with an ABP, or other component of the invention is, typically, between about 0.01 mg/kg and about 100 mg/kg per administration, such as between about 1 mg/kg and about 10 mg/kg per administration. In some embodiments, the effective amount administered at least once to said subject of a ABP, or other component is between about 0.01 mg/kg and about 0.1 mg/kg per administration, between about 0.1 mg/kg and about 1 mg/kg per administration, between about 1 mg/kg and about 5 mg/kg per administration, between about 5 mg/kg and about 10 mg/kg per administration, between about 10 mg/kg and about 50 mg/kg per administration, or between about 50 mg/kg and about 100 mg/kg per administration.

For the prevention or treatment of disease, the appropriate dosage of a ABP, or other component (or a pharmaceutical composition comprised thereof) will depend on the type of disease to be treated, the severity and course of the disease, whether the ABP, or other component and/or pharmaceutical composition is administered for preventive or therapeutic purposes, previous therapy, the patient's clinical history, age, size/weight and response to the ABP, or other component and/or pharmaceutical composition, and the discretion of the attending physician. The ABP, or other component and/or pharmaceutical composition is suitably administered to the patient at one time or over a series of treatments. If such ABP, or other component and/or pharmaceutical composition is administered over a series of treatments, the total number of administrations for a given course of treatment may consist of a total of about 2, 3, 4, 5, 6, 7, 8, 9, 10 or more than about 10 treatments. For example, a treatment may be given once every day (or 2, 3 or 4 times a day) for a week, a month or even several months. In certain embodiments, the course of treatment may continue indefinitely.

The amount of the ABP, or other component and/or pharmaceutical composition administered will depend on variables such as the type and extent of disease or indication to be treated, the overall health, age, size/weight of the patient, the in vivo potency of the ABP, or other component and/or pharmaceutical composition, and the route of administration. The initial dosage can be increased beyond the upper level in order to rapidly achieve the desired blood-level or tissue level. Alternatively, the initial dosage can be smaller than the optimum, and the daily dosage may be progressively increased during the course of treatment. Human dosage can be optimised, e.g., in a conventional Phase I dose escalation study designed to run from relatively low initial doses, for example from about 0.01 mg/kg to about 20 mg/kg of active ingredient. Dosing frequency can vary, depending on factors such as route of administration, dosage amount and the disease being treated. Exemplary dosing frequencies are once per day, once per week and once every two weeks. Formulation of an ABP, or other component of (or for use with) the present is within the ordinary skill in the art. In some embodiments of the invention such ABP, or other component is lyophilised and reconstituted in buffered saline at the time of administration. The ABP, or other component and/or pharmaceutical composition of may further result in a reduced relapsing of the disease to be treated or reduce the incidence of drug resistance or increase the time until drug resistance is developing; and in the case of cancer may result in an increase in the period of progression-free survival and/or overall survival.

Treatment and Diagnosis of Diseases

The ABP of the invention as well as any nucleic acid, NAC, cells or compositions may be suitable for and may be used in the treatment and/or prevention of a disease in a subject. Preferably such a disease is a pathological immune response of a subject, for example in response to a self (auto) or alien (allo) antigen. Thus inflammatory and autoimmune diseases are possibly treatable by the present components of the invention. In related aspects, the invention relates to a product or component for use in medicine, and relates to the use of a product for the manufacture of a medicament, wherein the product is selected from the list consisting of an ABP, nucleic acid, NAC or host cell of the invention, or a pharmaceutical composition comprising any of the forgoing.

In other aspects described elsewhere herein, are provided methods to detect and/or diagnose a disease, disorder or condition in a mammalian subject, preferably wherein such methods comprise a step of detecting the binding of an ABP of the invention to TIRC7, or to a TIRC7 positive cell.

The invention also relates to various methods to produce a recombinant cell line or ABP of the invention, a hybridoma or host cell capable of producing an ABP of the present invention, as well as relating to various determination and/or diagnostic methods or uses, and to kits useful for such determination and/or diagnostic methods, as well as to various methods for identifying and/or charactering compounds and/or methods for identifying, generating and/or producing ABPs, such as those suitable for use in medicine.

The term "treatment" in the present invention is meant to include therapy, e.g. therapeutic treatment, as well as prophylactic or suppressive measures for a disease (or disorder or condition). Thus, for example, successful administration of an ABP (or of a nucleic acid or NAC or cell, such as a host cell) prior to onset of the disease results in treatment of the disease. "Treatment" also encompasses administration of an ABP after the appearance of the disease in order to ameliorate or eradicate the disease (or symptoms thereof). Administration of an ABP after onset and after clinical symptoms, with possible abatement of clinical symptoms and perhaps amelioration of the disease, also comprises treatment of the disease. Those "in need of treatment" include subjects (such as a human subject) already having the disease, disorder or condition, as well as those prone to or suspected of having the disease, disorder or condition, including those in which the disease, disorder or condition is to be prevented.

Autoimmune diseases: The term "autoimmune disease" refers to a disease caused by a breakdown of self-tolerance such that the adaptive and innate immune system responds to self-antigens and mediates cell and tissue damage. Autoimmune diseases are frequently characterized by means of their involvement of single organ or single cell-types or involvement of multiple organs or tissue systems. Autoimmune diseases have also been referred to as "collagen," or "collagen-vascular" or "connective tissue" diseases. Autoimmune disorders are frequently associated with hypersensitivity reactions. The components of the invention can be useful for treating and/or preventing various types of autoimmune diseases. Specific, non-limiting examples of autoimmune disorders are systemic lupus erythematosus, insulin-dependent (type I) diabetes mellitus, inflammatory arthritis, rheumatoid arthritis, multiple sclerosis, autoimmune hepatitis, chronic aggressive hepatitis, autoimmune hemolytic anemia, autoimmune thrombocytopenia, autoimmune atrophic gastritis of pernicious anemia, autoimmune encephalomyelitis, encephalitis, autoimmune orchitis, autoimmune pancreatitis, cquired hemophilia, ankylosing spondylitis, antiphospholipid syndrome, alopecia areata, lyme disease, Lichen sclerosus, Behcet's syndrome, cardiomyopathy, inclusion body myositis, autoimmune myocarditis, anti-GBM nephritis, still disease, bullous pemphigoid, polyartheritis nodosa, psoriatic arthritis, fibromyalgia, rheumatic fever, sarcoidosis, systemic sclerosis, chronic inflammatory demyelinating polyneuropathy, guillain barre syndrome, hashimoto thyroiditis, Takayasu arteritis, temporal arteritis/giant cell arteritis, Grave's disease; immune thrombocytopenic purpura, intestitial cyctitis, juvenive arthritis, juvenil myositis, Tynpe 1 diabetes, throid eye disease, IgA nephropathia, subacute bacterial endocarditis, goodpasture's syndrome, fibrosing alveolitis, relapsing polychondritis, eosinophilic fasciitis, oesophagitis, endometriosis, primary sclerosing cholangitis, dermatitis, polymyalgia rheumatoca, Kawasaki disease, cicatricial pemphigoid, cold agglutinin disease, polymyositis, dermatomyositis, discoid lupus, sympathetic ophthalmia, essential mixed cryoglobulinemia, fibromyalgia, fibromyositis, Guillain-Barr syndrome, idiopathic pulmonary fibrosis, idiopathic thrombocytopenic purpura, IgA nephropathy, juvenile arthritis, systemic sclerosis, polyarteritis nodosa, polychondritis, dermatomyositis, primary agammaglobulinemia, primary biliary cirrhosis, hyperimmunoglobulin E, progressive systemic sclerosis, psoriasis, Reiter's syndrome, sarcoidosis, stiff-man syndrome, uveitis or uveitis with tubulointestinal nephritis, vasculitis, pemphigus, optic neuritis, undifferentiated inflammatory connective tissue disease, transverse myelitis, tolosa-hunt syndrome, scleritis, sympathetic ophthalmia, vitiligo, Hashimoto's thyroiditis, Goopasture's disease, pernicious anemia, Addison's disease, dermatomyositis, Sjogren's syndrome, dermatomyositis, myasthenia gravis, Grave's disease, allergic encephalomyelitis, glomerulonephritis, celiac disease, chagas disease, fibrotic disease and the like (N Engl J Med, Vol. 345, No. 5, Aug. 2, 2001, p 340-350). DNA or RNA released from DNA- or RNA-containing microbes could stimulate the production of autoantibody specific to self RNA- or DNA-containing complexes and consequently led to an autoimmune disease, including but not limited to SLE.

An autoimmune disease that can be treated with an ABP of the invention, or with another of the herein disclosed components, is a disease treatable by an inhibition and/or reduction of T-cell mediated immune responses. For example such diseases that can be treated and/or prevented using the ABP of the invention, are selected from diseases that benefit from the immune suppressive effects of the exemplary ABP shown in FIG. 8 herein.

Preferred autoimmune diseases treatable or preventable by the components and methods of the invention are selected from the group of autoimmune hepatitis, IgG4 related autoimmune disease, pulmonary fibrosis, Sjörgen syndrome, systemic lupus erythematosis, uveitis or uveitis with tubulointestinal nephritis, vasculitis, chronic fatigue syndrome and systemic scleroderma.

The ABP or other components of the invention are further useful for the treatment of immunological side effects caused by certain treatments, such as treatments that may induce undesired immune responses (such as cell-mediated immune responses, eg T-cell responses) in a patient receiving such treatment. Any treatment with complex biologies such as CAR, Antibodies, T cell receptors, or any other macroprotein, may trigger a patient's immune system to "attack" the therapeutic agent as a potential foreign threat. For example, a typical side effect in cancer patients receiving treatment with a therapeutic antibody, Chimeric Antigen Receptor or Immune Checkpoint Inhibitors, is the development of a harmful immune response known as cytokine storm. Hence, preferably the autoimmune disease is a pathological immune response caused by a first line treatment, such as cytokine storm.

In addition, B-cell mediated diseases may in certain circumstances also be treated with the ABP or other components of the invention, Common Variable Immunodeficiency (CVID), which is a heterogeneous and enigmatic primary immunodeficiency disorder marked by the failure of humoral immunity and immune dysregulation.

"Hypersensitivity": A hypersensitivity is referred to the disorders wherein tissue injury occurs as a result of a humoral or cell-mediated response to antigens of endogenous or exogenous origin and has been classified into four types. Type I hypersensitivity (frequently referred to as anaphylactic, immediate-type, atopic, reagenic, IgE-mediated hypersensitivity reactions or allergy) generally result from the release of pharmacologically active substances such as histamine, slow-reacting substance of anaphylaxis (SRS-A), and eosinophilic chemotactic factor (ECF) form IgE-sensitized basophils and mast cells after contact with a specific exogenous antigen. Type I hypersensitivity includes, but not limited to, allergic extrinsic asthma, seasonal allergic rhinitis and systemic anaphylaxis. Type II hypersensitivity (also referred to as cytotoxic, cytolytic complement-dependent or cell-stimulating hypersensitivity reaction) results when antibody reacts with antigenic components of cells or tissue elements or with an antigen or hapten, which has become intimately coupled to cells or tissue. Type II hypersensitivity includes, but not limited to, autoimmune haemolytic anaemia, erythroblastosis fetalis and Goodpasture's disease. Type III hypersensitivity (also referred to as toxic complex, soluble complex, or immune complex hypersensitivity reactions) results from the deposition of soluble circulating antigen-antibody complexes in vessels or in tissues, with accompanying acute inflammatory reactions at the site of immune complex deposition. Type III hypersensitivity includes, but not limited to, Arthurs reaction, serum sickness, systemic lupus erythematosus, and certain types of glomerulonephritis. Type IV hypersensitivity (frequently called cellular, cell-mediated, delayed, or tuberculin-type hypersensitivity reactions) are caused by sensitized T-lymphocytes which result from contact with a specific antigen. Type IV hypersensitivity includes, but not limited to, contact dermatitis and allograft rejection (Richard A. et al. Immunology, Fifth Edition, 2003, W. H. FREEMAN AND COMPANY).

"Diseases associated with the over-stimulation of host's immune system by microbes": Microbe invasion, if severe, sometimes can cause systemic inflammatory response in a subject, leading to diseases associated with the over-stimulation of host's immune system by microbes. The events in the development of the diseases, such as in the case of influenza A (H5N1) or bacterial infection, include the significantly elevated blood levels of TNFα, interleukin-1 (IL-1), IL-6, IL-12, interferon alpha (IFN-α), interferon beta (IFN-β), interferon gamma (IFN-γ), chemokines interferon-inducible protein 10, monocyte chemoattractant protein 1, interleukin-8, interleukin-1 β, and monocyte chemoattractant protein 1. Such responses can result in cytokine-mediated lethal shock that is responsible in part for the sepsis, ARDS, and multiorgan failure observed in many patients (The Writing Committee of the World Health Organization (WHO) Consultation on Human Influenza A H5. Avian Influenza A (H5N1) Infection in Humans. N Engl J Med 2005; 353: 1374-85). The significantly elevated blood level of cytokines followed microbe infection is termed by hypercytokinemia (hypercytokinaemia) or a cytokine storm. The research suggested that patients who contract bird flu or SARS may need drugs that suppress the immune response in addition to anti-viral drugs. Hence, the ABP of the invention may be of use for the treatment of viral diseases associated with an overshooting immune response such as COVID-19 caused by SARS-CoV2 infection.

The compounds of the invention can be used to treat and/or prevent the diseases associated with the stimulation of host's immune system by microbes in a subject. The microbes causing the diseases includes, but not limited to, viruses, bacteria, fungi, parasites and etiological agents of Spongiform encephalopathies.

The virus that cause the diseases associated with the over-stimulation of host's immune system by microbes include: SARS CoV, in particular SARS-CoV2, influenza viruses, avian flu virus HIV-1, polio viruses, hepatitis A virus; enteroviruses, human Coxsackie's viruses, rhinoviruses, echoviruses, equine encephalitis viruses, rubella viruses, dengue viruses, encephalitis viruses, yellow fever viruses, corona viruses, vesicular stomatitis viruses, rabies viruses, Ebola viruses, parainfluenza viruses, mumps virus, measles virus, respiratory syncytial virus, influenza viruses, Hantan viruses, bunga viruses, phleboviruses, Nairo viruses, hemorrhagic fever viruses; reoviruses, orbiviurses and rotaviruses, Hepatitis B virus, parvoviruses, papilloma viruses, polyoma viruses, adenoviruses, herpes simplex virus (HSV) 1 and HSV-2, varicella zoster virus, cytomegalovirus (CMV), herpes viruses, variola viruses, vaccinia viruses, pox viruses, African swine fever virus, the etiological agents of Spongiform encephalopathies, delta hepatitis virus, Hepatitis C virus, foot and mouth disease virus and avian flu virus. The bacteria that can cause the diseases associated with the over-stimulation of host's immune system e.g. sepsis by microbes include: *Helicobacter pyloris, Borelia burgdorferi, Legionella pneumophilia, Mycobacteria* sps (such as. *M. tuberculosis, M. avium, M. E intracellulare, M. kansaii, M. gordonae), Staphylococcus aureus, Neisseria gonorrhoeae, Neisseria meningitidis, Listeria monocytogenes,* Group A *Streptococcus,* Group B *Streptococcus, Streptococcus, Streptococcus faecalis, Streptococcus bovis, Streptococcus* (anaerobic sps.), *Streptococcus pneumoniae,* pathogenic *Campylobacter* sp., *Enterococcus* sp., *Haemophilus influenzae, Bacillus antracis, Corynebacterium diphtheriae, Corynebacterium* sp., *Erysipelothrix rhusiopathiae, Clostridium perfringers, Clostridium tetani, Enterobacter aerogeytes, Klebsiella pneumoniae, Pasteurella multocida, Bacteroides* sp., *Fusobacterium nucleatum, Streptobacillus moniliformis, Treponema pallidium, Treponema pertenue, Leptospira,* and *Actinomyces israelii.* The fungi that can cause the diseases associated with the over-stimulation of host's immune system by microbes include, but not limited to, *Cryptococcus neoformans, Histoplasma capsulatum, Coccidioides immitis, Blastomyces dermatitidis, Chlamydia trachomatis, Candida albicans.* The parasites that can cause the diseases associated with the over-stimulation of host's immune system by microbes include: *Plasmodium falciparum* and *Toxoplasma gondii.*

"Graft rejection": The graft rejection (Graft vs Host Disease) is an immune-mediated disorder caused by organ or tissue transplantation, Transplantation means the transfer of transplants (grafts) from a donor to a recipient. Grafts are the living cells, tissues, or organs transplanted from a donor to a recipient. An autograft is the a graft transferred of one's own tissue from one location to another; a syngeneic graft (isograft) is a graft between identical twins; an allogeneic graft (homograft) is a graft between genetically dissimilar members of the same species; and a xenogeneic graft (heterograft) is a transplant between members of different species. When a subject is the recipient of an allogeneic graft or a xenogeneic graft, the body can produce an immune response against the donor tissue. In this situation, there is a clear need to suppress the immune response, in order to avoid rejection of the graft (Richard A. et al. Immunology, Fifth Edition, 2003, W. H. FREEMAN AND COMPANY). Examples of the grafts are heart, kidney, liver, medulla ossium, skin, cornea, lung, pancreas, intestinum tenue, limb, muscle, nervus, duodenum, small-bowel, pancreatic-islet-cell, stem cells and the like.

The subject to be treated with the fusion protein can be a human or non-human animal. Such an animal is preferably a mammal, for instance a human, pig, cattle, rabbit, mouse, rat, primate, goat, sheep, chicken, or horse, most preferably a human.

The ABP of the invention may also be used in the diagnosis of a disease, such as a disease as described herein. The ABP may for this purpose be labeled with a suitable detectable signaling label. Such a labeled ABP may permit detection or quantitation of TIRC7 level or cancer such as leukemia, or any of the above-mentioned cancers, or subject. When designated for in vivo use, said detectable signaling label is preferably detectable in vivo.

The labelled ABP may be used in an immune-imaging technique. The detectable signaling label may then be selected, for instance, based on the immuno-imaging technique employed for the diagnosis, for example, gamma-emitting radionuclide (or gamma-emitter) in case of gamma camera-imaging technique/SPECT, metal or positron emitter in case of MRI or PET imaging techniques, respectively. In this regard, one or more detectable signaling labels of the disclosure include gamma camera-imageable agents, PET-imageable agents and MRI-imageable agents, such as, radionuclides, fluorescers, fluorogens, chromophores, chromogens, phosphorescers, chemiluminescers and bioluminescers.

A suitable detectable signaling label may be a radionuclide. Said radionuclide may selected from the group consisting of 3H, 14C, 35S, 99Tc, 123I, 125I, 131I, mIn, 97Ru, 67Ga, 68Ga, 72As, 89Zr and 201Tl.

A suitable detectable signaling label may also be fluorophore or fluorogen. Said fluorophore or fluorogen may be selected from the group consisting of fluorescein, rhodamine, dansyl, phycoerythrin, phycocyanin, allophycocyanin, o-phthaldehyde, fluorescamine, fluorescein derivative, Oregon Green, Rhodamine Green, Rhodol Green or Texas Red.

The labelled ABP may be coupled either directly or indirectly to a detectable signaling label. For example, the ABP may be coupled either directly (e.g. via tyrosine residues of the ABP) or indirectly (e.g. via a linker—as a metal chelating agent) to a detectable signaling label. In some other embodiments, the ABP may be coupled to a molecule that is able to be coupled (either in vitro or in vivo) to the detectable signaling label at the time and place of use.

A detectable signalling label may be bound to the ABP through one or more diethylenetriaminepentaacetic acid (DTPA) residues that are coupled to the ABP.

Also contemplated by the invention is an in vitro method of detecting or diagnosing a disease defined herein. Such a method may comprise contacting a sample obtained from a subject with a preferably labelled ABP of the invention. The sample may be a blood, urine or cerebrospinal fluid sample, but may preferably be a liquid sample or a biopsy sample. The disease to be detected or diagnosed is preferably leukemia, such as ALL or AML.

In a ninth aspect, the invention pertains to a method of modulating a cell-mediated immune response in a human cell that expresses human TIRC7, comprising contacting said cell with a component recited in the seventh aspect, in the presence of an immune cell, such as a T-cell, thereby modulating, preferably inhibiting, the cell-mediated immune response.

In a tenth aspect, the invention pertains to a method for the prevention and/or treatment of a disorder associated with a pathological immune response in a subject, comprising the administration of a therapeutically effective amount of a component recited in the seventh aspect to the subject; and wherein the disorder associated with a pathological immune response is characterized by an expression of TIRC7 in cells associated with the said disorder.

In addition the invention pertains to the following set itemized embodiments:

Item 1: An Antigen Binding Protein (ABP) capable of binding to T-cell immune response cDNA 7 (TIRC7), comprising:
(i) one, preferably two, heavy chain variable domain(s) comprising the CDRH1 region set forth in SEQ ID NO: 01 (GYTFITYV), the CDRH2 region set forth in SEQ ID NO: 02 (INPYNDGT), and the CDRH3 region set forth in SEQ ID NO: 03 (AEFITKTVGG-SNWYLDV), or wherein in each case independently the CDRH1, CDRH2 and/or CDRH3 comprise a sequence having no more than three or two, preferably no more than one amino acid substitution(s), deletion(s) or insertion(s) compared to SEQ ID NO: 01, SEQ ID NO: 02, or SEQ ID NO: 03, respectively; and (ii) one, preferably two, light chain variable domain(s) comprising the CDRL1 region set forth in SEQ ID NO: 05 (SSISY), the CDRL2 region set forth in SEQ ID NO: 06 (DTS), and the CDRL3 region set forth in SEQ ID NO: 07 (HQRSSYTWT) or wherein in each case independently CDRL1, CDRL2 and/or CDRL3 comprise a sequence having no more than three or two, preferably no more than one amino acid substitution(s), deletion(s) or insertion(s) compared to SEQ ID NO: 05, SEQ ID NO: 06, or SEQ ID NO: 07, respectively;

characterized in that, said one, preferably two, heavy chain variable domain(s) and said one, preferably two, light chain variable domain(s), each comprise an antibody framework region having at least a portion of a human antibody consensus framework sequence.

Item 2: The ABP according to item 1, wherein the heavy chain variable domain human antibody consensus framework sequences are derived from IGHV1-2 (Accession number X07448), IGHV7-4-1*02, or IGHV1-46*01; and/or wherein the light chain variable domain human antibody consensus framework sequences are derived from IGKV1-9 (Accession number Z00013), IGKV3-11 (Accession number X01668), IGKV6-21*01 or IGKV1-17*03.

Item 3: The ABP according to item 1 or 2, wherein the ABP comprises one, preferably two, antibody heavy chain variable sequences, and wherein in the one, preferably two, antibody heavy chain variable sequences one of the positions 78, 80, 82, and/or 85, is missing or mutated, and wherein the numbering is according to the IMGT nomenclature.

Item 4: The ABP according to any one of items 1 to 3, wherein the ABP comprises one, preferably two, antibody heavy chain variable sequences, and wherein the one, preferably two, antibody heavy chain variable sequences comprises 78L, 80S, 82K, and/or 85S, and wherein the numbering is according to the IMGT nomenclature.

Item 5: The ABP according to any one of items 1 to 3, wherein the ABP comprises one, preferably two, antibody heavy chain variable sequences, and wherein the one, preferably two, antibody heavy chain variable sequences comprises 78L, and wherein the numbering is according to the IMGT nomenclature.

Item 6: The ABP according to any one of items 1 to 5, wherein the heavy chain variable region comprises the amino acid sequence having a sequence identity of at least 95% to an amino acid sequence selected from SEQ ID NOs: 9, 11, 13, 15, 17, 19, 21, 23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, or 85, or, in each case independently, optionally with no more than ten, nine, eight, seven, six, five, four, preferably no more than three, two or one, amino acid substitution(s), insertion(s) or deletion(s) compared to these sequences; and/or wherein the light chain variable region comprises the amino acid sequence having a sequence identity of at least 95% to the amino acid sequence selected from SEQ ID NOs: 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, or 86, or, in each case independently, optionally with no more than ten, nine, eight, seven, six, five, four, preferably no more than three, two or one, amino acid substitution(s), insertion(s) or deletion(s) compared to these sequences.

Item 7: The ABP according to any one of items 1 to 6, wherein the ABP is an antibody, or an antigen binding fragment thereof, composed of at least one, preferably two, antibody heavy chain sequence(s), and at least one, preferably two, antibody light chain sequence(s), wherein said antibody heavy chain sequence(s) and the antibody light chain sequence(s) comprise(s) each a variable region sequences in one of the following combinations:

|  | Heavy Chain Variable Region (SEQ ID NO) | Light Chain Variable Region (SEQ ID NO) |
| --- | --- | --- |
| cAb1458 | 9 | 10 |
| cAb1459 | 11 | 12 |
| cAb1460 | 13 | 14 |
| cAb1461 | 15 | 16 |
| cAb1462 | 17 | 18 |
| cAb1463 | 19 | 20 |
| cAb1464 | 21 | 22 |
| cAb1465 | 23 | 24 |
| cAb1466 | 25 | 26 |
| cAb1467 | 27 | 28 |
| cAb1468 | 29 | 30 |
| cAb1469 | 31 | 32 |
| cAb1901 | 33 | 34 |
| cAb2021 | 35 | 36 |
| cAb2022 | 37 | 38 |
| cAb2023 | 39 | 40 |
| cAb2024 | 41 | 42 |
| cAb2287 | 43 | 44 |
| cAb2288 | 45 | 46 |
| cAb2712 | 47 | 48 |
| cAb2713 | 49 | 50 |
| cAb2714 | 51 | 52 |
| cAb2715 | 53 | 54 |
| cAb3458 | 55 | 56 |
| cAb3459 | 57 | 58 |
| cAb3460 | 59 | 60 |
| cAb3461 | 61 | 62 |
| cAb3462 | 63 | 64 |
| cAb3463 | 65 | 66 |
| cAb3464 | 67 | 68 |
| cAb3465 | 69 | 70 |
| cAb3466 | 71 | 72 |
| cAb3467 | 73 | 74 |
| cAb3468 | 75 | 76 |
| cAb3469 | 77 | 78 |
| cAb3470 | 79 | 80 |
| cAb3471 | 81 | 82 |
| cAb3472 | 83 | 84 |
| cAb3473 | 85 | 86 |

Item 8: The ABP according to any one of items 1 to 7, which comprises an effector group and/or which is labelled.

Item 9: The ABP according to any one of items 1 to 8, which is isolated and/or substantially pure.

Item 10: The ABP according to any one of items 1 to 9 which is an antibody, such as a monoclonal antibody; or which is a fragment of an antibody, such as a fragment of a monoclonal antibody.

Item 11: The ABP according to item 10, wherein said antibody is a chimeric antibody, such as a human-chimeric antibody.

Item 12: The ABP according to item 10 or 11, wherein said antibody is an IgG, IgE, IgD, IgA, or IgM immunoglobulin; preferably an IgG immunoglobulin.

Item 13: The ABP according to any one of items 10 to 12, which is an antibody fragment selected from the list consisting of: Fab, Fab'-SH, Fv, scFv and F(ab')2.

Item 14: The ABP according to any one of items 1 to 13, wherein said ABP is modified or engineered to increase antibody-dependent cellular cytotoxicity (ADCC), preferably wherein said ABP is afucosylated.

Item 15: The ABP according to any one of items 1 to 14, which is a chimeric antigen receptor (CAR).

Item 16: The ABP according to any one of items 1 to 15, which comprises one or more additional antigen binding domain(s) that bind(s) to antigen(s) other than said TIRC7; such as antigen(s) present on a mammalian T-cell, and most preferably human CD3.

Item 17: The ABP according to item 16, which is bispecific, and preferably which comprises one or two binding sites binding to TIRC7 and one or two binding sites binding to an antigen other than said TIRC7, such as antigen(s) present on a mammalian T-cell, and most preferably to human CD3.

Item 18: An antigen binding protein (ABP) or an antigen-binding fragment thereof, capable of binding to human TIRC7 and that is able to compete with the binding of an ABP according to any one of items 1 to 17 to TIRC7.

Item 19: An isolated nucleic acid comprising a sequence encoding for an ABP, or for an antigen binding fragment or a monomer, such as a heavy or light chain, of an ABP, of any one of items 1 to 18.

Item 20: A nucleic acid construct (NAC) comprising a nucleic acid of item 19 and one or more additional sequence features permitting the expression of the encoded ABP, or a component of said ABP (such as an antibody heavy chain or light chain) in a (host) cell.

Item 21: A recombinant host cell comprising a nucleic acid of item 19 or a NAC according to item 20.

Item 22: A pharmaceutical composition comprising: (i) an ABP of any one of items 1 to 18, or (ii) a nucleic acid of item 19 or a NAC according to item 20, or (iii) a recombinant host cell according to item 21, and a pharmaceutically acceptable carrier, stabiliser and/or excipient.

Item 23: A component for use in medicine, wherein the component is selected from the list consisting of: an ABP of any one of items 1 to 18, an isolated nucleic acid of item 19 or a NAC according to item 20, a recombinant host cell according to item 21 and a pharmaceutical composition according to item 22.

Item 24: The component for use of item 23, wherein the component is for use modulating a cell-mediated immune response in a subject.

Item 25: The component for use of item 24, wherein modulating the immune response is an inhibition of a cell mediated immune response.

Item 26: The component for use according to item 25, wherein the inhibition is an inhibition of proliferation of an immune cell, such as a lymphocyte, and/or is an inhibition of cytokine expression in an immune cell, such as a lymphocyte.

Item 27: The component for use according to item 24 or 25, wherein the inhibition of a cell mediated immune response is a reduction of proliferation/activity of effector memory T cells and/or increase of proliferation/activity of regulatory T cells (TREGs).

Item 28: The component for use according to any one of items 23 to 27, wherein the use is for the treatment of a pathological immune response, and preferably is for use in the treatment of an inflammatory disease, autoimmune disease, allo-graft rejection (graft vs host disease).

Item 29: A method of modulating a cell-mediated immune response in a human cell that expresses human TIRC7, comprising contacting said cell with a component recited in item 23, in the presence of an immune cell, such as a T-cell, thereby modulating, preferably inhibiting, the cell-mediated immune response.

Item 30: A method for the prevention and/or treatment of a disorder associated with a pathological immune response in a subject, comprising the administration of a therapeutically effective amount of a component recited in item 23 to the subject; and wherein the disorder associated with a pathological immune response is characterized by an expression/activity of TIRC7 in cells associated with the disorder.

The terms "of the [present] invention", "in accordance with the invention", "according to the invention" and the like, as used herein are intended to refer to all aspects and embodiments of the invention described and/or claimed herein.

As used herein, the term "comprising" is to be construed as encompassing both "including" and "consisting of", both meanings being specifically intended, and hence individually disclosed embodiments in accordance with the present invention. Where used herein, "and/or" is to be taken as specific disclosure of each of the two specified features or components with or without the other. For example, "A and/or B" is to be taken as specific disclosure of each of (i) A, (ii) B and (iii) A and B, just as if each is set out individually herein. In the context of the present invention, the terms "about" and "approximately" denote an interval of accuracy that the person skilled in the art will understand to still ensure the technical effect of the feature in question. The term typically indicates deviation from the indicated numerical value by ±20%, ±15%, ±10%, and for example ±5%. As will be appreciated by the person of ordinary skill, the specific such deviation for a numerical value for a given technical effect will depend on the nature of the technical effect. For example, a natural or biological technical effect may generally have a larger such deviation than one for a man-made or engineering technical effect. As will be appreciated by the person of ordinary skill, the specific such deviation for a numerical value for a given technical effect will depend on the nature of the technical effect. For example, a natural or biological technical effect may generally have a larger such deviation than one for a man-made or engineering technical effect. Where an indefinite or definite article is used when referring to a singular noun, e.g. "a", "an" or "the", this includes a plural of that noun unless something else is specifically stated.

It is to be understood that application of the teachings of the present invention to a specific problem or environment, and the inclusion of variations of the present invention or additional features thereto (such as further aspects and embodiments), will be within the capabilities of one having ordinary skill in the art in light of the teachings contained herein.

Unless context dictates otherwise, the descriptions and definitions of the features set out above are not limited to any particular aspect or embodiment of the invention and apply equally to all aspects and embodiments which are described.

All references, patents, and publications cited herein are hereby incorporated by reference in their entirety.

In view of the above, it will be appreciated that the present invention also relates to the following itemised embodiments:

It

BRIEF DESCRIPTION OF THE FIGURES AND SEQUENCES

The figures show:

Figure 3:
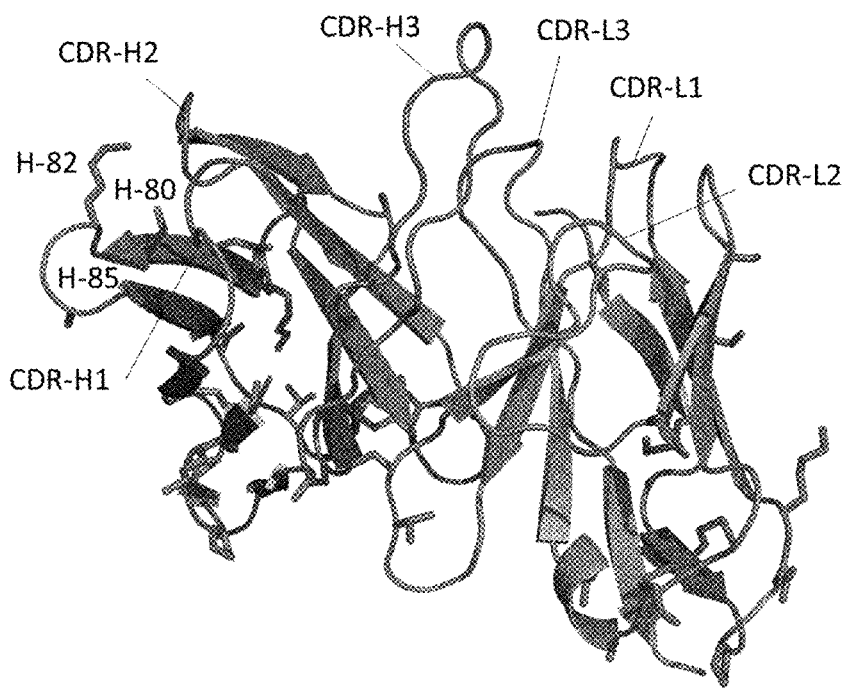

FIG. 3 shows a Model of the 17-20 VH and VL domains. CDR regions are indicated. The differences between the chimeric antibody cAb1457-10.0 and the humanized antibody cAb1459-10.0 are shown with amino acid side chains represented as "sticks". The majority of humanized sites appear to have no influence on the CDRs but positions H-80, H-82 and H-85 are very close to CDRs H1 and H2, potentially having an impact on their folding and orientation.

FIG. 4 shows an alignment of humanized VH sequences with the original parental sequence. CDRs are indicated supporting amino acids are in additional boxes.

FIG. 5 shows an Alignment of humanized VL sequences with the original parental sequence. CDRs are indicated supporting amino acids are in additional boxes.

Figure 6:
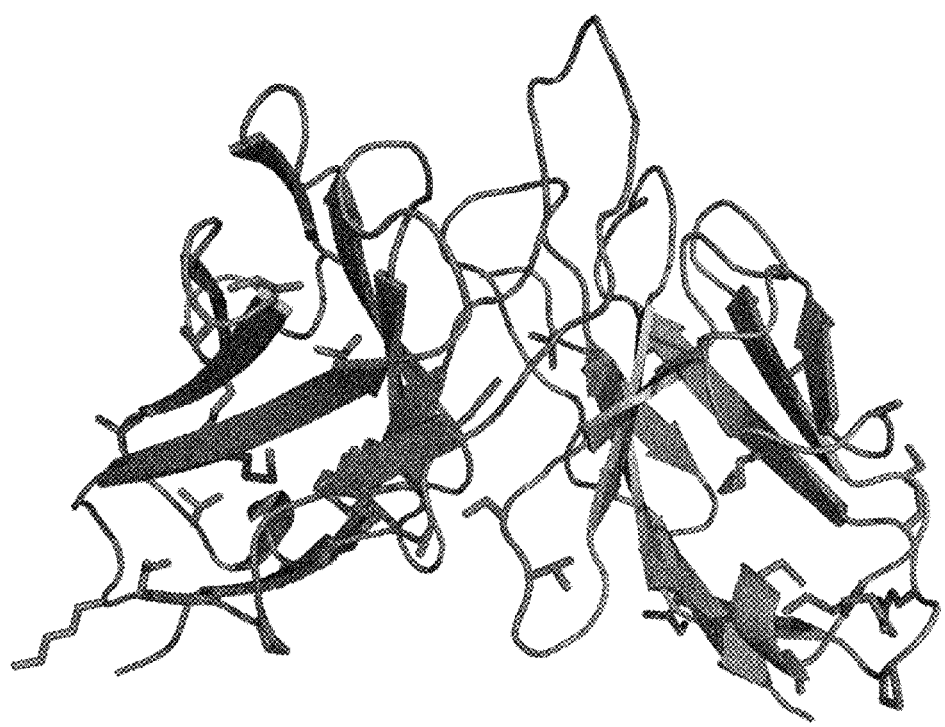

FIG. 6 shows a model of the 17-20 (parent) VH and VL domains. CDRs of heavy and light chains are indicated.

FIG. 7 shows a comparison of antibodies of the invention sorted by protein yield. Further indicated is purified protein (%), and monomer content (%).

FIG. 8 shows a comparison of the biological activity of antibodies of the invention sorted by protein yield. Amount of inhibition of IFNg production, induction of TIRC7+ cells, induction of TIRC7+ TREGs and Induction of TREGs is shown with the following coding: *=weak effect→*****=very strong effect.

Figure 9:
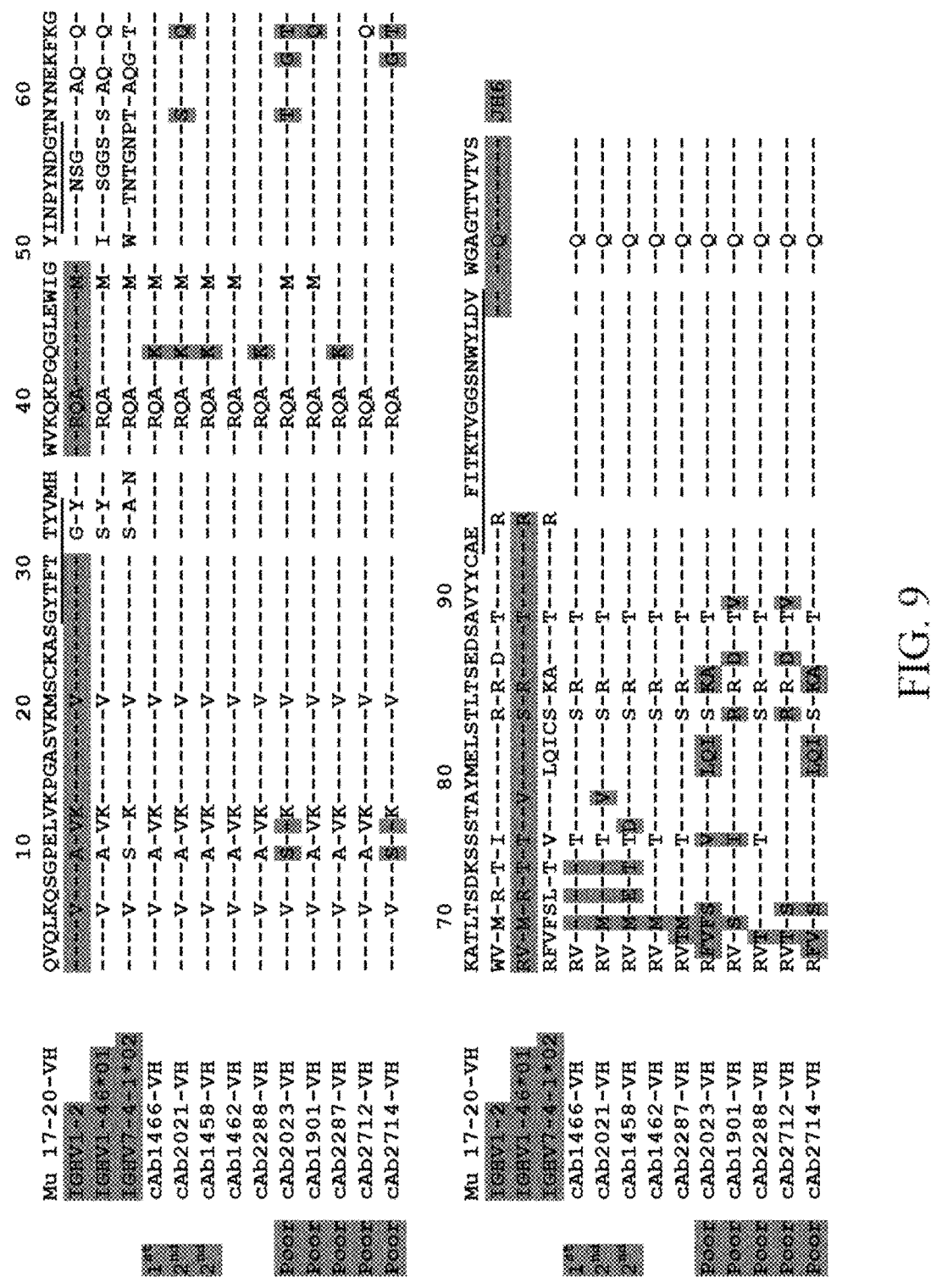

FIG. 9 shows an VH chain humanization alignment—ranked by production and function (FIGS. 7 and 8). Potential interesting sites are highlighted. In these diagrams, the numbering and CDR positioning is according to Chothia et al. (1992) J. Mol. Biol., 227, 776-798, Tomlinson et al. (1995) EMBO J., 14, 4628-4638 and Williams et al. (1996) J. Mol. Biol., 264, 220-232 (Example given in VBase. https://www2.mrc-mb.cam.ac.uk/vbase/alignments2.php #JHEX). The chain "Mu 17-20-VK denotes the murine parent sequence also referred to as cAB1457 herein). CDR regions are underlined.

Figure 10:
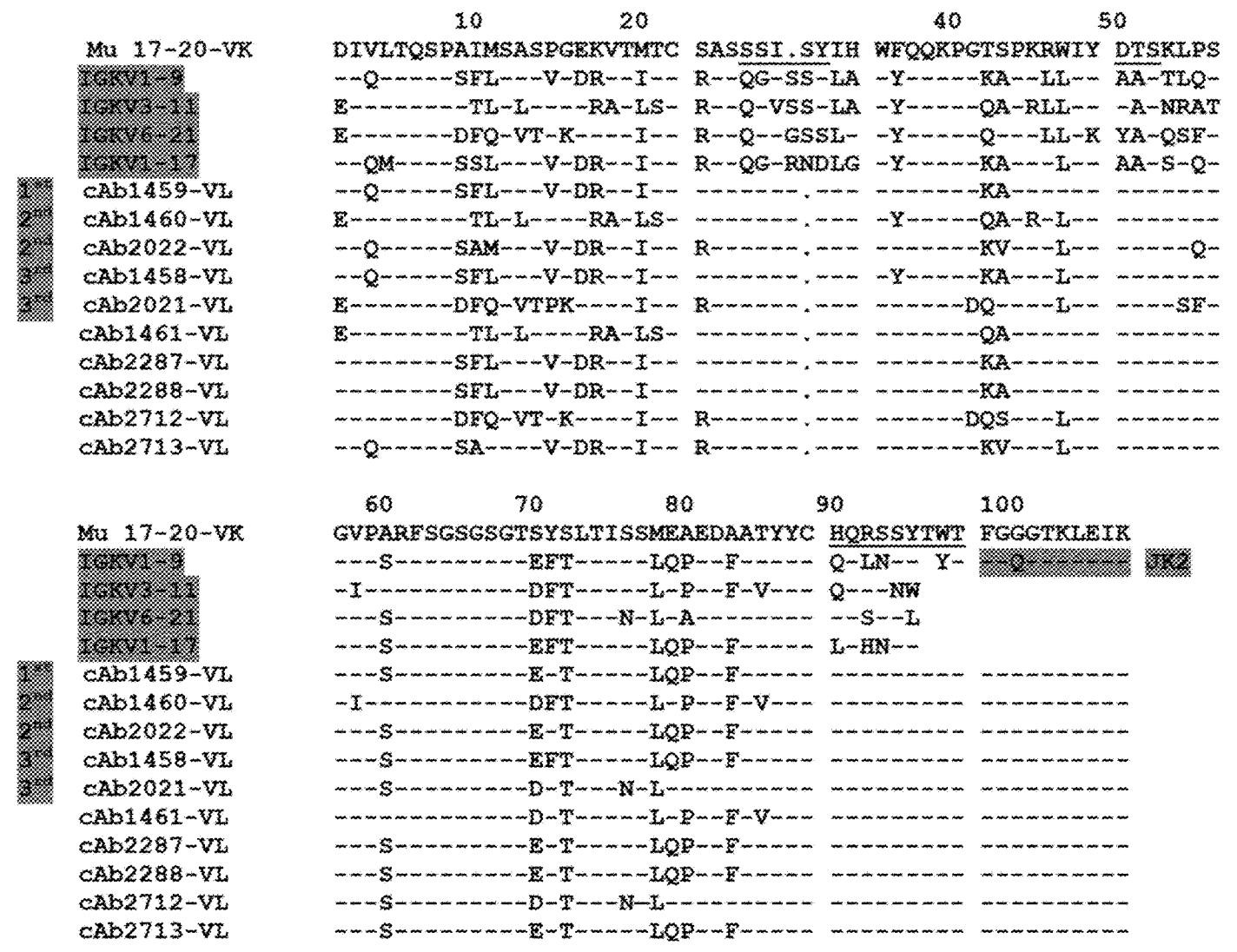

FIG. 10 shows an VL chain humanization alignment—ranked by production and function (FIGS. 9 and 10). In these diagrams, the numbering and CDR positioning is according to Chothia et al. (1992) J. Mol. Biol., 227, 776-798, Tomlinson et al. (1995) EMBO J., 14, 4628-4638 and Williams et al. (1996) J. Mol. Biol., 264, 220-232 (Example given in VBase. https://www2.mrc-lmb.cam.ac.uk/vbase/alignments2.php #JHEX). The chain "Mu 17-20-VK denotes the murine parent sequence also referred to as cAB1457 herein). CDR regions are underlined.

Figure 11:
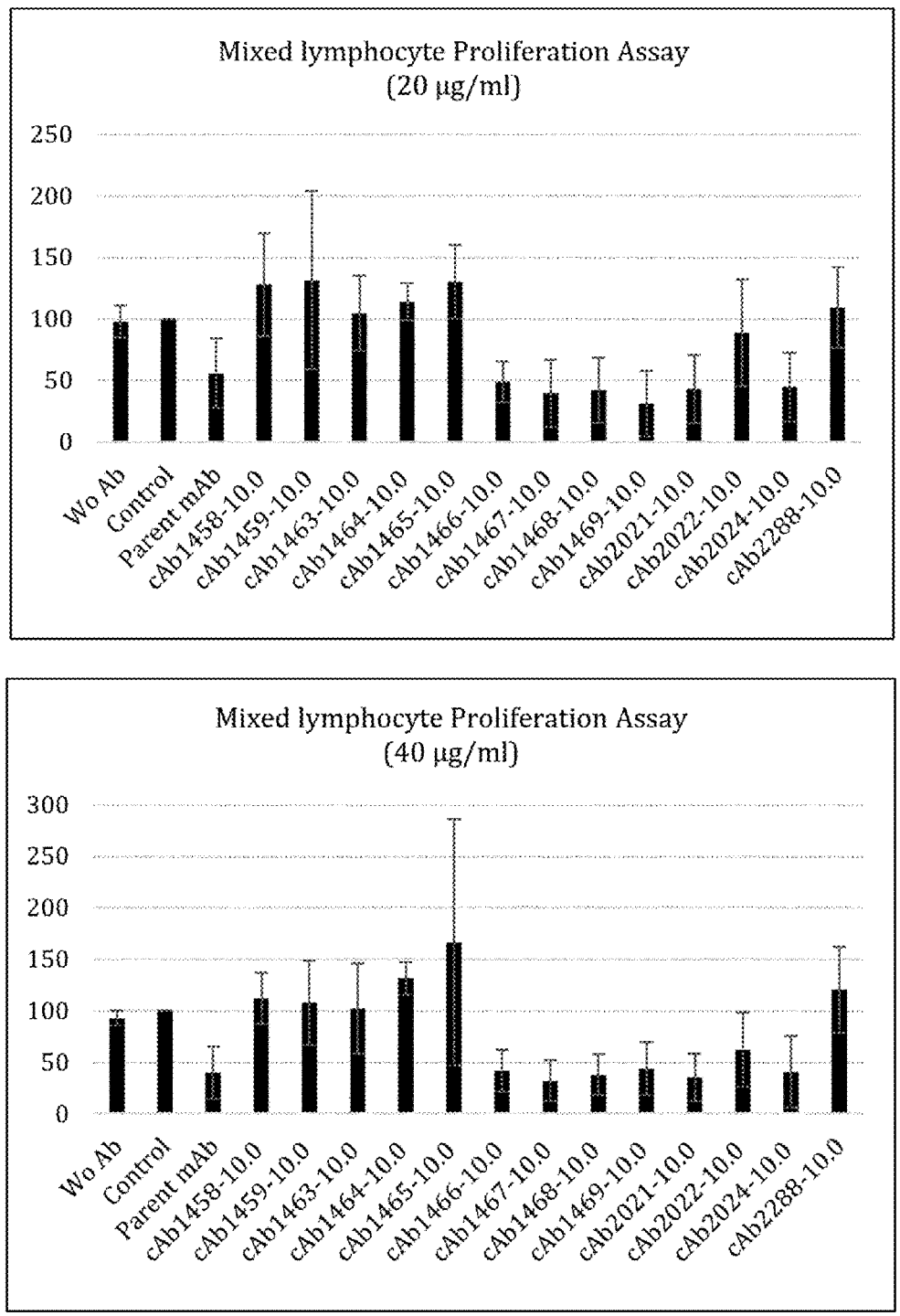

FIG. 11 shows a proliferation assay of mixed lymphocytes treated with antibody variants of the invention after allo-stimulation. Top panel shows an experiment with 20 µg/ml of tested antibody, lower panel with 40 µg/ml of tested antibody. Controls are no antibody treatment, IgG control and the parent chimeric antibody. Antibody numbering is as indicated in table 1. Patent Control pertains to the use of the parent mouse antibody (cAb1457). Shown are mean values of 3 independent experiments.

Figure 12:
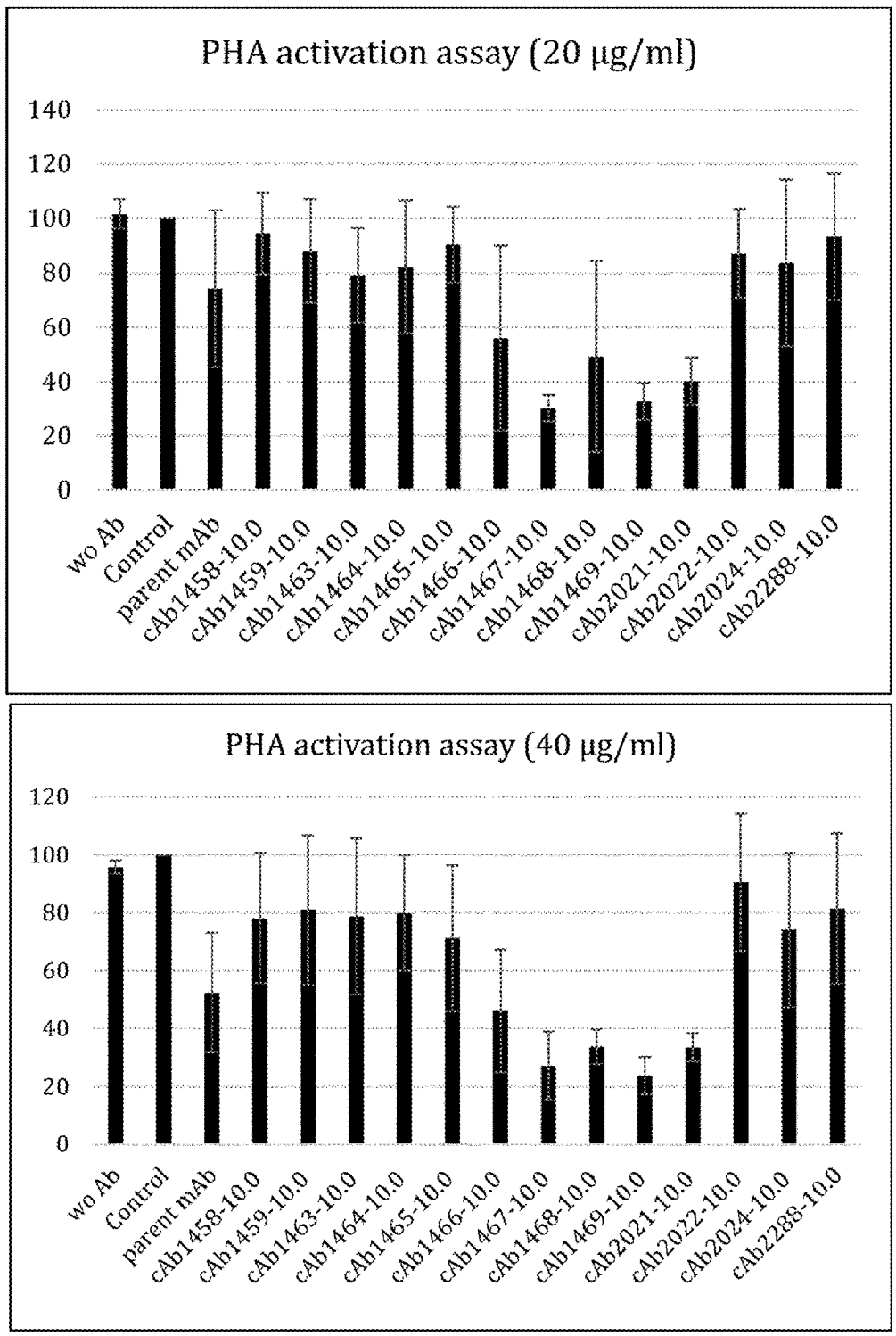

FIG. 12. shows a proliferation assay of lymphocytes treated with antibody variants of the invention after Phytohaemagglutinin (PHA)-stimulation mitogen. Top panel shows an experiment with 20 µg/ml of tested antibody, lower panel with 40 µg/ml of tested antibody. Controls are no antibody treatment, IgG control and the parent chimeric antibody. Antibody numbering is as indicated in table 1. Patent Control pertains to the use of the parent mouse antibody (cAb1457). Shown are mean values of 3 independent experiments.

The ABP of the invention are all described in the sequence listing and the following table 1:

| SEQ ID NO: | Antibody Name | Description | Sequence |
|---|---|---|---|
| 1 | cAb1457 | CDRH1 | GYTFTTYV |
| 2 | cAb1457 | CDRH2 | INPYNDGT |
| 3 | cAb1457 | CDRH3 | AEFITKTVGGSNWYLDV |
| 4 | cAb1457 | HCV | QVQLKQSGPELVKPGASVKMSCKASGYTFTTYV MHWVKQKPGQGLEWIGYINPYNDGTNYNEKF KGKATLTSDKSSSTAYMELSTLTSEDSAVYYCAE FITKTVGGSNWYLDVWGAGTTVTVSS |
| 5 | cAb1457 | CDRL1 | SSISY |
| 6 | cAb1457 | CDRL2 | DTS |
| 7 | cAb1457 | CDRL3 | HQRSSYTWT |
| 8 | cAb1457 | LCV | DIVLTQSPAIMSASPGEKVTMTCSASSSISYIHW FQQKPGTSPKRWIYDTSKLPSGVPARFSGSGSG TSYSLTISSMEAEDAATYYCHQRSSYTWTFGGG TKLEIK |

-continued

| SEQ ID NO: | Antibody Name | Description | Sequence |
|---|---|---|---|
| 9 | cAb1458 | HCV | QVQLVQSGAEVKKPGASVKVSCKASGYTFTTYV MHWVRQAPGKGLEWMGYINPYNDGTNYNEK FKGRVTMTEDTSTDTAYMELSSLRSEDTAVYYC AEFITKTVGGSNWYLDVWGQGTTVTVSS |
| 10 | cAb1458 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 11 | cAb1459 | HCV | QVQLVQSGAEVKKPGASVKVSCKASGYTFTTYV MHWVRQAPGKGLEWMGYINPYNDGTNYNEK FKGRVTMTEDTSTDTAYMELSSLRSEDTAVYYC AEFITKTVGGSNWYLDVWGQGTTVTVSS |
| 12 | cAb1459 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 13 | cAb1460 | HCV | QVQLVQSGAEVKKPGASVKVSCKASGYTFTTYV MHWVRQAPGKGLEWMGYINPYNDGTNYNEK FKGRVTMTEDTSTDTAYMELSSLRSEDTAVYYC AEFITKTVGGSNWYLDVWGQGTTVTVSS |
| 14 | cAb1460 | LCV | EIVLTQSPATLSLSPGERATLSCSASSSISYIHWY QQKPGQAPRRLIYDTSKLPSGIPARFSGSGSGTD FTLTISSLEPEDFAVYYCHQRSSYTWTFGGGTKL EIK |
| 15 | cAb1461 | HCV | QVQLVQSGAEVKKPGASVKVSCKASGYTFTTYV MHWVRQAPGKGLEWMGYINPYNDGTNYNEK FKGRVTMTEDTSTDTAYMELSSLRSEDTAVYYC AEFITKTVGGSNWYLDVWGQGTTVTVSS |
| 16 | cAb1461 | LCV | EIVLTQSPATLSLSPGERATLSCSASSSISYIHWF QQKPGQAPKRWIYDTSKLPSGVPARFSGSGSGT DYTLTISSLEPEDFAVYYCHQRSSYTWTFGGGT KLEIK |
| 17 | cAb1462 | HCV | QVQLVQSGAEVKKPGASVKVSCKASGYTFTTYV MHWVRQAPGKGLEWMGYINPYNDGTNYNEK FKGRVTMTSDKSTAYMELSSLRSEDTAVYYC AEFITKTVGGSNWYLDVWGQGTTVTVSS |
| 18 | cAb1462 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 19 | cAb1463 | HCV | QVQLVQSGAEVKKPGASVKVSCKASGYTFTTYV MHWVRQAPGKGLEWMGYINPYNDGTNYNEK FKGRVTMTSDKSTAYMELSSLRSEDTAVYYC AEFITKTVGGSNWYLDVWGQGTTVTVSS |
| 20 | cAb1463 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 21 | cAb1464 | HCV | QVQLVQSGAEVKKPGASVKVSCKASGYTFTTYV MHWVRQAPGKGLEWMGYINPYNDGTNYNEK FKGRVTMTSDKSTAYMELSSLRSEDTAVYYC AEFITKTVGGSNWYLDVWGQGTTVTVSS |
| 22 | cAb1464 | LCV | EIVLTQSPATLSLSPGERATLSCSASSSISYIHWY QQKPGQAPRRLIYDTSKLPSGIPARFSGSGSGTD FTLTISSLEPEDFAVYYCHQRSSYTWTFGGGTKL EIK |
| 23 | cAb1465 | HCV | QVQLVQSGAEVKKPGASVKVSCKASGYTFTTYV MHWVRQAPGKGLEWMGYINPYNDGTNYNEK FKGRVTMTSDKSTAYMELSSLRSEDTAVYYC AEFITKTVGGSNWYLDVWGQGTTVTVSS |

| SEQ ID NO: | Antibody Name | Description | Sequence |
|---|---|---|---|
| 24 | cAb1465 | LCV | EIVLTQSPATLSLSPGERATLSCSASSSISYIHWFQQKPGQAPKRWIYDTSKLPSGVPARFSGSGSGTDYTLTISSLEPEDFAVYYCQRSSYTWTFGGGTKLEIK |
| 25 | cAb1466 | HCV | QVQLVQSGAEVKKPGASVKVSCKASGYTFTTYVMHWVRQAPGKGLEWMGYINPYNDGTNYNEKFKGRVTLTSDKSTSTAYMELSSLRSEDTAVYYCAEFITKTVGGSNWYLDVWGQGTTVTVSS |
| 26 | cAb1466 | LCV | DIQLTQSPSFLSASVGDRVTITCSASSSISYIHWYQQKPGKAPKRLIYDTSKLPSGVPSRFSGSGSGTEFTLTISSLQPEDFATYYCQRSSYTWTFGGGTKLEIK |
| 27 | cAb1467 | HCV | QVQLVQSGAEVKKPGASVKVSCKASGYTFTTYVMHWVRQAPGKGLEWMGYINPYNDGTNYNEKFKGRVTLTSDKSTSTAYMELSSLRSEDTAVYYCAEFITKTVGGSNWYLDVWGQGTTVTVSS |
| 28 | cAb1467 | LCV | DIQLTQSPSFLSASVGDRVTITCSASSSISYIHWFQQKPGKAPKRWIYDTSKLPSGVPSRFSGSGSGTEYTLTISSLQPEDFATYYCQRSSYTWTFGGGTKLEIK |
| 29 | cAb1468 | HCV | QVQLVQSGAEVKKPGASVKVSCKASGYTFTTYVMHWVRQAPGKGLEWMGYINPYNDGTNYNEKFKGRVTLTSDKSTSTAYMELSSLRSEDTAVYYCAEFITKTVGGSNWYLDVWGQGTTVTVSS |
| 30 | cAb1468 | LCV | EIVLTQSPATLSLSPGERATLSCSASSSISYIHWYQQKPGQAPRRLIYDTSKLPSGIPARFSGSGSGTDFTLTISSLEPEDFAVYYCQRSSYTWTFGGGTKLEIK |
| 31 | cAb1469 | HCV | QVQLVQSGAEVKKPGASVKVSCKASGYTFTTYVMHWVRQAPGKGLEWMGYINPYNDGTNYNEKFKGRVTLTSDKSTSTAYMELSSLRSEDTAVYYCAEFITKTVGGSNWYLDVWGQGTTVTVSS |
| 32 | cAb1458 | LCV | EIVLTQSPATLSLSPGERATLSCSASSSISYIHWFQQKPGQAPKRWIYDTSKLPSGVPARFSGSGSGTDYTLTISSLEPEDFAVYYCQRSSYTWTFGGGTKLEIK |
| 33 | cAb1901 | HCV | QVQLVQSGAEVKKPGASVKVSCKASGYTFTTYVMHWVRQAPGQGLEWMGYINPYNDGTNYNEKFQGRVTSTSDKSISTAYMELSRLRSDDTVVYYCAEFITKTVGGSNWYLDVWGQGTTVTVSS |
| 34 | cAb1901 | LCV | DIQLTQSPSFLSASVGDRVTITCSASSSISYIHWFQQKPGKAPKRWIYDTSKLPSGVPSRFSGSGSGTEYTLTISSLQPEDFATYYCQRSSYTWTFGGGTKLEIK |
| 35 | cAb2021 | HCV | QVQLVQSGAEVKKPGASVKVSCKASGYTFTTYVMHWVRQAPGQGLEWMGYINPYNDGTSYNEKFQGRVTMTSDKSTSTVYMELSSLRSEDTAVYYCAEFITKTVGGSNWYLDVWGQGTTVTVSS |
| 36 | cAb2021 | LCV | EIVLTQSPDFQSVTPKEKVTITCRASSSISYIHWFQQKPDQSPKRLIYDTSKSFSGVPSRFSGSGSGTDYTLTINSLEAEDAATYYCQRSSYTWTFGGGTKLEIK |
| 37 | cAb2022 | HCV | QVQLVQSGAEVKKPGASVKVSCKASGYTFTTYVMHWVRQAPGQGLEWMGYINPYNDGTSYNEKFQGRVTMTSDKSTSTVYMELSSLRSEDTAVYYCAEFITKTVGGSNWYLDVWGQGTTVTVSS |
| 38 | cAb2022 | LCV | DIQLTQSPSAMSASVGDRVTITCRASSSISYIHWFQQKPGKVPKRLIYDTSKLQSGVPSRFSGSGSGTEYTLTISSLQPEDFATYYCQRSSYTWTFGGGTKLEIK |

-continued

| SEQ ID NO: | Antibody Name | Description | Sequence |
|---|---|---|---|
| 39 | cAb2023 | HCV | QVQLVQSGSELKKPGASVKVSCKASGYTFTTYV MHWVRQAPGQGLEWMGYINPYNDGTTYNEG FTGRFVFSSDKSVSTAYLQISSLKAEDTAVYYCA EFITKTVGGSNWYLDVWGQGTTVTVSS |
| 40 | cAb2023 | LCV | EIVLTQSPDFQSVTPKEKVTITCRASSSISYIHW QQKPDQSPKRLIYDTSKSFSGVPSRFSGSGSGTD YTLTINSLEAEDAATYYCHQRSSYTWTFGGGTK LEIK |
| 41 | cAb2024 | HCV | QVQLVQSGSELKKPGASVKVSCKASGYTFTTYV MHWVRQAPGQGLEWMGYINPYNDGTTYNEG FTGRFVFSSDKSVSTAYLQISSLKAEDTAVYYCA EFITKTVGGSNWYLDVWGQGTTVTVSS |
| 42 | cAb2024 | LCV | DIQLTQSPSAMSASVGDRVTITCRASSSISYIHW FQQKPGKVPKRLIYDTSKLQSGVPSRFSGSGSGT EYTLTISSLQPEDFATYYCHQRSSYTWTFGGGT KLEIK |
| 43 | cAb2287 | HCV | QVQLVQSGAEVKKPGASVKVSCKASGYTFTTYV MHWVRQAPGKGLEWIGYINPYNDGTNYNEKF KGRVTMTSDKSTSTAYMELSSLRSEDTAVYYCA EFITKTVGGSNWYLDVWGQGTTVTVSS |
| 44 | cAb2287 | LCV | DIVLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 45 | cAb2288 | HCV | QVQLVQSGAEVKKPGASVKVSCKASGYTFTTYV MHWVRQAPGKGLEWIGYINPYNDGTNYNEKF KGRVTLTSDKSTSTAYMELSSLRSEDTAVYYCAE FITKTVGGSNWYLDVWGQGTTVTVSS |
| 46 | cAb2288 | LCV | DIVLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 47 | cAb2712 | HCV | QVQLVQSGAEVKKPGASVKVSCKASGYTFTTYV MHWVRQAPGQGLEWIGYINPYNDGTNYNEKF QGRVTLTSDKSSSTAYMELSRLRSDDTVVYYCA EFITKTVGGSNWYLDVWGQGTTVTVSS |
| 48 | cAb2712 | LCV | DIVLTQSPDFQSVTPKEKVTITCRASSSISYIHWF QQKPDQSPKRLIYDTSKLPSGVPSRFSGSGSGTD YTLTINSLEAEDAATYYCHQRSSYTWTFGGGTK LEIK |
| 49 | cAb2713 | HCV | QVQLVQSGAEVKKPGASVKVSCKASGYTFTTYV MHWVRQAPGQGLEWIGYINPYNDGTNYNEKF QGRVTLTSDKSSSTAYMELSRLRSDDTVVYYCA EFITKTVGGSNWYLDVWGQGTTVTVSS |
| 50 | cAb2713 | LCV | DIQLTQSPSAMSASVGDRVTITCRASSSISYIHW FQQKPGKVPKRLIYDTSKLPSGVPSRFSGSGSGT EYTLTISSLQPEDFATYYCHQRSSYTWTFGGGT KLEIK |
| 51 | cAb2714 | HCV | QVQLVQSGSELKKPGASVKVSCKASGYTFTTYV MHWVRQAPGQGLEWIGYINPYNDGTNYNEGF TGRFVLSSDKSSSTAYLQISSLKAEDTAVYYCAE FITKTVGGSNWYLDVWGQGTTVTVSS |
| 52 | cAb2714 | LCV | DIVLTQSPDFQSVTPKEKVTITCRASSSISYIHWF QQKPDQSPKRLIYDTSKLPSGVPSRFSGSGSGTD YTLTINSLEAEDAATYYCHQRSSYTWTFGGGTK LEIK |
| 53 | cAb2715 | HCV | QVQLVQSGSELKKPGASVKVSCKASGYTFTTYV MHWVRQAPGQGLEWIGYINPYNDGTNYNEGF TGRFVLSSDKSSSTAYLQISSLKAEDTAVYYCAE FITKTVGGSNWYLDVWGQGTTVTVSS |

| SEQ ID NO: | Antibody Name | Description | Sequence |
|---|---|---|---|
| 54 | cAb2715 | LCV | DIQLTQSPSAMSASVGDRVTITCRASSSISYIHW FQQKPGKVPKRLIYDTSKLPSGVPSRFSGSGSGT EYTLTISSLQPEDFATYYCHQRSSYTWTFGGGT KLEIK |
| 55 | cAb3458 | HCV | QVQLVQSGAEVKKPGASVKVSCKASGYTFTTYV MHWVRQAPGKGLEWMGYINPYNDGTNYNEK FKGRVTLTEDTSTDTAYMELSSLRSEDTAVYYC AEFITKTVGGSNWYLDVWGQGTTVTVSS |
| 56 | cAb3458 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 57 | cAb3459 | HCV | QVQLVQSGAEVKKPGASVKVSCKASGYTFTTYV MHWVRQAPGKGLEWMGYINPYNDGTNYNEK FKGRVTLTEDTSTDTAYMELSSLRSEDTAVYYC AEFITKTVGGSNWYLDVWGQGTTVTVSS |
| 58 | cAb3459 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 59 | cAb3460 | HCV | QVQLVQSGAEVKKPGASVKVSCKASGYTFTTYV MHWVRQAPGKGLEWMGYINPYNDGTNYNEK FKGRVTLTEDTSTDTAYMELSSLRSEDTAVYYC AEFITKTVGGSNWYLDVWGQGTTVTVSS |
| 60 | cAb3460 | LCV | EIVLTQSPATLSLSPGERATLSCSASSSISYIHWY QQKPGQAPRRLIYDTSKLPSGIPARFSGSGSGTD FTLTISSLEPEDFAVYYCHQRSSYTWTFGGGTKL EIK |
| 61 | cAb3461 | HCV | QVQLVQSGAEVKKPGASVKVSCKASGYTFTTYV MHWVRQAPGKGLEWMGYINPYNDGTNYNEK FKGRVTLTEDTSTDTAYMELSSLRSEDTAVYYC AEFITKTVGGSNWYLDVWGQGTTVTVSS |
| 62 | cAb3461 | LCV | EIVLTQSPATLSLSPGERATLSCSASSSISYIHWF QQKPGQAPKRWIYDTSKLPSGVPARFSGSGSGT DYTLTISSLEPEDFAVYYCHQRSSYTWTFGGGT KLEIK |
| 63 | cAb3462 | HCV | QVQLVQSGAEVKKPGASVKVSCKASGYTFTTYV MHWVRQAPGKGLEWMGYINPYNDGTNYNEK FKGRVTMTSDTSTDTAYMELSSLRSEDTAVYYC AEFITKTVGGSNWYLDVWGQGTTVTVSS |
| 64 | cAb3462 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 65 | cAb3463 | HCV | QVQLVQSGAEVKKPGASVKVSCKASGYTFTTYV MHWVRQAPGKGLEWMGYINPYNDGTNYNEK FKGRVTMTSDTSTDTAYMELSSLRSEDTAVYYC AEFITKTVGGSNWYLDVWGQGTTVTVSS |
| 66 | cAb3463 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 67 | cAb3464 | HCV | QVQLVQSGAEVKKPGASVKVSCKASGYTFTTYV MHWVRQAPGKGLEWMGYINPYNDGTNYNEK FKGRVTMTSDTSTDTAYMELSSLRSEDTAVYYC AEFITKTVGGSNWYLDVWGQGTTVTVSS |
| 68 | cAb3464 | LCV | EIVLTQSPATLSLSPGERATLSCSASSSISYIHWY QQKPGQAPRRLIYDTSKLPSGIPARFSGSGSGTD FTLTISSLEPEDFAVYYCHQRSSYTWTFGGGTKL EIK |

-continued

| SEQ ID NO: | Antibody Name | Description | Sequence |
|---|---|---|---|
| 69 | cAb3465 | HCV | QVQLVQSGAEVKKPGASVKVSCKASGYTFTTYV MHWVRQAPGKGLEWMGYINPYNDGTNYNEK FKGRVTMTSDTSTDTAYMELSSLRSEDTAVYYC AEFITKTVGGSNWYLDVWGQGTTVTVSS |
| 70 | cAb3465 | LCV | EIVLTQSPATLSLSPGERATLSCSASSSISYIHWF QQKPGQAPKRWIYDTSKLPSGVPARFSGSGSGT DYTLTISSLEPEDFAVYYCHQRSSYTWTFGGGT KLEIK |
| 71 | cAb3466 | HCV | QVQLVQSGAEVKKPGASVKVSCKASGYTFTTYV MHWVRQAPGKGLEWMGYINPYNDGTNYNEK FKGRVTMTEDKSTDTAYMELSSLRSEDTAVYYC AEFITKTVGGSNWYLDVWGQGTTVTVSS |
| 72 | cAb3466 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 73 | cAb346y | HCV | QVQLVQSGAEVKKPGASVKVSCKASGYTFTTYV MHWVRQAPGKGLEWMGYINPYNDGTNYNEK FKGRVTMTEDKSTDTAYMELSSLRSEDTAVYYC AEFITKTVGGSNWYLDVWGQGTTVTVSS |
| 74 | cAb3467 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 75 | cAb3468 | HCV | QVQLVQSGAEVKKPGASVKVSCKASGYTFTTYV MHWVRQAPGKGLEWMGYINPYNDGTNYNEK FKGRVTMTEDKSTDTAYMELSSLRSEDTAVYYC AEFITKTVGGSNWYLDVWGQGTTVTVSS |
| 76 | cAb3468 | LCV | EIVLTQSPATLSLSPGERATLSCSASSSISYIHWY QQKPGQAPRRLIYDTSKLPSGIPARFSGSGSGTD FTLTISSLEPEDFAVYYCHQRSSYTWTFGGGTKL EIK |
| 77 | cAb3469 | HCV | QVQLVQSGAEVKKPGASVKVSCKASGYTFTTYV MHWVRQAPGKGLEWMGYINPYNDGTNYNEK FKGRVTMTEDKSTDTAYMELSSLRSEDTAVYYC AEFITKTVGGSNWYLDVWGQGTTVTVSS |
| 78 | cAb3469 | LCV | EIVLTQSPATLSLSPGERATLSCSASSSISYIHWF QQKPGQAPKRWIYDTSKLPSGVPARFSGSGSGT DYTLTISSLEPEDFAVYYCHQRSSYTWTFGGGT KLEIK |
| 79 | cAb3470 | HCV | QVQLVQSGAEVKKPGASVKVSCKASGYTFTTYV MHWVRQAPGKGLEWMGYINPYNDGTNYNEK FKGRVTMTEDTSTAYMELSSLRSEDTAVYYC AEFITKTVGGSNWYLDVWGQGTTVTVSS |
| 80 | cAb3470 | LCV | DIQLTQSPSFLSASVGDRVTITCSASSSISYIHWY QQKPGKAPKRLIYDTSKLPSGVPSRFSGSGSGTE FTLTISSLQPEDFATYYCHQRSSYTWTFGGGTKL EIK |
| 81 | cAb3471 | HCV | QVQLVQSGAEVKKPGASVKVSCKASGYTFTTYV MHWVRQAPGKGLEWMGYINPYNDGTNYNEK FKGRVTMTEDTSTAYMELSSLRSEDTAVYYC AEFITKTVGGSNWYLDVWGQGTTVTVSS |
| 82 | cAb3471 | LCV | DIQLTQSPSFLSASVGDRVTITCSASSSISYIHWF QQKPGKAPKRWIYDTSKLPSGVPSRFSGSGSGT EYTLTISSLQPEDFATYYCHQRSSYTWTFGGGT KLEIK |
| 83 | cAb3472 | HCV | QVQLVQSGAEVKKPGASVKVSCKASGYTFTTYV MHWVRQAPGKGLEWMGYINPYNDGTNYNEK FKGRVTMTEDTSTAYMELSSLRSEDTAVYYC AEFITKTVGGSNWYLDVWGQGTTVTVSS |

-continued

| SEQ ID NO: | Antibody Name | Description | Sequence |
|---|---|---|---|
| 84 | cAb3472 | LCV | EIVLTQSPATLSLSPGERATLSCSASSSISYIHWY<br>QQKPGQAPRRLIYDTSKLPSGIPARFSGSGSGTD<br>FTLTISSLEPEDFAVYYCHQRSSYTWTFGGGTKL<br>EIK |
| 85 | cAb3473 | HCV | QVQLVQSGAEVKKPGASVKVSCKASGYTFTTYV<br>MHWVRQAPGKGLEWMGYINPYNDGTNYNEK<br>FKGRVTMTEDTSTSTAYMELSSLRSEDTAVYYC<br>AEFITKTVGGSNWYLDVWGQGTTVTVSS |
| 86 | cAb3473 | LCV | EIVLTQSPATLSLSPGERATLSCSASSSISYIHWF<br>QQKPGQAPKRWIYDTSKLPSGVPARFSGSGSGT<br>DYTLTISSLEPEDFAVYYCHQRSSYTWTFGGGT<br>KLEIK |

CDRH (Complementary Determining Region Heavy Chain);
CDRL (Complementary Determining Region Light Chain);
HCV (Heavy Chain Variable);
LCV (Light Chain Variable)

EXAMPLES

Certain aspects and embodiments of the invention will now be illustrated by way of example and with reference to the description, figures and tables set out herein. Such examples of the methods, uses and other aspects of the present invention are representative only, and should not be taken to limit the scope of the present invention to only such representative examples.

The examples show:

Example 1: Generation of Variant and Humanized Anti-TIRC7 Antibodies

For the purpose of identifying complementarity determining regions (CDRs) and analyzing the closest matching germline sequences the IMGT Domain Gap Align tool was used: http://www.imgt.org/3Dstructure-DB/cgi/DomainGapAlign.cgi.

Molecular models were built for VH and VL domains based on homology to previously published antibody crystal structures using in-house software. PDB files can be provided on request for viewing in any molecular visualization software. Images have been generated using PyMol.

Variable heavy and variable light domains were designed with appropriate restriction sites at the 5' and 3' ends to enable cloning into Absolute Antibody® cloning and expression vectors. Variable domains sequences were codon optimized for expression in human cells. Following gene synthesis, the variable domains were cloned into Absolute Antibody® vectors of the appropriate species and type. The correct sequence was verified by Sanger sequencing with raw data analyzed using DNASTAR® Lasergene software. Once confirmed plasmid DNA preps of the appropriate size were performed to generate a sufficient quantity of high quality DNA for transfection.

HEK 293 (human embryonic kidney 293) mammalian cells were passaged to the optimum stage for transient transfection. Cells were transiently transfected with heavy and light chain expression vectors and cultured for a further 6 days. Cultures were harvested by centrifugation at 4000 rpm and filtered through a 0.22 µM filter. A first step of purification was performed by Protein A affinity chromatography with elution using citrate pH3.0 buffer followed by neutralization with 0.5M Tris, pH 9.0. Eluted protein was then buffer exchanged into PBS using a desalting column. Antibody concentration was determined by UV spectroscopy and the antibodies concentrated as necessary.

Antibody purity was determined by SDS-PAGE (sodium dodecyl sulphate polyacrylamide gel electrophoresis) and HPLC (high performance liquid chromatography). SEC-HPLC was performed on an Agilent 1100 series instrument using an appropriate size exclusion column (SEC). Antibody expression titer was determined by Protein A HPLC.

Figure 1A:
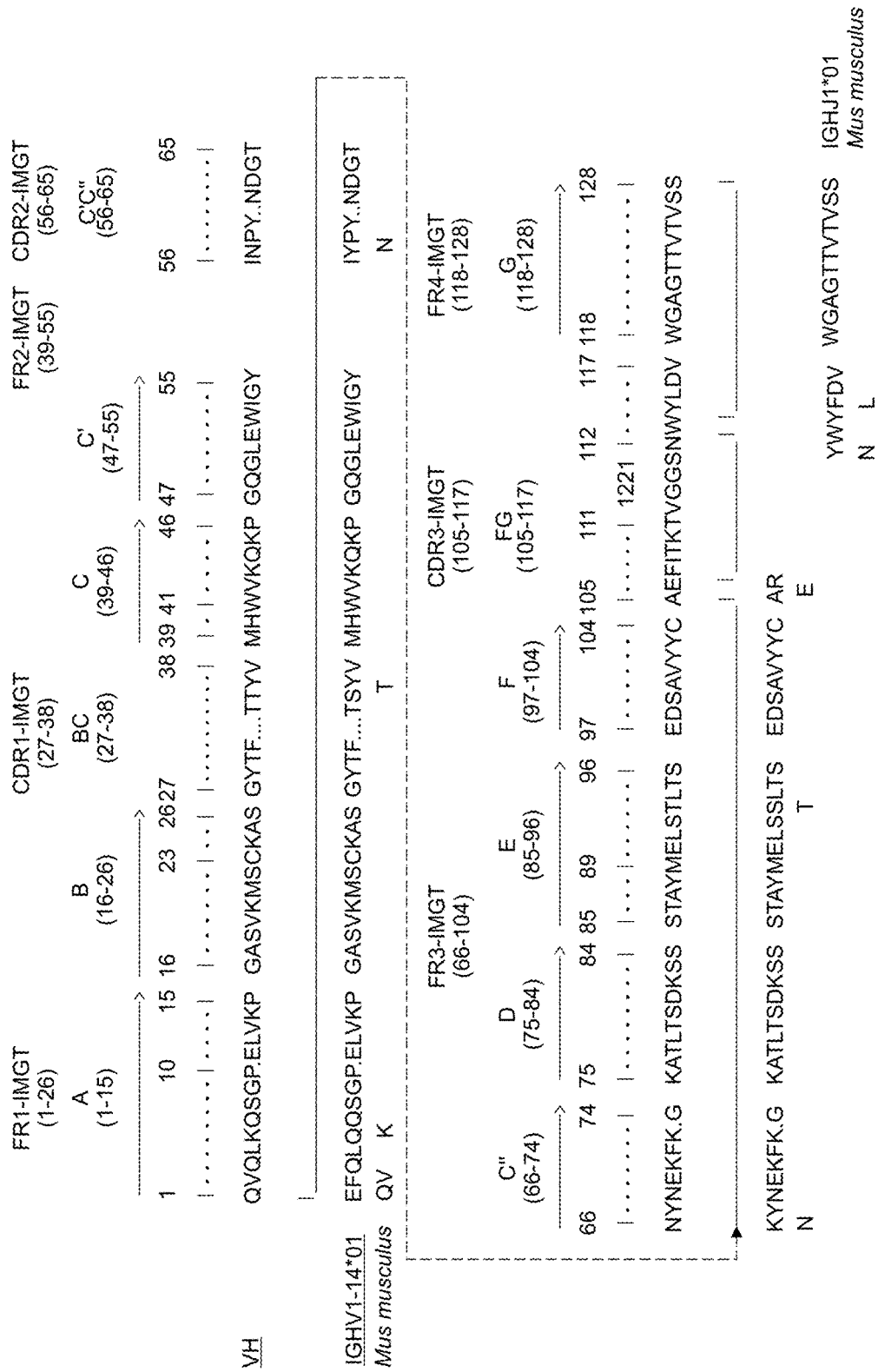
FIG. 1 shows an alignment and annotation of VH (A) and VL (B) sequences for 17-20 (parent mouse antibody) with the closest matching germline sequence.
Figure 1B:
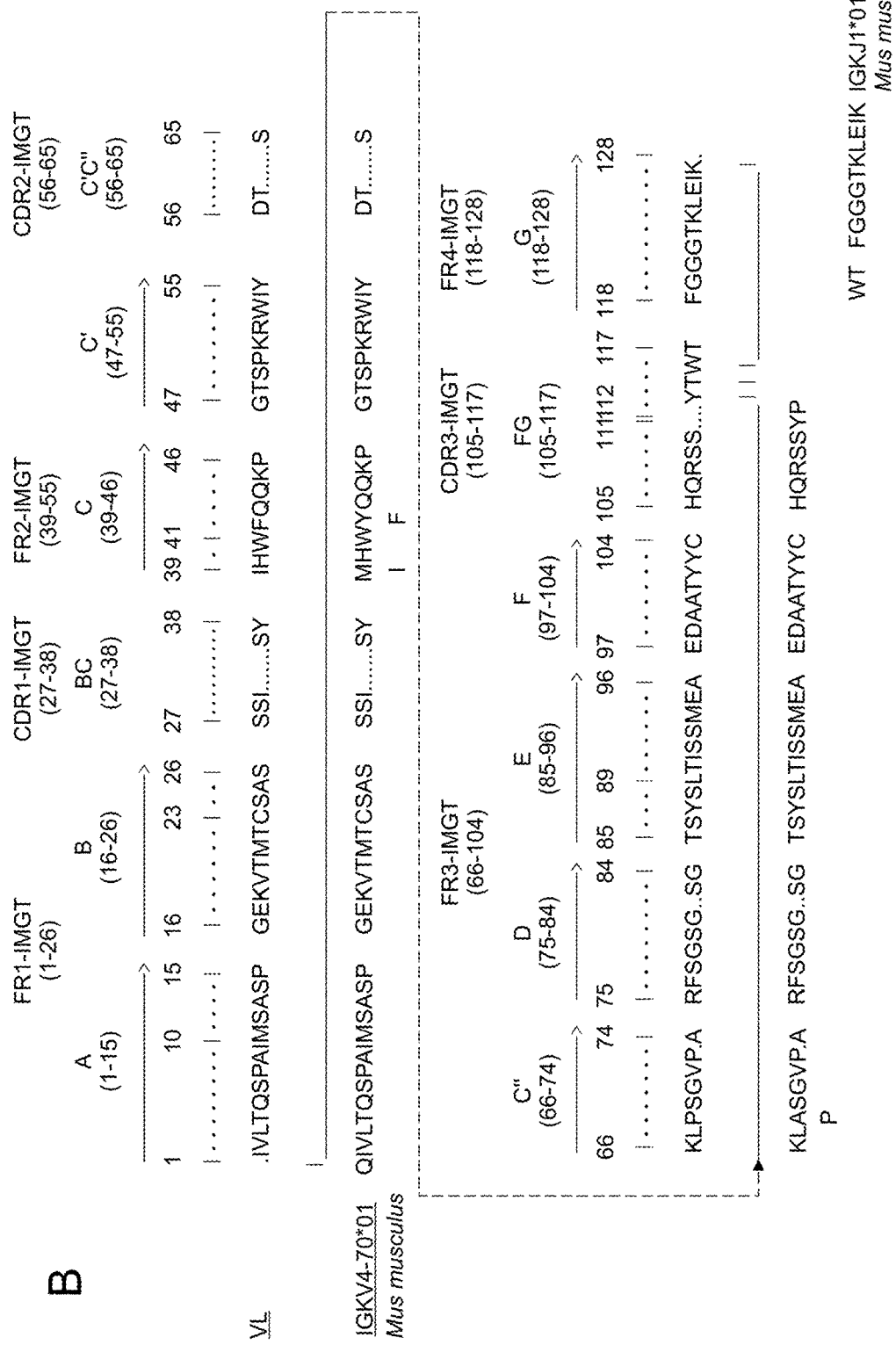

The VH and VL sequences for 17-20 were run through the IGMT Gap Align tool to analyse against all known antibody germline sequences (FIG. 1). CDR regions were assigned using the IMGT definition. As expected, the sequence is most closely aligned to mouse, specifically the IGHV1-2, IGHV1-46*01 and IGHV7-4-1*02 for the heavy chain and IGKV1-9, IGKV3-11, IGKV6-21*01 and IGKV1-17*03 for the light chain.

Figure 2:
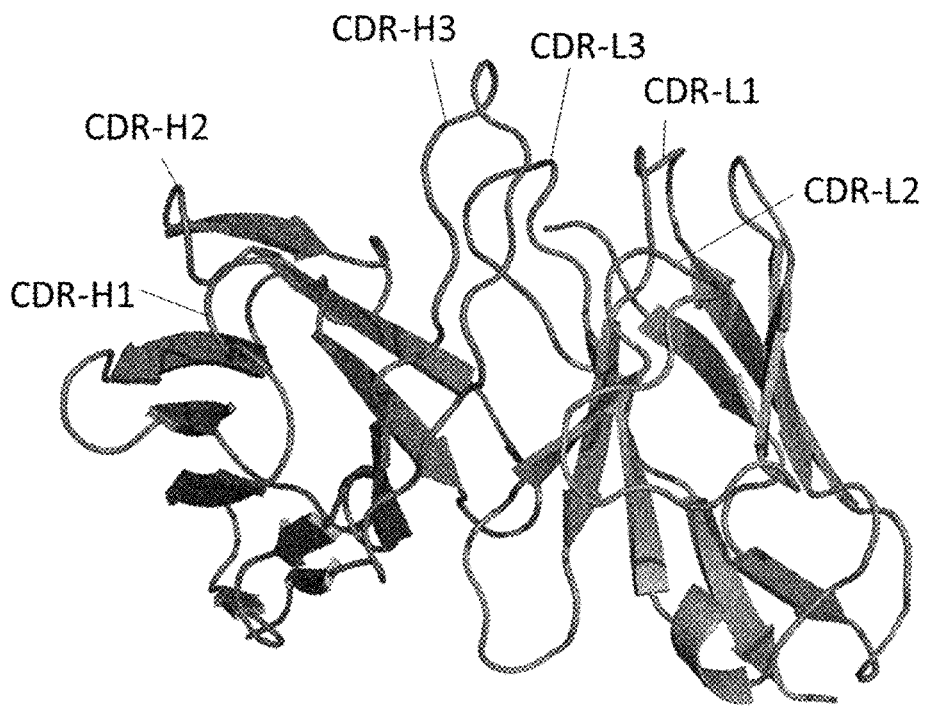
FIG. 2 shows a model of the 17-20 (parent antibody) VH and VL domains. CDR regions of the heavy and light chain are indicated.

To enable structure guided humanization models were built for the 17-20 murine VH and VL sequences, as shown in FIG. 2.

The VH and VL sequences were aligned to with an Absolute Antibody® database of human germline sequences. Table 1 shows the germline sequences that were selected as frameworks for humanization.

Tables 2 and 3: Heavy and light chain germline sequences selected as humanization frameworks and their percent identity to the original murine VH and VL sequences.

TABLE 2

| | Germline ID | Accession no. | % identity |
|---|---|---|---|
| Heavy chain | IGHV1-2 | X07448 | 71.13 |
| Light chain | IGKV1-9 | Z00013 | 63.83 |
| | IGKV3-11 | X01668 | 61.70 |

TABLE 3

| | Germline ID | % identity |
|---|---|---|
| Heavy chain | IGHV1-46*01 | 70.1 |
| | IGHV7-4-1*02 | 61.9 |

TABLE 3-continued

| | Germline ID | % identity |
|---|---|---|
| Light chain | IGKV6-21*01 | 66.7 |
| | IGKV1-17*03 | 66.0 |

The VH and VL sequences were run through a CDR grafting algorithm to transfer the CDRs from the murine antibody 17-20 onto the selected human germline sequences. Although CDRs are defined as being primarily responsible for binding to an antigen it is possible for amino acids outside of these regions, in what are known as framework regions, to either be involved directly in binding or to play a role in correctly orientating the CDRs. A structure guided approach was used to determine which of the framework amino acids to retain in the as the original mouse amino acid for the sake of retaining binding integrity (FIGS. 3 and 6). Table 1 contains the sequences that were generated.

Example 2: Germline Combination and Non-Intuitive Back Mutations were Necessary to Obtain Functional Humanized Anti-TIRC7 Antibodies As described in example 1 humanized heavy chains and humanized light chains were designed. Each of these were synthesized separately and cloned into human IgG1 heavy chain and human kappa light chain expression vectors respectively. At the point of transfection all possible combinations of the humanized sequences were made to create a total of 12 different humanized antibodies. In addition to these the original mouse antibody as well as a chimeric human IgG1 were made as controls.

Most humanized chain generated either lacked expression, where expressed with reduced monomer content or lost activity. In total five rounds of humanization attempts were necessary to identify some adequate humanized sequences, that in addition to the usual grafting procedure and back mutations close to the CDR regions needed additional non-intuitive back mutations in the heavy chain sequences—which was surprising.

An alignment of some antibodies shown in table 1 above is provided in FIGS. 4 and 5.

In one attempt to humanize the heavy chain, the inventors used the IGHV7-4-1 human germline sequence to generate humanized heavy chains. Unfortunately, all of the generated sequences were not expressible at all (see FIG. 7, antibodies having a heavy chain sequence cAB2714-VH or cAB2712-VH).

In a further attempt, the human germ line sequence IGHV1-46 was used for grafting. The resulting chains are cAB2288-VH and cAB2287-VH, of which cAB2287-VH was not expressible at all, while cAB2288-VH showed some expression. However, antibodies having the cAB2288-VH chain when expressed showed no monomer content (FIG. 7).

Another attempt IGHV1-2 was used for grafting and resulted in the cAB1901VH chain. Antibodies with this chain were also not expressible at all.

In two additional rounds of humanization chains based on all three of the above captioned germ line sequences were generated with the introduction of various mutations at selected positions (in particular chains cAB1458-VH, cAB1462-VH, cAB1466-VH, cAB2021-VH and cAB2023-VH) to combine human framework regions from different germ line sequences, which constitutes an usual approach. The generated heavy chain sequences in at least some antibodies were expressible to at least a low degree. However, antibodies comprising the cAB2021-VH or cAB2023-VH chains had low or undetectable monomer content, and were disregarded for the final selection.

The remaining chains were compared by retained biological activity of antibodies comprising them. The result is shown in FIG. 8. Most surprisingly antibodies comprising a heavy chain into which three non-intuitive back mutations were introduced into framework 3 (FR3) showed astonishing biological activity while having a preferable protein expression and monomer content (chain cAB1466-VH). Taken together, the antibodies denoted as cAB1467-10.0, cAB1468-10.0 and cAB1459-10.0 are the best candidates, with cAB1467-10.0, cAB1468-10.0 (both comprising the cAB1466-VH chain) being the best ones.

Conclusion

Following standard humanization, analysis was done to determine which human germline genes were closest to the original mouse hybridoma sequences and thus could be used as donor frameworks for CDR grafting. In variation from many humanization processes, a combination of framework donors for CDR grafting from 2 different human VH genes was also tried. Extensive experimentation determined that the combination of donors provided better results. A comparison of the sequences with highlighted positions of interest is shown in FIGS. 9 (heavy chain) and 10 (light chain). In these diagrams, the numbering and CDR positioning is according to Chothia et al. (1992) J. Mol. Biol., 227, 776-798, Tomlinson et al. (1995) EMBO J., 14, 4628-4638 and Williams et al. (1996) J. Mol. Biol., 264, 220-232) Example given in VBase. https://www2.mrc-lmb.cam.ac.uk/vbase/alignments2.php #JHEX.

Used IGHV1-2 as donor for FR1 and FR2 (indicated by highlighting)
Used IGHV1-46*01 as donor for FR3 (indicated by highlighting)

Unusual backmutations to original mouse sequences were needed in framework 3 to create high affinity and stability in the humanized antibodies:

Position 71—human donor R (Arg, basic) backmutation to mouse L (Leu, hydrophobic)
Position 73—human donor T (Thr, nucleophilic), backmutation to mouse K (Lys, basic)
Position 69—human donor M (Met, hydrophobic), backmutation to mouse L (Leu, hydrophobic), small change but appears to make cAb1466-VH better than cAb2021.

Unusual mutation was also made in framework 2:
In original VH17-20, all proposed human donor VH, and most of the humanized candidates, position 43 was Q (Gln, amide). But in the best humanized VH (cAb1466-VH) mutation of position 43 was Q (Gln, amide) to K (Lys, basic) appears to important for successful affinity/stability over the next best humanized VH (cAb2021-VH).

It is therefore demonstrated that only a combination of multiple human germ line sequences, and the non-intuitive introduction of murine back mutations could yield a small number of final candidate antibodies having improved expression and biologic activity.

Light Chain Humanization—the wide diversity of humanized light chains that were able to function well in both affinity and stability of the intact mAb suggest that most of the success of the mAb is due to the heavy chain and the heavy chain is rather promiscuous in its light chain selection.

Example 3: Effect of Improved Anti-TIRC7 Antibodies of the Invention on Human Lymphocytes The antibodies of the invention were tested in an immune assay for mixed lymphocyte proliferation and by PHA stimulation of lymphocytes. The results show a surprisingly stronger effect for the improved antibodies of the invention compared to the parent chimeric antibody. The results are shown in FIGS. 11 and 12 respectively.

Example 4: Surface Plasmon Resonance Testing of Antibody Affinity

To compare target binding of the generated antibodies with the parent molecule, binding constants of the of parent and selected generated humanized versions antibodies were obtained via BiaCore® Surface Plasmon Resonance Testing. The largest TIRC7 extracellular domain which is the known binder for the parent antibody was immobilized on a carboxymethylated dextran surface of a CM5 sensor chip (CM5 ship, research grade). A Biacore T200 instrument was used, 25° C. analysis temperature, and a flow rate of 50 μl/min for quantitative kinetic interaction analyses. The analysis buffer was 10 mM HEPES pH 7.4, 150 mM NaCl, 3 mM EDTA, 0.05% Tween 20.

For each antibody multiple Biacore SPR analysis rows were performed in varying concentrations in order to determine the kinetic constants or absorption effects. The specific constants are very reproducible for the buffer conditions. The parent antibody showed an average $K_D$ of 300+/−100 pM. Measurements for 3 of the humanized antibodies was done in the same setting. Results are provided in table 4. Surprisingly, the results show that AB affinity to TIRC7 of the selected humanized AB variants was at least one order of magnitude higher compared to the parent molecule.

TABLE 4

Summary of Kinetic Data

| Sample | Kinetic fit 1:1 binding | | |
|---|---|---|---|
| | $k_a$ (M$^{-1}$s$^{-1}$) | $k_d$ (s$^{-1}$) | $K_D$ (pM) |
| parent antibody | 5.2 ± 1.4E+05 | 1.3 ± 0.7E−04 | 300 ± 100 |
| cAB1459-10.0 | 3.56E+06 ± 2.41E+05 | 2.03E−04 ± 2.22E−05 | 5.70 ± 0.280 |
| cAB1468-10.0 | 1.13E+06 ± 5.69E+04 | 3.16E−04 ± 1.40E−05 | 27.9 ± 1.04 |
| cAB1467-10.0 | 1.24E+06 ± 6.66E+04 | 5.97E−04 ± 2.97E−05 | 48.0 ± 2.51 |

REFERENCES

The following references are cited:
1. Utku N, Heinemann T, Tullius S G, Bulwin G C, Beinke S, Blumberg R S, Beato F, Randall J, Kojima R, Busconi L, Robertson E S et al: Prevention of acute allograft rejection by antibody targeting of TIRC7, a novel T cell membrane protein. Immunity (1998) 9(4):509-518.
2. Liang P, Pardee A B: Differential display of eukaryotic messenger RNA by means of the polymerase chain reaction. Science (1992) 257(5072):967-971.
3. Dangond F, Hafler D A, Tong J K, Randall J, Kojima R, Utku N, Gullans S R: Differential display cloning of a novel human histone deacetylase (HDAC3) cDNA from PHA-activated immune cells. Biochem Biphys Res Commun (1998) 242(3):648-652.
4. Utku N, Bulwin G C, Beinke S, Heinemann T, Beato F, Randall J, Schnieders B, Sandhoff K, Volk H-D, Milford E, Gullans S R: The human homologue of Drosophila cornichon protein is differentially expressed in alloactivated T cells. Biochim Biophys Acta (1999) 1449(3):203-210.
5. Heinemann T, Bulwin G C, Randall J, Schnieders B, Sandhoff K, Volk H D, Milford E, Gullans S R, Uktu N: Genomic organization of the gene coding for TIRC7, a novel membrane protein essential for T cell activation. Genomics (1999) 57(3):398-406.
6. Schneider H S, da Rocha Dias S, Hu H, Rudd C E: A regulatory role for cytoplasmic YVKM motif in CTLA-4 inhibition of TCR signaling. Eur J Immunol (2001) 31(7): 2042-2050.
7. Klabunde T, Hessler G: Drug design strategies for targeting G-protein-coupled receptors. ChemBioChem (2002) 3(10):928-944.
8. Sexton P M, Christopoulos A: G protein-coupled receptor drug targets. Curr Pharm Des (2006) 12(14):1681-1682.
9. Li Y P, Chen W, Stashenko P: Molecular cloning and characterization of a putative novel human osteoclast-specific 116-kDa vacuolar proton pump subunit. Biochem Biophys Res Commun (1996) 218(3):813-321.
    The first demonstration of cDNA OC116 being isolated from a human osteoclastoma cell line and its restricted expression in cells obtained from human osteoblastoma and pancreas carcinoma cells.
10. Smirnova A S, Morgun A, Shulzhenko N, Silva I D, Gerbase-DeLima M: Identification of new alternative splice events in the TCIRG1 gene in different human tissues. Biochem Biophys Res Commun (2005) 330(3): 943-949.
11. Li Y P, Chen W, Liang Y, Li W, Stashenko P: Atp6i-deficient mice exhibit severe osteopetrosis due to loss of osteoclast-mediated extracellular acidification. Nat Genet (1999) 23(4):447-451.
12. Lee C, Ghoshal K, Beaman K D: Cloning of a cDNA or a T cell produced molecule with a putative immune regulatory role. Mol Immunol (1990) 27(11):1137-1144.
13. Manolson M F, Proteau D, Jones E W: Evidence for a conserved 95-120 kDa subunit associated with and essential for activity of V-ATPases. J Exp Biol (1992) 172: 105-112.
14. Utku N, Heinemann T, Winter M, Bulwin G C, Schlawinsky M, Fraser P, Nieuwenhuis E E, Volk H D, Blumberg R S: Antibody targeting of TIRC7 results in significant therapeutic effects on collagen-induced arthritis in mice. Clin Exp Immunol (2006) 144(1):142-151.
15. Bulwin G C, Heinemann T, Bugge V, Winter M, Lohan A, Schlawinsky M, Schulze A, Walter S, Sabat R, Schiilein R, Wiesner B et al: TIRC7 inhibits T cell proliferation by modulation of CTLA-4 expression. J Immunol (2006) 177(10):6833-6841.
16. Bromley S K, Burack W R, Johnson K G, Somersalo K, Sims T N, Sumen C, Davis M M, Shaw A S, Allen P M, Dustin M L: The immunological synapse. Annu Rev Immunol (2001) 19:375-396.
17. Grakoui A, Bromley S K, Sumen C, Davis M M, Shaw A S, Allen P M, Dustin M L: The immunological synapse: A molecular machine controlling T cell activation. Science (1999) 285(5425):221-227.
18. Monks C R, Freiberg B A, Kupfer H, Sciaky N, Kupfer A: Three-dimensional segregation of supramolecular activation clusters in T cells. Nature (1998) 395(6697):82-86.
19. Egen J G, Allison J P: Cytotoxic T lymphocyte antigen-4 accumulation in the immunological synapse is regulated by TCR signal strength. Immunity (2002) 16(1):23-35.
20. Linsley P S, Bradshaw J, Greene J, Peach R, Bennett K L, Mittler R S: Intracellular trafficking of CTLA-4 and focal localization towards sites of TCR engagement. Immunity (1996) 4(6):535-543.
21. Kumamoto Y, Tomschegg A, Bennai-Sanfourche F, Boerner A, Kaser A, Schmidt-Knosalla I, Heinemann T, Schlawinsky M, Blumberg R S, Volk H D, Utku N: Monoclonal antibody specific for TIRC7 induces donor-specific anergy and prevents rejection of cardiac allografts in mice. Am J Transplant (2004) 4(4):505-514.
22. Kumamoto Y, Tamura A, Volk H D, Reinke P, Lohler J, Tullius S G, Utku N: TIRC7 is induced in rejected human kidneys and anti-TIRC7 mAb with FK506 prolongs survival of kidney allografts in rats. Transpl Immunol (2006) 16(3-4):238-244.
23. Utku N, Boerner A, Tomschegg A, Bennai-Sanfourche F, Bulwin G C, Heinemann T, Loehler J, Blumberg R S, Volk H D: TIRC7 deficiency causes in vitro and in vivo augmentation of T and B cell activation and cytokine response. J Immunol (2004) 173(4):2342-2352.
24. Frischer J, Schmidt S, Milford E L, Lassmann H, Utku N Role of TIRC7 and HLADR axis in lymphocytes involved in multiple sclerosis. Multiple Sclerosis Journal (2014), 20.9: 1171-1181, IF: 4.671
25. Cantrell D: T cell antigen receptor signal transduction pathways. Annu Rev Immunol (1996) 14:259-274.

The invention claimed is:

1. An Antigen Binding Protein (ABP) capable of binding to T-cell immune response cDNA 7 (TIRC7), comprising:
   (i) heavy chain variable domains comprising the CDRH1 region set forth in SEQ ID NO: 01, the CDRH2 region set forth in SEQ ID NO: 02, and the CDRH3 region set forth in SEQ ID NO: 03, or wherein one or more of the CDRH1, CDRH2 and CDRH3 comprises a sequence having no more than one amino acid substitution compared to SEQ ID NO: 01, SEQ ID NO: 02, or SEQ ID NO: 03, respectively; and
   (ii) light chain variable domains comprising the CDRL1 region set forth in SEQ ID NO: 05, the CDRL2 region set forth in SEQ ID NO: 06, and the CDRL3 region set forth in SEQ ID NO: 07, or wherein one or more of the CDRL1, CDRL2 and CDRL3 comprises a sequence having no more than one amino acid substitution compared to SEQ ID NO: 05, SEQ ID NO: 06, or SEQ ID NO: 07, respectively.

2. The ABP according to claim 1, wherein the heavy chain variable domains and the light chain variable domains, each comprise an antibody framework having at least a portion of a human antibody consensus framework sequence.

3. The ABP according to claim 1, wherein the heavy chain variable domain framework (FR)3 is identical to the FR3 shown in SEQ ID NO: 29.

4. The ABP according to claim 1, which when contacted with an immune cell suppresses immune cell activation or proliferation.

5. The ABP according to claim 1, which comprises an effector group and which is labelled.

6. The ABP according to claim 1, which is Fc receptor binding attenuated.

7. The ABP according to claim 1, which is substantially pure.

8. The ABP according to claim 1, which is a monoclonal antibody; or which is a fragment of a monoclonal antibody.

9. The ABP according to claim 1, wherein said ABP is an IgG, IgE, IgD, IgA, or IgM immunoglobulin.

10. The ABP according to claim 1, which is an antibody fragment selected from the list consisting of: Fab, Fab'-SH, Fv, scFv and F(ab')2.

11. The ABP according to claim 1, which is a chimeric antigen receptor (CAR).

12. The ABP according to claim 1, which comprises one or more additional antigen binding domains that bind to antigens other than said TIRC7.

13. The ABP according to claim 12, which is bispecific, and which comprises one or two binding sites that bind to TIRC7 and one or two binding sites that bind to an antigen other than said TIRC7.

14. The ABP according to claim 1, which binds to an extracellular domain of TIRC7 with a $K_D$ of less than 100 µM as measured by plasmon surface resonance.

15. A humanized anti-TIRC7 antibody or antigen-binding fragment thereof comprising a heavy chain variable region and a light chain variable region, wherein
   (1) the heavy chain variable region comprises complementarity determining regions (CDRs):
      CDR-H1 comprising the amino acid sequence of SEQ ID NO: 1,
      CDR-H2 comprising the amino acid sequence of SEQ ID NO: 2,
      CDR-H3 comprising the amino acid sequence of SEQ ID NO: 3, and
   (2) the light chain variable region comprises CDRs:
      CDR-L1 comprising the amino acid sequence of SEQ ID NO: 5,
      CDR-L2 comprising the amino acid sequence of SEQ ID NO: 6, and
      CDR-L3 comprising the amino acid sequence of SEQ ID NO: 7, and
   (3) the heavy chain variable region and light chain variable region have amino acid sequences comprising the amino acid sequences of:
      SEQ ID NO: 9 and SEQ ID NO: 10;
      SEQ ID NO: 11 and SEQ ID NO: 12;
      SEQ ID NO: 13 and SEQ ID NO: 14;
      SEQ ID NO: 15 and SEQ ID NO: 16;
      SEQ ID NO: 17 and SEQ ID NO: 18;
      SEQ ID NO: 19 and SEQ ID NO: 20;
      SEQ ID NO: 21 and SEQ ID NO: 22;
      SEQ ID NO: 23 and SEQ ID NO: 24;
      SEQ ID NO: 25 and SEQ ID NO: 26;
      SEQ ID NO: 27 and SEQ ID NO: 28;
      SEQ ID NO: 29 and SEQ ID NO: 30;
      SEQ ID NO: 31 and SEQ ID NO: 32;
      SEQ ID NO: 37 and SEQ ID NO: 38;

SEQ ID NO: 41 and SEQ ID NO: 42;
SEQ ID NO: 47 and SEQ ID NO: 48;
SEQ ID NO: 49 and SEQ ID NO: 50;
SEQ ID NO: 51 and SEQ ID NO: 52;
SEQ ID NO: 53 and SEQ ID NO: 54;
SEQ ID NO: 55 and SEQ ID NO: 56;
SEQ ID NO: 57 and SEQ ID NO: 58;
SEQ ID NO: 59 and SEQ ID NO: 60;
SEQ ID NO: 61 and SEQ ID NO: 62;
SEQ ID NO: 63 and SEQ ID NO: 64;
SEQ ID NO: 65 and SEQ ID NO: 66;
SEQ ID NO: 67 and SEQ ID NO: 68;
SEQ ID NO: 69 and SEQ ID NO: 70;
SEQ ID NO: 71 and SEQ ID NO: 72;
SEQ ID NO: 73 and SEQ ID NO: 74;
SEQ ID NO: 75 and SEQ ID NO: 76;
SEQ ID NO: 77 and SEQ ID NO: 78;
SEQ ID NO: 79 and SEQ ID NO: 80;
SEQ ID NO: 81 and SEQ ID NO: 82;
SEQ ID NO: 83 and SEQ ID NO: 84; or
SEQ ID NO: 85 and SEQ ID NO: 86.

16. The ABP according to claim 1, comprising:
(1) the heavy chain variable region comprises complementarity determining regions (CDRs):
  CDR-H1 comprising the amino acid sequence of SEQ ID NO: 1,
  CDR-H2 comprising the amino acid sequence of SEQ ID NO: 2,
  CDR-H3 comprising the amino acid sequence of SEQ ID NO: 3, and
(2) the light chain variable region comprises CDRs:
  CDR-L1 comprising the amino acid sequence of SEQ ID NO: 5,
  CDR-L2 comprising the amino acid sequence of SEQ ID NO: 6, and
  CDR-L3 comprising the amino acid sequence of SEQ ID NO: 7, and
(3) the heavy chain variable region and light chain variable region have amino acid sequences comprising the amino acid sequences of:
SEQ ID NO: 9 and SEQ ID NO: 10;
SEQ ID NO: 11 and SEQ ID NO: 12;
SEQ ID NO: 13 and SEQ ID NO: 14;
SEQ ID NO: 15 and SEQ ID NO: 16;
SEQ ID NO: 17 and SEQ ID NO: 18;
SEQ ID NO: 19 and SEQ ID NO: 20;
SEQ ID NO: 21 and SEQ ID NO: 22;
SEQ ID NO: 23 and SEQ ID NO: 24;
SEQ ID NO: 25 and SEQ ID NO: 26;
SEQ ID NO: 27 and SEQ ID NO: 28;
SEQ ID NO: 29 and SEQ ID NO: 30;
SEQ ID NO: 31 and SEQ ID NO: 32;
SEQ ID NO: 37 and SEQ ID NO: 38;
SEQ ID NO: 41 and SEQ ID NO: 42;
SEQ ID NO: 47 and SEQ ID NO: 48;
SEQ ID NO: 49 and SEQ ID NO: 50;
SEQ ID NO: 51 and SEQ ID NO: 52;
SEQ ID NO: 53 and SEQ ID NO: 54;
SEQ ID NO: 55 and SEQ ID NO: 56;
SEQ ID NO: 57 and SEQ ID NO: 58;
SEQ ID NO: 59 and SEQ ID NO: 60;
SEQ ID NO: 61 and SEQ ID NO: 62;
SEQ ID NO: 63 and SEQ ID NO: 64;
SEQ ID NO: 65 and SEQ ID NO: 66;
SEQ ID NO: 67 and SEQ ID NO: 68;
SEQ ID NO: 69 and SEQ ID NO: 70;
SEQ ID NO: 71 and SEQ ID NO: 72;
SEQ ID NO: 73 and SEQ ID NO: 74;
SEQ ID NO: 75 and SEQ ID NO: 76;
SEQ ID NO: 77 and SEQ ID NO: 78;
SEQ ID NO: 79 and SEQ ID NO: 80;
SEQ ID NO: 81 and SEQ ID NO: 82;
SEQ ID NO: 83 and SEQ ID NO: 84; or
SEQ ID NO: 85 and SEQ ID NO: 86.

* * * * *

SEQUENCE LISTING

```
<160> NUMBER OF SEQ ID NOS: 86

<210> SEQ ID NO 1
<211> LENGTH: 8
<212> TYPE: PRT
<213> ORGANISM: Artificial
<220> FEATURE:
<223> OTHER INFORMATION: Variant Antibody

<400> SEQUENCE: 1

Gly Tyr Thr Phe Thr Thr Tyr Val
1               5

<210> SEQ ID NO 2
<211> LENGTH: 8
<212> TYPE: PRT
<213> ORGANISM: Artificial
<220> FEATURE:
<223> OTHER INFORMATION: Variant Antibody

<400> SEQUENCE: 2

Ile Asn Pro Tyr Asn Asp Gly Thr
1               5

<210> SEQ ID NO 3
<211> LENGTH: 17
<212> TYPE: PRT
<213> ORGANISM: Artificial
<220> FEATURE:
<223> OTHER INFORMATION: Variant Antibody

<400> SEQUENCE: 3

Ala Glu Phe Ile Thr Lys Thr Val Gly Gly Ser Asn Trp Tyr Leu Asp
1               5                   10                  15

Val

<210> SEQ ID NO 4
<211> LENGTH: 124
<212> TYPE: PRT
<213> ORGANISM: Artificial
<220> FEATURE:
<223> OTHER INFORMATION: Variant Antibody
```

-continued

<400> SEQUENCE: 4

Gln Val Gln Leu Lys Gln Ser Gly Pro Glu Leu Val Lys Pro Gly Ala
1               5                   10                  15

Ser Val Lys Met Ser Cys Lys Ala Ser Gly Tyr Thr Phe Thr Thr Tyr
            20                  25                  30

Val Met His Trp Val Lys Gln Lys Pro Gly Gln Gly Leu Glu Trp Ile
        35                  40                  45

Gly Tyr Ile Asn Pro Tyr Asn Asp Gly Thr Asn Tyr Asn Glu Lys Phe
    50                  55                  60

Lys Gly Lys Ala Thr Leu Thr Ser Asp Lys Ser Ser Ser Thr Ala Tyr
65                  70                  75                  80

Met Glu Leu Ser Thr Leu Thr Ser Glu Asp Ser Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Ala Gly Thr Thr Val Thr Val Ser Ser
        115                 120

<210> SEQ ID NO 5
<211> LENGTH: 5
<212> TYPE: PRT
<213> ORGANISM: Artificial
<220> FEATURE:
<223> OTHER INFORMATION: Variant Antibody

<400> SEQUENCE: 5

Ser Ser Ile Ser Tyr
1               5

<210> SEQ ID NO 6
<211> LENGTH: 3
<212> TYPE: PRT
<213> ORGANISM: Artificial
<220> FEATURE:
<223> OTHER INFORMATION: Variant Antibody

<400> SEQUENCE: 6

Asp Thr Ser
1

<210> SEQ ID NO 7
<211> LENGTH: 9
<212> TYPE: PRT
<213> ORGANISM: Artificial
<220> FEATURE:
<223> OTHER INFORMATION: Variant Antibody

<400> SEQUENCE: 7

His Gln Arg Ser Ser Tyr Thr Trp Thr
1               5

<210> SEQ ID NO 8
<211> LENGTH: 106
<212> TYPE: PRT
<213> ORGANISM: Artificial
<220> FEATURE:
<223> OTHER INFORMATION: Variant Antibody

<400> SEQUENCE: 8

Asp Ile Val Leu Thr Gln Ser Pro Ala Ile Met Ser Ala Ser Pro Gly
1               5                   10                  15

Glu Lys Val Thr Met Thr Cys Ser Ala Ser Ser Ser Ile Ser Tyr Ile

```
                   20                  25                  30

His Trp Phe Gln Gln Lys Pro Gly Thr Ser Pro Lys Arg Trp Ile Tyr
                35                  40                  45

Asp Thr Ser Lys Leu Pro Ser Gly Val Pro Ala Arg Phe Ser Gly Ser
            50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys His Gln Arg Ser Ser Tyr Thr Trp Thr
                85                  90                  95

Phe Gly Gly Gly Thr Lys Leu Glu Ile Lys
                100                 105

<210> SEQ ID NO 9
<211> LENGTH: 124
<212> TYPE: PRT
<213> ORGANISM: Artificial
<220> FEATURE:
<223> OTHER INFORMATION: Variant Antibody

<400> SEQUENCE: 9

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
                20                  25                  30

Val Met His Trp Val Arg Gln Ala Pro Gly Lys Gly Leu Glu Trp Met
            35                  40                  45

Gly Tyr Ile Asn Pro Tyr Asn Asp Gly Thr Asn Tyr Asn Glu Lys Phe
        50                  55                  60

Lys Gly Arg Val Thr Met Thr Glu Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
                100                 105                 110

Val Trp Gly Gln Gly Thr Thr Val Thr Val Ser Ser
            115                 120

<210> SEQ ID NO 10
<211> LENGTH: 106
<212> TYPE: PRT
<213> ORGANISM: Artificial
<220> FEATURE:
<223> OTHER INFORMATION: Variant Antibody

<400> SEQUENCE: 10

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
                20                  25                  30

His Trp Tyr Gln Gln Lys Pro Gly Lys Ala Pro Lys Arg Leu Ile Tyr
                35                  40                  45

Asp Thr Ser Lys Leu Pro Ser Gly Val Pro Ser Arg Phe Ser Gly Ser
            50                  55                  60

Gly Ser Gly Thr Glu Phe Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95
```

Phe Gly Gly Gly Thr Lys Leu Glu Ile Lys
            100                 105

<210> SEQ ID NO 11
<211> LENGTH: 124
<212> TYPE: PRT
<213> ORGANISM: Artificial
<220> FEATURE:
<223> OTHER INFORMATION: Variant Antibody

<400> SEQUENCE: 11

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 12
<211> LENGTH: 106
<212> TYPE: PRT
<213> ORGANISM: Artificial
<220> FEATURE:
<223> OTHER INFORMATION: Variant Antibody

<400> SEQUENCE: 12

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 13
<211> LENGTH: 124
<212> TYPE: PRT
<213> ORGANISM: Artificial
<220> FEATURE:
<223> OTHER INFORMATION: Variant Antibody

<400> SEQUENCE: 13

Gln Val Gln Leu Val Gln Ser Gly Ala Glu Val Lys Lys Pro Gly Ala

```
                1               5                   10                  15
            Ser Val Lys Val Ser Cys Lys Ala Ser Gly Tyr Thr Phe Thr Thr Tyr
                            20                  25                  30

Val Met His Trp Val Arg Gln Ala Pro Gly Lys Gly Leu Glu Trp Met
                        35                  40                  45

Gly Tyr Ile Asn Pro Tyr Asn Asp Gly Thr Asn Tyr Asn Glu Lys Phe
                    50                  55                  60

Lys Gly Arg Val Thr Met Thr Glu Asp Thr Ser Thr Asp Thr Ala Tyr
            65                  70                  75                  80

Met Glu Leu Ser Ser Leu Arg Ser Glu Asp Thr Ala Val Tyr Tyr Cys
                            85                  90                  95

Ala Glu Phe Ile Thr Lys Thr Val Gly Gly Ser Asn Trp Tyr Leu Asp
                            100                 105                 110

Val Trp Gly Gln Gly Thr Thr Val Thr Val Ser Ser
                        115                 120
```

```
<210> SEQ ID NO 14
<211> LENGTH: 106
<212> TYPE: PRT
<213> ORGANISM: Artificial
<220> FEATURE:
<223> OTHER INFORMATION: Variant Antibody

<400> SEQUENCE: 14

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
                20                  25                  30

His Trp Tyr Gln Gln Lys Pro Gly Gln Ala Pro Arg Arg Leu Ile Tyr
            35                  40                  45

Asp Thr Ser Lys Leu Pro Ser Gly Ile Pro Ala Arg Phe Ser Gly Ser
        50                  55                  60

Gly Ser Gly Thr Asp Phe Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105
```

```
<210> SEQ ID NO 15
<211> LENGTH: 124
<212> TYPE: PRT
<213> ORGANISM: Artificial
<220> FEATURE:
<223> OTHER INFORMATION: Variant Antibody

<400> SEQUENCE: 15

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
                20                  25                  30

Val Met His Trp Val Arg Gln Ala Pro Gly Lys Gly Leu Glu Trp Met
            35                  40                  45

Gly Tyr Ile Asn Pro Tyr Asn Asp Gly Thr Asn Tyr Asn Glu Lys Phe
        50                  55                  60

Lys Gly Arg Val Thr Met Thr Glu Asp Thr Ser Thr Asp Thr Ala Tyr
65                  70                  75                  80
```

```
Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 16
<211> LENGTH: 106
<212> TYPE: PRT
<213> ORGANISM: Artificial
<220> FEATURE:
<223> OTHER INFORMATION: Variant Antibody

<400> SEQUENCE: 16

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
            20                  25                  30

His Trp Phe Gln Gln Lys Pro Gly Gln Ala Pro Lys Arg Trp Ile Tyr
        35                  40                  45

Asp Thr Ser Lys Leu Pro Ser Gly Val Pro Ala Arg Phe Ser Gly Ser
50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 17
<211> LENGTH: 124
<212> TYPE: PRT
<213> ORGANISM: Artificial
<220> FEATURE:
<223> OTHER INFORMATION: Variant Antibody

<400> SEQUENCE: 17

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
50                  55                  60

Lys Gly Arg Val Thr Met Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 18
<211> LENGTH: 106
<212> TYPE: PRT
<213> ORGANISM: Artificial
```

<220> FEATURE:
<223> OTHER INFORMATION: Variant Antibody

<400> SEQUENCE: 18

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Tyr Gln Gln Lys Pro Gly Lys Ala Pro Lys Arg Leu Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Phe Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 19
<211> LENGTH: 124
<212> TYPE: PRT
<213> ORGANISM: Artificial
<220> FEATURE:
<223> OTHER INFORMATION: Variant Antibody

<400> SEQUENCE: 19

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 20
<211> LENGTH: 106
<212> TYPE: PRT
<213> ORGANISM: Artificial
<220> FEATURE:
<223> OTHER INFORMATION: Variant Antibody

<400> SEQUENCE: 20

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

```
Asp Thr Ser Lys Leu Pro Ser Gly Val Pro Ser Arg Phe Ser Gly Ser
        50                  55                  60
Gly Ser Gly Thr Glu Tyr Thr Leu Thr Ile Ser Ser Leu Gln Pro Glu
 65                  70                  75                  80
Asp Phe Ala Thr Tyr Tyr Cys His Gln Arg Ser Ser Tyr Thr Trp Thr
                 85                  90                  95
Phe Gly Gly Gly Thr Lys Leu Glu Ile Lys
                100                 105
```

<210> SEQ ID NO 21
<211> LENGTH: 124
<212> TYPE: PRT
<213> ORGANISM: Artificial
<220> FEATURE:
<223> OTHER INFORMATION: Variant Antibody

<400> SEQUENCE: 21

```
Gln Val Gln Leu Val Gln Ser Gly Ala Glu Val Lys Lys Pro Gly Ala
 1               5                  10                  15
Ser Val Lys Val Ser Cys Lys Ala Ser Gly Tyr Thr Phe Thr Thr Tyr
                20                  25                  30
Val Met His Trp Val Arg Gln Ala Pro Gly Lys Gly Leu Glu Trp Met
             35                  40                  45
Gly Tyr Ile Asn Pro Tyr Asn Asp Gly Thr Asn Tyr Asn Glu Lys Phe
 50                  55                  60
Lys Gly Arg Val Thr Met Thr Ser Asp Lys Ser Thr Ser Thr Ala Tyr
 65                  70                  75                  80
Met Glu Leu Ser Ser Leu Arg Ser Glu Asp Thr Ala Val Tyr Tyr Cys
                 85                  90                  95
Ala Glu Phe Ile Thr Lys Thr Val Gly Gly Ser Asn Trp Tyr Leu Asp
                100                 105                 110
Val Trp Gly Gln Gly Thr Thr Val Thr Val Ser Ser
            115                 120
```

<210> SEQ ID NO 22
<211> LENGTH: 106
<212> TYPE: PRT
<213> ORGANISM: Artificial
<220> FEATURE:
<223> OTHER INFORMATION: Variant Antibody

<400> SEQUENCE: 22

```
Glu Ile Val Leu Thr Gln Ser Pro Ala Thr Leu Ser Leu Ser Pro Gly
 1               5                  10                  15
Glu Arg Ala Thr Leu Ser Cys Ser Ala Ser Ser Ser Ile Ser Tyr Ile
                20                  25                  30
His Trp Tyr Gln Gln Lys Pro Gly Gln Ala Pro Arg Arg Leu Ile Tyr
             35                  40                  45
Asp Thr Ser Lys Leu Pro Ser Gly Ile Pro Ala Arg Phe Ser Gly Ser
        50                  55                  60
Gly Ser Gly Thr Asp Phe Thr Leu Thr Ile Ser Ser Leu Glu Pro Glu
 65                  70                  75                  80
Asp Phe Ala Val Tyr Tyr Cys His Gln Arg Ser Ser Tyr Thr Trp Thr
                 85                  90                  95
Phe Gly Gly Gly Thr Lys Leu Glu Ile Lys
                100                 105
```

<210> SEQ ID NO 23

```
<211> LENGTH: 124
<212> TYPE: PRT
<213> ORGANISM: Artificial
<220> FEATURE:
<223> OTHER INFORMATION: Variant Antibody

<400> SEQUENCE: 23
```

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

```
<210> SEQ ID NO 24
<211> LENGTH: 106
<212> TYPE: PRT
<213> ORGANISM: Artificial
<220> FEATURE:
<223> OTHER INFORMATION: Variant Antibody

<400> SEQUENCE: 24
```

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ile Ser Tyr Ile
            20                  25                  30

His Trp Phe Gln Gln Lys Pro Gly Gln Ala Pro Lys Arg Trp Ile Tyr
        35                  40                  45

Asp Thr Ser Lys Leu Pro Ser Gly Val Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

```
<210> SEQ ID NO 25
<211> LENGTH: 124
<212> TYPE: PRT
<213> ORGANISM: Artificial
<220> FEATURE:
<223> OTHER INFORMATION: Variant Antibody

<400> SEQUENCE: 25
```

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
         35                  40                  45

Gly Tyr Ile Asn Pro Tyr Asn Asp Gly Thr Asn Tyr Asn Glu Lys Phe
     50                  55                  60

Lys Gly Arg Val Thr Leu Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
             85                  90                  95

Ala Glu Phe Ile Thr Lys Thr Val Gly Gly Ser Asn Trp Tyr Leu Asp
         100                 105                 110

Val Trp Gly Gln Gly Thr Thr Val Thr Val Ser Ser
     115                 120

<210> SEQ ID NO 26
<211> LENGTH: 106
<212> TYPE: PRT
<213> ORGANISM: Artificial
<220> FEATURE:
<223> OTHER INFORMATION: Variant Antibody

<400> SEQUENCE: 26

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
             20                  25                  30

His Trp Tyr Gln Gln Lys Pro Gly Lys Ala Pro Lys Arg Leu Ile Tyr
         35                  40                  45

Asp Thr Ser Lys Leu Pro Ser Gly Val Pro Ser Arg Phe Ser Gly Ser
     50                  55                  60

Gly Ser Gly Thr Glu Phe Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
             85                  90                  95

Phe Gly Gly Gly Thr Lys Leu Glu Ile Lys
         100                 105

<210> SEQ ID NO 27
<211> LENGTH: 124
<212> TYPE: PRT
<213> ORGANISM: Artificial
<220> FEATURE:
<223> OTHER INFORMATION: Variant Antibody

<400> SEQUENCE: 27

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
             20                  25                  30

Val Met His Trp Val Arg Gln Ala Pro Gly Lys Gly Leu Glu Trp Met
         35                  40                  45

Gly Tyr Ile Asn Pro Tyr Asn Asp Gly Thr Asn Tyr Asn Glu Lys Phe
     50                  55                  60

Lys Gly Arg Val Thr Leu Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
             85                  90                  95

Ala Glu Phe Ile Thr Lys Thr Val Gly Gly Ser Asn Trp Tyr Leu Asp
         100                 105                 110

Val Trp Gly Gln Gly Thr Thr Val Thr Val Ser Ser
            115                 120

<210> SEQ ID NO 28
<211> LENGTH: 106
<212> TYPE: PRT
<213> ORGANISM: Artificial
<220> FEATURE:
<223> OTHER INFORMATION: Variant Antibody

<400> SEQUENCE: 28

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 29
<211> LENGTH: 124
<212> TYPE: PRT
<213> ORGANISM: Artificial
<220> FEATURE:
<223> OTHER INFORMATION: Variant Antibody

<400> SEQUENCE: 29

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Leu Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 30
<211> LENGTH: 106
<212> TYPE: PRT
<213> ORGANISM: Artificial
<220> FEATURE:
<223> OTHER INFORMATION: Variant Antibody

<400> SEQUENCE: 30

```
Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ile Ser Tyr Ile
            20                  25                  30

His Trp Tyr Gln Gln Lys Pro Gly Gln Ala Pro Arg Arg Leu Ile Tyr
            35                  40                  45

Asp Thr Ser Lys Leu Pro Ser Gly Ile Pro Ala Arg Phe Ser Gly Ser
        50                  55                  60

Gly Ser Gly Thr Asp Phe Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 31
<211> LENGTH: 124
<212> TYPE: PRT
<213> ORGANISM: Artificial
<220> FEATURE:
<223> OTHER INFORMATION: Variant Antibody

<400> SEQUENCE: 31

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
            35                  40                  45

Gly Tyr Ile Asn Pro Tyr Asn Asp Gly Thr Asn Tyr Asn Glu Lys Phe
        50                  55                  60

Lys Gly Arg Val Thr Leu Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 32
<211> LENGTH: 106
<212> TYPE: PRT
<213> ORGANISM: Artificial
<220> FEATURE:
<223> OTHER INFORMATION: Variant Antibody

<400> SEQUENCE: 32

```
Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
            20                  25                  30

His Trp Phe Gln Gln Lys Pro Gly Gln Ala Pro Lys Arg Trp Ile Tyr
            35                  40                  45

Asp Thr Ser Lys Leu Pro Ser Gly Val Pro Ala Arg Phe Ser Gly Ser
        50                  55                  60

Gly Ser Gly Thr Asp Tyr Thr Leu Thr Ile Ser Ser Leu Glu Pro Glu
65                  70                  75                  80
```

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 33
<211> LENGTH: 124
<212> TYPE: PRT
<213> ORGANISM: Artificial
<220> FEATURE:
<223> OTHER INFORMATION: Variant Antibody

<400> SEQUENCE: 33

Gln Val Gln Leu Val Gln Ser Gly Ala Glu Val Lys Pro Gly Ala
1               5                   10                  15

Ser Val Lys Val Ser Cys Lys Ala Ser Gly Tyr Thr Phe Thr Thr Tyr
                20                  25                  30

Val Met His Trp Val Arg Gln Ala Pro Gly Gln Gly Leu Glu Trp Met
            35                  40                  45

Gly Tyr Ile Asn Pro Tyr Asn Asp Gly Thr Asn Tyr Asn Glu Lys Phe
    50                  55                  60

Gln Gly Arg Val Thr Ser Thr Ser Asp Lys Ser Ile Ser Thr Ala Tyr
65                  70                  75                  80

Met Glu Leu Ser Arg Leu Arg Ser Asp Asp Thr Val Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 34
<211> LENGTH: 106
<212> TYPE: PRT
<213> ORGANISM: Artificial
<220> FEATURE:
<223> OTHER INFORMATION: Variant Antibody

<400> SEQUENCE: 34

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
                20                  25                  30

His Trp Phe Gln Gln Lys Pro Gly Lys Ala Pro Lys Arg Trp Ile Tyr
            35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 35
<211> LENGTH: 124
<212> TYPE: PRT
<213> ORGANISM: Artificial
<220> FEATURE:
<223> OTHER INFORMATION: Variant Antibody

<400> SEQUENCE: 35

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Met
        35                  40                  45

Gly Tyr Ile Asn Pro Tyr Asn Asp Gly Thr Ser Tyr Asn Glu Lys Phe
    50                  55                  60

Gln Gly Arg Val Thr Met Thr Ser Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 36
<211> LENGTH: 106
<212> TYPE: PRT
<213> ORGANISM: Artificial
<220> FEATURE:
<223> OTHER INFORMATION: Variant Antibody

<400> SEQUENCE: 36

```
Glu Ile Val Leu Thr Gln Ser Pro Asp Phe Gln Ser Val Thr Pro Lys
1               5                   10                  15

Glu Lys Val Thr Ile Thr Cys Arg Ala Ser Ser Ser Ile Ser Tyr Ile
            20                  25                  30

His Trp Phe Gln Gln Lys Pro Asp Gln Ser Pro Lys Arg Leu Ile Tyr
        35                  40                  45

Asp Thr Ser Lys Ser Phe Ser Gly Val Pro Ser Arg Phe Ser Gly Ser
    50                  55                  60

Gly Ser Gly Thr Asp Tyr Thr Leu Thr Ile Asn Ser Leu Glu Ala Glu
65                  70                  75                  80

Asp Ala Ala Thr Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 37
<211> LENGTH: 124
<212> TYPE: PRT
<213> ORGANISM: Artificial
<220> FEATURE:
<223> OTHER INFORMATION: Variant Antibody

<400> SEQUENCE: 37

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Met
        35                  40                  45

Gly Tyr Ile Asn Pro Tyr Asn Asp Gly Thr Ser Tyr Asn Glu Lys Phe
    50                  55                  60
```

```
Gln Gly Arg Val Thr Met Thr Ser Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 38
<211> LENGTH: 106
<212> TYPE: PRT
<213> ORGANISM: Artificial
<220> FEATURE:
<223> OTHER INFORMATION: Variant Antibody

<400> SEQUENCE: 38

```
Asp Ile Gln Leu Thr Gln Ser Pro Ser Ala Met Ser Ala Ser Val Gly
1               5                   10                  15

Asp Arg Val Thr Ile Thr Cys Arg Ala Ser Ser Ser Ile Ser Tyr Ile
            20                  25                  30

His Trp Phe Gln Gln Lys Pro Gly Lys Val Pro Lys Arg Leu Ile Tyr
        35                  40                  45

Asp Thr Ser Lys Leu Gln Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 39
<211> LENGTH: 124
<212> TYPE: PRT
<213> ORGANISM: Artificial
<220> FEATURE:
<223> OTHER INFORMATION: Variant Antibody

<400> SEQUENCE: 39

```
Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Met
        35                  40                  45

Gly Tyr Ile Asn Pro Tyr Asn Asp Gly Thr Thr Tyr Asn Glu Gly Phe
    50                  55                  60

Thr Gly Arg Phe Val Phe Ser Asp Lys Ser Val Ser Thr Ala Tyr
65                  70                  75                  80

Leu Gln Ile Ser Ser Leu Lys Ala Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 40
<211> LENGTH: 106
<212> TYPE: PRT
<213> ORGANISM: Artificial
<220> FEATURE:
<223> OTHER INFORMATION: Variant Antibody

<400> SEQUENCE: 40

```
Glu Ile Val Leu Thr Gln Ser Pro Asp Phe Gln Ser Val Thr Pro Lys
1               5                   10                  15

Glu Lys Val Thr Ile Thr Cys Arg Ala Ser Ser Ser Ile Ser Tyr Ile
            20                  25                  30

His Trp Phe Gln Gln Lys Pro Asp Gln Ser Pro Lys Arg Leu Ile Tyr
        35                  40                  45

Asp Thr Ser Lys Ser Phe Ser Gly Val Pro Ser Arg Phe Ser Gly Ser
    50                  55                  60

Gly Ser Gly Thr Asp Tyr Thr Leu Thr Ile Asn Ser Leu Glu Ala Glu
65                  70                  75                  80

Asp Ala Ala Thr Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 41
<211> LENGTH: 124
<212> TYPE: PRT
<213> ORGANISM: Artificial
<220> FEATURE:
<223> OTHER INFORMATION: Variant Antibody

<400> SEQUENCE: 41

```
Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Met
        35                  40                  45

Gly Tyr Ile Asn Pro Tyr Asn Asp Gly Thr Thr Tyr Asn Glu Gly Phe
    50                  55                  60

Thr Gly Arg Phe Val Phe Ser Ser Asp Lys Ser Val Ser Thr Ala Tyr
65                  70                  75                  80

Leu Gln Ile Ser Ser Leu Lys Ala Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120
```

<210> SEQ ID NO 42
<211> LENGTH: 106
<212> TYPE: PRT
<213> ORGANISM: Artificial
<220> FEATURE:
<223> OTHER INFORMATION: Variant Antibody

<400> SEQUENCE: 42

```
Asp Ile Gln Leu Thr Gln Ser Pro Ser Ala Met Ser Ala Ser Val Gly
1               5                   10                  15

Asp Arg Val Thr Ile Thr Cys Arg Ala Ser Ser Ser Ile Ser Tyr Ile
            20                  25                  30
```

His Trp Phe Gln Gln Lys Pro Gly Lys Val Pro Lys Arg Leu Ile Tyr
            35                  40                  45

Asp Thr Ser Lys Leu Gln Ser Gly Val Pro Ser Arg Phe Ser Gly Ser
        50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 43
<211> LENGTH: 124
<212> TYPE: PRT
<213> ORGANISM: Artificial
<220> FEATURE:
<223> OTHER INFORMATION: Variant Antibody

<400> SEQUENCE: 43

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Ile
            35                  40                  45

Gly Tyr Ile Asn Pro Tyr Asn Asp Gly Thr Asn Tyr Asn Glu Lys Phe
        50                  55                  60

Lys Gly Arg Val Thr Met Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 44
<211> LENGTH: 106
<212> TYPE: PRT
<213> ORGANISM: Artificial
<220> FEATURE:
<223> OTHER INFORMATION: Variant Antibody

<400> SEQUENCE: 44

Asp Ile Val Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
            35                  40                  45

Asp Thr Ser Lys Leu Pro Ser Gly Val Pro Ser Arg Phe Ser Gly Ser
        50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys 100                 105

<210> SEQ ID NO 45
<211> LENGTH: 124
<212> TYPE: PRT
<213> ORGANISM: Artificial
<220> FEATURE:
<223> OTHER INFORMATION: Variant Antibody

<400> SEQUENCE: 45

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Ile
        35                  40                  45

Gly Tyr Ile Asn Pro Tyr Asn Asp Gly Thr Asn Tyr Asn Glu Lys Phe
    50                  55                  60

Lys Gly Arg Val Thr Leu Thr Ser Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 46
<211> LENGTH: 106
<212> TYPE: PRT
<213> ORGANISM: Artificial
<220> FEATURE:
<223> OTHER INFORMATION: Variant Antibody

<400> SEQUENCE: 46

Asp Ile Val Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 47
<211> LENGTH: 124
<212> TYPE: PRT
<213> ORGANISM: Artificial
<220> FEATURE:
<223> OTHER INFORMATION: Variant Antibody

<400> SEQUENCE: 47

Gln Val Gln Leu Val Gln Ser Gly Ala Glu Val Lys Lys Pro Gly Ala
1               5                   10                  15

```
Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Ile
            35                  40                  45

Gly Tyr Ile Asn Pro Tyr Asn Asp Gly Thr Asn Tyr Asn Glu Lys Phe
 50                  55                  60

Gln Gly Arg Val Thr Leu Thr Ser Asp Lys Ser Ser Thr Ala Tyr
 65                  70                  75                  80

Met Glu Leu Ser Arg Leu Arg Ser Asp Asp Thr Val Val Tyr Tyr Cys
                85                  90                  95

Ala Glu Phe Ile Thr Lys Thr Val Gly Gly Ser Asn Trp Tyr Leu Asp
                100                 105                 110

Val Trp Gly Gln Gly Thr Thr Val Thr Val Ser Ser
            115                 120
```

<210> SEQ ID NO 48
<211> LENGTH: 106
<212> TYPE: PRT
<213> ORGANISM: Artificial
<220> FEATURE:
<223> OTHER INFORMATION: Variant Antibody

<400> SEQUENCE: 48

```
Asp Ile Val Leu Thr Gln Ser Pro Asp Phe Gln Ser Val Thr Pro Lys
 1               5                  10                  15

Glu Lys Val Thr Ile Thr Cys Arg Ala Ser Ser Ser Ile Ser Tyr Ile
            20                  25                  30

His Trp Phe Gln Gln Lys Pro Asp Gln Ser Pro Lys Arg Leu Ile Tyr
            35                  40                  45

Asp Thr Ser Lys Leu Pro Ser Gly Val Pro Ser Arg Phe Ser Gly Ser
         50                  55                  60

Gly Ser Gly Thr Asp Tyr Thr Leu Thr Ile Asn Ser Leu Glu Ala Glu
 65                  70                  75                  80

Asp Ala Ala Thr Tyr Tyr Cys His Gln Arg Ser Ser Tyr Thr Trp Thr
                85                  90                  95

Phe Gly Gly Gly Thr Lys Leu Glu Ile Lys
                100                 105
```

<210> SEQ ID NO 49
<211> LENGTH: 124
<212> TYPE: PRT
<213> ORGANISM: Artificial
<220> FEATURE:
<223> OTHER INFORMATION: Variant Antibody

<400> SEQUENCE: 49

```
Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Ile
            35                  40                  45

Gly Tyr Ile Asn Pro Tyr Asn Asp Gly Thr Asn Tyr Asn Glu Lys Phe
 50                  55                  60

Gln Gly Arg Val Thr Leu Thr Ser Asp Lys Ser Ser Thr Ala Tyr
 65                  70                  75                  80

Met Glu Leu Ser Arg Leu Arg Ser Asp Asp Thr Val Val Tyr Tyr Cys
```

```
                85                  90                  95
Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 50
<211> LENGTH: 106
<212> TYPE: PRT
<213> ORGANISM: Artificial
<220> FEATURE:
<223> OTHER INFORMATION: Variant Antibody

<400> SEQUENCE: 50

```
Asp Ile Gln Leu Thr Gln Ser Pro Ser Ala Met Ser Ala Ser Val Gly
1               5                   10                  15

Asp Arg Val Thr Ile Thr Cys Arg Ala Ser Ser Ser Ile Ser Tyr Ile
            20                  25                  30

His Trp Phe Gln Gln Lys Pro Gly Lys Val Pro Lys Arg Leu Ile Tyr
        35                  40                  45

Asp Thr Ser Lys Leu Pro Ser Gly Val Pro Ser Arg Phe Ser Gly Ser
50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 51
<211> LENGTH: 124
<212> TYPE: PRT
<213> ORGANISM: Artificial
<220> FEATURE:
<223> OTHER INFORMATION: Variant Antibody

<400> SEQUENCE: 51

```
Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Ile
        35                  40                  45

Gly Tyr Ile Asn Pro Tyr Asn Asp Gly Thr Asn Tyr Asn Glu Gly Phe
50                  55                  60

Thr Gly Arg Phe Val Leu Ser Ser Asp Lys Ser Ser Thr Ala Tyr
65                  70                  75                  80

Leu Gln Ile Ser Ser Leu Lys Ala Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120
```

<210> SEQ ID NO 52
<211> LENGTH: 106
<212> TYPE: PRT
<213> ORGANISM: Artificial
<220> FEATURE:

<223> OTHER INFORMATION: Variant Antibody

<400> SEQUENCE: 52

Asp Ile Val Leu Thr Gln Ser Pro Asp Phe Gln Ser Val Thr Pro Lys
1               5                   10                  15

Glu Lys Val Thr Ile Thr Cys Arg Ala Ser Ser Ser Ile Ser Tyr Ile
            20                  25                  30

His Trp Phe Gln Gln Lys Pro Asp Gln Ser Pro Lys Arg Leu Ile Tyr
        35                  40                  45

Asp Thr Ser Lys Leu Pro Ser Gly Val Pro Ser Arg Phe Ser Gly Ser
    50                  55                  60

Gly Ser Gly Thr Asp Tyr Thr Leu Thr Ile Asn Ser Leu Glu Ala Glu
65                  70                  75                  80

Asp Ala Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 53
<211> LENGTH: 124
<212> TYPE: PRT
<213> ORGANISM: Artificial
<220> FEATURE:
<223> OTHER INFORMATION: Variant Antibody

<400> SEQUENCE: 53

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Gln Gly Leu Glu Trp Ile
        35                  40                  45

Gly Tyr Ile Asn Pro Tyr Asn Asp Gly Thr Asn Tyr Asn Glu Gly Phe
    50                  55                  60

Thr Gly Arg Phe Val Leu Ser Ser Asp Lys Ser Ser Ser Thr Ala Tyr
65                  70                  75                  80

Leu Gln Ile Ser Ser Leu Lys Ala Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 54
<211> LENGTH: 106
<212> TYPE: PRT
<213> ORGANISM: Artificial
<220> FEATURE:
<223> OTHER INFORMATION: Variant Antibody

<400> SEQUENCE: 54

Asp Ile Gln Leu Thr Gln Ser Pro Ser Ala Met Ser Ala Ser Val Gly
1               5                   10                  15

Asp Arg Val Thr Ile Thr Cys Arg Ala Ser Ser Ser Ile Ser Tyr Ile
            20                  25                  30

His Trp Phe Gln Gln Lys Pro Gly Lys Val Pro Lys Arg Leu Ile Tyr
        35                  40                  45

Asp Thr Ser Lys Leu Pro Ser Gly Val Pro Ser Arg Phe Ser Gly Ser

```
                    50                  55                  60
Gly Ser Gly Thr Glu Tyr Thr Leu Thr Ile Ser Ser Leu Gln Pro Glu
 65                  70                  75                  80

Asp Phe Ala Thr Tyr Tyr Cys His Gln Arg Ser Ser Tyr Thr Trp Thr
                 85                  90                  95

Phe Gly Gly Gly Thr Lys Leu Glu Ile Lys
            100                 105

<210> SEQ ID NO 55
<211> LENGTH: 124
<212> TYPE: PRT
<213> ORGANISM: Artificial
<220> FEATURE:
<223> OTHER INFORMATION: Variant Antibody

<400> SEQUENCE: 55

Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Thr Phe Thr Thr Tyr
                20                  25                  30

Val Met His Trp Val Arg Gln Ala Pro Gly Lys Gly Leu Glu Trp Met
             35                  40                  45

Gly Tyr Ile Asn Pro Tyr Asn Asp Gly Thr Asn Tyr Asn Glu Lys Phe
 50                  55                  60

Lys Gly Arg Val Thr Leu Thr Glu Asp Thr Ser Thr Asp Thr Ala Tyr
 65                  70                  75                  80

Met Glu Leu Ser Ser Leu Arg Ser Glu Asp Thr Ala Val Tyr Tyr Cys
                 85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 56
<211> LENGTH: 106
<212> TYPE: PRT
<213> ORGANISM: Artificial
<220> FEATURE:
<223> OTHER INFORMATION: Variant Antibody

<400> SEQUENCE: 56

Asp Ile Gln Leu Thr Gln Ser Pro Ser Phe Leu Ser Ala Ser Val Gly
 1               5                  10                  15

Asp Arg Val Thr Ile Thr Cys Ser Ala Ser Ser Ser Ile Ser Tyr Ile
                20                  25                  30

His Trp Tyr Gln Gln Lys Pro Gly Lys Ala Pro Lys Arg Leu Ile Tyr
             35                  40                  45

Asp Thr Ser Lys Leu Pro Ser Gly Val Pro Ser Arg Phe Ser Gly Ser
 50                  55                  60

Gly Ser Gly Thr Glu Phe Thr Leu Thr Ile Ser Ser Leu Gln Pro Glu
 65                  70                  75                  80

Asp Phe Ala Thr Tyr Tyr Cys His Gln Arg Ser Ser Tyr Thr Trp Thr
                 85                  90                  95

Phe Gly Gly Gly Thr Lys Leu Glu Ile Lys
            100                 105

<210> SEQ ID NO 57
<211> LENGTH: 124
```

```
<212> TYPE: PRT
<213> ORGANISM: Artificial
<220> FEATURE:
<223> OTHER INFORMATION: Variant Antibody

<400> SEQUENCE: 57

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Leu Thr Glu Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 58
<211> LENGTH: 106
<212> TYPE: PRT
<213> ORGANISM: Artificial
<220> FEATURE:
<223> OTHER INFORMATION: Variant Antibody

<400> SEQUENCE: 58

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 59
<211> LENGTH: 124
<212> TYPE: PRT
<213> ORGANISM: Artificial
<220> FEATURE:
<223> OTHER INFORMATION: Variant Antibody

<400> SEQUENCE: 59

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
```

```
                35                  40                  45
Gly Tyr Ile Asn Pro Tyr Asn Asp Gly Thr Asn Tyr Asn Glu Lys Phe
         50                  55                  60
Lys Gly Arg Val Thr Leu Thr Glu Asp Thr Ser Thr Asp Thr Ala Tyr
 65                  70                  75                  80
Met Glu Leu Ser Ser Leu Arg Ser Glu Asp Thr Ala Val Tyr Tyr Cys
                 85                  90                  95
Ala Glu Phe Ile Thr Lys Thr Val Gly Gly Ser Asn Trp Tyr Leu Asp
                100                 105                 110
Val Trp Gly Gln Gly Thr Thr Val Thr Val Ser Ser
            115                 120
```

<210> SEQ ID NO 60
<211> LENGTH: 106
<212> TYPE: PRT
<213> ORGANISM: Artificial
<220> FEATURE:
<223> OTHER INFORMATION: Variant Antibody

<400> SEQUENCE: 60

```
Glu Ile Val Leu Thr Gln Ser Pro Ala Thr Leu Ser Leu Ser Pro Gly
  1               5                  10                  15
Glu Arg Ala Thr Leu Ser Cys Ser Ala Ser Ser Ile Ser Tyr Ile
             20                  25                  30
His Trp Tyr Gln Gln Lys Pro Gly Gln Ala Pro Arg Leu Ile Tyr
             35                  40                  45
Asp Thr Ser Lys Leu Pro Ser Gly Ile Pro Ala Arg Phe Ser Gly Ser
 50                  55                  60
Gly Ser Gly Thr Asp Phe Thr Leu Thr Ile Ser Ser Leu Glu Pro Glu
 65                  70                  75                  80
Asp Phe Ala Val Tyr Tyr Cys His Gln Arg Ser Ser Tyr Thr Trp Thr
                 85                  90                  95
Phe Gly Gly Gly Thr Lys Leu Glu Ile Lys
                100                 105
```

<210> SEQ ID NO 61
<211> LENGTH: 124
<212> TYPE: PRT
<213> ORGANISM: Artificial
<220> FEATURE:
<223> OTHER INFORMATION: Variant Antibody

<400> SEQUENCE: 61

```
Gln Val Gln Leu Val Gln Ser Gly Ala Glu Val Lys Lys Pro Gly Ala
  1               5                  10                  15
Ser Val Lys Val Ser Cys Lys Ala Ser Gly Tyr Thr Phe Thr Thr Tyr
             20                  25                  30
Val Met His Trp Val Arg Gln Ala Pro Gly Lys Gly Leu Glu Trp Met
             35                  40                  45
Gly Tyr Ile Asn Pro Tyr Asn Asp Gly Thr Asn Tyr Asn Glu Lys Phe
         50                  55                  60
Lys Gly Arg Val Thr Leu Thr Glu Asp Thr Ser Thr Asp Thr Ala Tyr
 65                  70                  75                  80
Met Glu Leu Ser Ser Leu Arg Ser Glu Asp Thr Ala Val Tyr Tyr Cys
                 85                  90                  95
Ala Glu Phe Ile Thr Lys Thr Val Gly Gly Ser Asn Trp Tyr Leu Asp
                100                 105                 110
```

Val Trp Gly Gln Gly Thr Thr Val Thr Val Ser Ser
        115                 120

<210> SEQ ID NO 62
<211> LENGTH: 106
<212> TYPE: PRT
<213> ORGANISM: Artificial
<220> FEATURE:
<223> OTHER INFORMATION: Variant Antibody

<400> SEQUENCE: 62

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ile Ser Tyr Ile
            20                  25                  30

His Trp Phe Gln Gln Lys Pro Gly Gln Ala Pro Lys Arg Trp Ile Tyr
        35                  40                  45

Asp Thr Ser Lys Leu Pro Ser Gly Val Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 63
<211> LENGTH: 124
<212> TYPE: PRT
<213> ORGANISM: Artificial
<220> FEATURE:
<223> OTHER INFORMATION: Variant Antibody

<400> SEQUENCE: 63

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Ser Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 64
<211> LENGTH: 106
<212> TYPE: PRT
<213> ORGANISM: Artificial
<220> FEATURE:
<223> OTHER INFORMATION: Variant Antibody

<400> SEQUENCE: 64

Asp Ile Gln Leu Thr Gln Ser Pro Ser Phe Leu Ser Ala Ser Val Gly

```
            1               5                  10                 15
Asp Arg Val Thr Ile Thr Cys Ser Ala Ser Ser Ser Ile Ser Tyr Ile
                        20                 25                 30

His Trp Tyr Gln Gln Lys Pro Gly Lys Ala Pro Lys Arg Leu Ile Tyr
                35                 40                 45

Asp Thr Ser Lys Leu Pro Ser Gly Val Pro Ser Arg Phe Ser Gly Ser
        50                 55                 60

Gly Ser Gly Thr Glu Phe Thr Leu Thr Ile Ser Ser Leu Gln Pro Glu
65                  70                 75                 80

Asp Phe Ala Thr Tyr Tyr Cys His Gln Arg Ser Ser Tyr Thr Trp Thr
                    85                 90                 95

Phe Gly Gly Gly Thr Lys Leu Glu Ile Lys
                100                105
```

<210> SEQ ID NO 65
<211> LENGTH: 124
<212> TYPE: PRT
<213> ORGANISM: Artificial
<220> FEATURE:
<223> OTHER INFORMATION: Variant Antibody

<400> SEQUENCE: 65

```
Gln Val Gln Leu Val Gln Ser Gly Ala Glu Val Lys Lys Pro Gly Ala
1               5                  10                 15

Ser Val Lys Val Ser Cys Lys Ala Ser Gly Tyr Thr Phe Thr Thr Tyr
                20                 25                 30

Val Met His Trp Val Arg Gln Ala Pro Gly Lys Gly Leu Glu Trp Met
                35                 40                 45

Gly Tyr Ile Asn Pro Tyr Asn Asp Gly Thr Asn Tyr Asn Glu Lys Phe
        50                 55                 60

Lys Gly Arg Val Thr Met Thr Ser Asp Thr Ser Thr Asp Thr Ala Tyr
65                  70                 75                 80

Met Glu Leu Ser Ser Leu Arg Ser Glu Asp Thr Ala Val Tyr Tyr Cys
                    85                 90                 95

Ala Glu Phe Ile Thr Lys Thr Val Gly Gly Ser Asn Trp Tyr Leu Asp
                100                105                110

Val Trp Gly Gln Gly Thr Thr Val Thr Val Ser Ser
            115                120
```

<210> SEQ ID NO 66
<211> LENGTH: 106
<212> TYPE: PRT
<213> ORGANISM: Artificial
<220> FEATURE:
<223> OTHER INFORMATION: Variant Antibody

<400> SEQUENCE: 66

```
Asp Ile Gln Leu Thr Gln Ser Pro Ser Phe Leu Ser Ala Ser Val Gly
1               5                  10                 15

Asp Arg Val Thr Ile Thr Cys Ser Ala Ser Ser Ser Ile Ser Tyr Ile
                20                 25                 30

His Trp Phe Gln Gln Lys Pro Gly Lys Ala Pro Lys Arg Trp Ile Tyr
                35                 40                 45

Asp Thr Ser Lys Leu Pro Ser Gly Val Pro Ser Arg Phe Ser Gly Ser
        50                 55                 60

Gly Ser Gly Thr Glu Tyr Thr Leu Thr Ile Ser Ser Leu Gln Pro Glu
65                  70                 75                 80
```

```
Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 67
<211> LENGTH: 124
<212> TYPE: PRT
<213> ORGANISM: Artificial
<220> FEATURE:
<223> OTHER INFORMATION: Variant Antibody

<400> SEQUENCE: 67

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Ser Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 68
<211> LENGTH: 106
<212> TYPE: PRT
<213> ORGANISM: Artificial
<220> FEATURE:
<223> OTHER INFORMATION: Variant Antibody

<400> SEQUENCE: 68

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ile Ser Tyr Ile
            20                  25                  30

His Trp Tyr Gln Gln Lys Pro Gly Gln Ala Pro Arg Arg Leu Ile Tyr
        35                  40                  45

Asp Thr Ser Lys Leu Pro Ser Gly Ile Pro Ala Arg Phe Ser Gly Ser
    50                  55                  60

Gly Ser Gly Thr Asp Phe Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 69
<211> LENGTH: 124
<212> TYPE: PRT
<213> ORGANISM: Artificial
<220> FEATURE:
<223> OTHER INFORMATION: Variant Antibody
```

<400> SEQUENCE: 69

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Ser Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 70
<211> LENGTH: 106
<212> TYPE: PRT
<213> ORGANISM: Artificial
<220> FEATURE:
<223> OTHER INFORMATION: Variant Antibody

<400> SEQUENCE: 70

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
            20                  25                  30

His Trp Phe Gln Gln Lys Pro Gly Gln Ala Pro Lys Arg Trp Ile Tyr
        35                  40                  45

Asp Thr Ser Lys Leu Pro Ser Gly Val Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 71
<211> LENGTH: 124
<212> TYPE: PRT
<213> ORGANISM: Artificial
<220> FEATURE:
<223> OTHER INFORMATION: Variant Antibody

<400> SEQUENCE: 71

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Lys Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 72
<211> LENGTH: 106
<212> TYPE: PRT
<213> ORGANISM: Artificial
<220> FEATURE:
<223> OTHER INFORMATION: Variant Antibody

<400> SEQUENCE: 72

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Tyr Gln Gln Lys Pro Gly Lys Ala Pro Lys Arg Leu Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Phe Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 73
<211> LENGTH: 124
<212> TYPE: PRT
<213> ORGANISM: Artificial
<220> FEATURE:
<223> OTHER INFORMATION: Variant Antibody

<400> SEQUENCE: 73

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Lys Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 74

```
<211> LENGTH: 106
<212> TYPE: PRT
<213> ORGANISM: Artificial
<220> FEATURE:
<223> OTHER INFORMATION: Variant Antibody

<400> SEQUENCE: 74

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 75
<211> LENGTH: 124
<212> TYPE: PRT
<213> ORGANISM: Artificial
<220> FEATURE:
<223> OTHER INFORMATION: Variant Antibody

<400> SEQUENCE: 75

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Lys Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 76
<211> LENGTH: 106
<212> TYPE: PRT
<213> ORGANISM: Artificial
<220> FEATURE:
<223> OTHER INFORMATION: Variant Antibody

<400> SEQUENCE: 76

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
            20                  25                  30
```

His Trp Tyr Gln Gln Lys Pro Gly Gln Ala Pro Arg Arg Leu Ile Tyr
            35                  40                  45

Asp Thr Ser Lys Leu Pro Ser Gly Ile Pro Ala Arg Phe Ser Gly Ser
 50                  55                  60

Gly Ser Gly Thr Asp Phe Thr Leu Thr Ile Ser Ser Leu Glu Pro Glu
 65                  70                  75                  80

Asp Phe Ala Val Tyr Tyr Cys His Gln Arg Ser Ser Tyr Thr Trp Thr
                 85                  90                  95

Phe Gly Gly Gly Thr Lys Leu Glu Ile Lys
            100                 105

<210> SEQ ID NO 77
<211> LENGTH: 124
<212> TYPE: PRT
<213> ORGANISM: Artificial
<220> FEATURE:
<223> OTHER INFORMATION: Variant Antibody

<400> SEQUENCE: 77

Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
            35                  40                  45

Gly Tyr Ile Asn Pro Tyr Asn Asp Gly Thr Asn Tyr Asn Glu Lys Phe
 50                  55                  60

Lys Gly Arg Val Thr Met Thr Glu Asp Lys Ser Thr Asp Thr Ala Tyr
 65                  70                  75                  80

Met Glu Leu Ser Ser Leu Arg Ser Glu Asp Thr Ala Val Tyr Tyr Cys
                 85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
            115                 120

<210> SEQ ID NO 78
<211> LENGTH: 106
<212> TYPE: PRT
<213> ORGANISM: Artificial
<220> FEATURE:
<223> OTHER INFORMATION: Variant Antibody

<400> SEQUENCE: 78

Glu Ile Val Leu Thr Gln Ser Pro Ala Thr Leu Ser Leu Ser Pro Gly
 1               5                  10                  15

Glu Arg Ala Thr Leu Ser Cys Ser Ala Ser Ser Ser Ile Ser Tyr Ile
            20                  25                  30

His Trp Phe Gln Gln Lys Pro Gly Gln Ala Pro Lys Arg Trp Ile Tyr
            35                  40                  45

Asp Thr Ser Lys Leu Pro Ser Gly Val Pro Ala Arg Phe Ser Gly Ser
 50                  55                  60

Gly Ser Gly Thr Asp Tyr Thr Leu Thr Ile Ser Ser Leu Glu Pro Glu
 65                  70                  75                  80

Asp Phe Ala Val Tyr Tyr Cys His Gln Arg Ser Ser Tyr Thr Trp Thr
                 85                  90                  95

Phe Gly Gly Gly Thr Lys Leu Glu Ile Lys
            100                 105

<210> SEQ ID NO 79
<211> LENGTH: 124
<212> TYPE: PRT
<213> ORGANISM: Artificial
<220> FEATURE:
<223> OTHER INFORMATION: Variant Antibody

<400> SEQUENCE: 79

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 80
<211> LENGTH: 106
<212> TYPE: PRT
<213> ORGANISM: Artificial
<220> FEATURE:
<223> OTHER INFORMATION: Variant Antibody

<400> SEQUENCE: 80

Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Tyr Gln Gln Lys Pro Gly Lys Ala Pro Lys Arg Leu Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Phe Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 81
<211> LENGTH: 124
<212> TYPE: PRT
<213> ORGANISM: Artificial
<220> FEATURE:
<223> OTHER INFORMATION: Variant Antibody

<400> SEQUENCE: 81

Gln Val Gln Leu Val Gln Ser Gly Ala Glu Val Lys Lys Pro Gly Ala
1               5                   10                  15

```
Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120
```

<210> SEQ ID NO 82
<211> LENGTH: 106
<212> TYPE: PRT
<213> ORGANISM: Artificial
<220> FEATURE:
<223> OTHER INFORMATION: Variant Antibody

<400> SEQUENCE: 82

```
Asp Ile Gln Leu Thr Gln Ser Pro Ser Phe Leu Ser Ala Ser Val Gly
1               5                   10                  15

Asp Arg Val Thr Ile Thr Cys Ser Ala Ser Ser Ser Ile Ser Tyr Ile
            20                  25                  30

His Trp Phe Gln Gln Lys Pro Gly Lys Ala Pro Lys Arg Trp Ile Tyr
        35                  40                  45

Asp Thr Ser Lys Leu Pro Ser Gly Val Pro Ser Arg Phe Ser Gly Ser
    50                  55                  60

Gly Ser Gly Thr Glu Tyr Thr Leu Thr Ile Ser Ser Leu Gln Pro Glu
65                  70                  75                  80

Asp Phe Ala Thr Tyr Tyr Cys His Gln Arg Ser Ser Tyr Thr Trp Thr
                85                  90                  95

Phe Gly Gly Gly Thr Lys Leu Glu Ile Lys
            100                 105
```

<210> SEQ ID NO 83
<211> LENGTH: 124
<212> TYPE: PRT
<213> ORGANISM: Artificial
<220> FEATURE:
<223> OTHER INFORMATION: Variant Antibody

<400> SEQUENCE: 83

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95
```

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 84
<211> LENGTH: 106
<212> TYPE: PRT
<213> ORGANISM: Artificial
<220> FEATURE:
<223> OTHER INFORMATION: Variant Antibody

<400> SEQUENCE: 84

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ile Ser Tyr Ile
            20                  25                  30

His Trp Tyr Gln Gln Lys Pro Gly Gln Ala Pro Arg Arg Leu Ile Tyr
        35                  40                  45

Asp Thr Ser Lys Leu Pro Ser Gly Ile Pro Ala Arg Phe Ser Gly Ser
    50                  55                  60

Gly Ser Gly Thr Asp Phe Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
            100                 105

<210> SEQ ID NO 85
<211> LENGTH: 124
<212> TYPE: PRT
<213> ORGANISM: Artificial
<220> FEATURE:
<223> OTHER INFORMATION: Variant Antibody

<400> SEQUENCE: 85

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Val Met His Trp Val Arg Gln Ala Pro Gly Lys Gly Leu Glu Trp Met
        35                  40                  45

Gly Tyr Ile Asn Pro Tyr Asn Asp Gly Thr Asn Tyr Asn Glu Lys Phe
    50                  55                  60

Lys Gly Arg Val Thr Met Thr Glu Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Glu Phe Ile Thr Lys Thr Val Gly Gly Ser Asn Trp Tyr Leu Asp
            100                 105                 110

Val Trp Gly Gln Gly Thr Thr Val Thr Val Ser Ser
        115                 120

<210> SEQ ID NO 86
<211> LENGTH: 106
<212> TYPE: PRT
<213> ORGANISM: Artificial
<220> FEATURE:
<223> OTHER INFORMATION: Variant Antibody

```
<400> SEQUENCE: 86

Glu Ile Val Leu Thr Gln Ser Pro Ala Thr Leu Ser Leu Ser Pro Gly
1               5                   10                  15

Glu Arg Ala Thr Leu Ser Cys Ser Ala Ser Ser Ser Ile Ser Tyr Ile
            20                  25                  30

His Trp Phe Gln Gln Lys Pro Gly Gln Ala Pro Lys Arg Trp Ile Tyr
        35                  40                  45

Asp Thr Ser Lys Leu Pro Ser Gly Val Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys His Gln Arg Ser Ser Tyr Thr Trp Thr
                85                  90                  95

Phe Gly Gly Gly Thr Lys Leu Glu Ile Lys
                100                 105
```